US008870645B2

(12) United States Patent
Baerlocher et al.

(10) Patent No.: US 8,870,645 B2
(45) Date of Patent: Oct. 28, 2014

(54) SERVER BASED GAMING SYSTEM AND METHOD FOR PROVIDING DEFERRAL OF BONUS EVENTS

(71) Applicant: IGT, Reno, NV (US)

(72) Inventors: Anthony J. Baerlocher, South Bend, IN (US); Glen Keith Russell, North Las Vegas, NV (US)

(73) Assignee: IGT, Las Vegas, NV (US)

( * ) Notice: Subject to any disclaimer, the term of this patent is extended or adjusted under 35 U.S.C. 154(b) by 0 days.

(21) Appl. No.: 13/720,115

(22) Filed: Dec. 19, 2012

(65) Prior Publication Data

US 2013/0116045 A1 May 9, 2013

Related U.S. Application Data

(63) Continuation of application No. 12/267,156, filed on Nov. 7, 2008, now Pat. No. 8,376,836.

(51) Int. Cl.

*G06F 17/00* (2006.01)
*G07F 17/32* (2006.01)
*A63F 9/24* (2006.01)

(52) U.S. Cl.

CPC . *A63F 9/24* (2013.01); *G07F 17/32* (2013.01); *G07F 17/3258* (2013.01)
USPC ............................................. 463/25; 463/29

(58) Field of Classification Search

USPC ..................................................... 463/24–27
See application file for complete search history.

(56) References Cited

U.S. PATENT DOCUMENTS

| | | | |
|---|---|---|---|
| 2,942,574 | A | 6/1960 | Golay |
| 3,618,019 | A | 11/1971 | Nemirovsky |
| 3,998,309 | A | 12/1976 | Mandas et al. |
| 4,072,930 | A | 2/1978 | Lucero et al. |
| 4,238,127 | A | 12/1980 | Lucero et al. |
| 4,277,064 | A | 7/1981 | Newman |
| 4,283,709 | A | 8/1981 | Lucero et al. |
| 4,335,809 | A | 6/1982 | Wain |
| 4,409,656 | A | 10/1983 | Andersen et al. |

(Continued)

FOREIGN PATENT DOCUMENTS

| | | |
|---|---|---|
| AU | 524709 | 9/1982 |
| AU | 84/25946 | 2/1985 |

(Continued)

OTHER PUBLICATIONS

Auction Fever Advertisement, written by Sierra Design Group, available prior to 2004.

(Continued)

*Primary Examiner* — Dmitry Suhol
*Assistant Examiner* — Carl V Larsen
(74) *Attorney, Agent, or Firm* — Neal, Gerber & Eisenberg LLP

(57) ABSTRACT

A gaming system including a central server linked to a plurality of gaming machines. The gaming system includes a bonus event unit based system to provide one or more awards to one or more players. Such bonus event units are accumulated by a player based on one or more events associated with the player's gaming experience. The bonus event units utilized in the gaming system are selectively redeemed by the player in exchange for one or more opportunities to win an award.

24 Claims, 17 Drawing Sheets

(56) References Cited

U.S. PATENT DOCUMENTS 4,448,419 A 5/1984 Telnaes
4,494,197 A 1/1985 Troy et al.
4,573,681 A 3/1986 Okada
4,582,324 A 4/1986 Koza et al.
4,624,459 A 11/1986 Kaufman
4,636,951 A 1/1987 Harlick
4,652,998 A 3/1987 Koza et al.
4,657,256 A 4/1987 Okada
4,669,731 A 6/1987 Clarke
4,721,307 A 1/1988 Okada
4,743,024 A 5/1988 Helm et al.
4,760,527 A 7/1988 Sidley
4,764,666 A 8/1988 Bergeron
4,772,023 A 9/1988 Okada
4,775,155 A 10/1988 Lees
4,805,907 A 2/1989 Hagiwara
4,837,728 A 6/1989 Barrie et al.
4,842,278 A 6/1989 Markowicz
4,856,787 A 8/1989 Itkis
4,871,171 A 10/1989 Rivero
4,880,237 A 11/1989 Kishishita
4,926,327 A 5/1990 Sidley
4,964,638 A 10/1990 Ishida
4,991,848 A 2/1991 Greenwood et al.
5,016,880 A 5/1991 Berge
5,038,022 A 8/1991 Lucero
5,048,833 A 9/1991 Lamle
5,074,559 A 12/1991 Okada
5,116,055 A 5/1992 Tracy
5,123,649 A 6/1992 Tiberio
5,127,651 A 7/1992 Okada
5,158,293 A 10/1992 Mullins
5,178,390 A 1/1993 Okada
5,209,479 A 5/1993 Nagao
5,217,224 A 6/1993 Sincock
5,249,800 A 10/1993 Hilgendorf et al.
5,259,616 A 11/1993 Bergmann
5,265,874 A 11/1993 Dickinson et al.
5,275,400 A 1/1994 Weingardt
5,276,312 A 1/1994 McCarthy
5,277,424 A 1/1994 Wilms
5,280,909 A 1/1994 Tracy
5,282,620 A 2/1994 Keesee
5,286,023 A 2/1994 Wood
5,292,127 A 3/1994 Kelly et al.
5,321,241 A 6/1994 Craine
5,324,035 A 6/1994 Morris et al.
5,326,104 A 7/1994 Pease et al.
5,342,047 A 8/1994 Heidel et al.
5,342,049 A 8/1994 Wichinsky et al.
5,344,144 A 9/1994 Canon
5,351,970 A 10/1994 Fioretti
5,377,993 A 1/1995 Josephs
5,380,008 A 1/1995 Mathis et al.
5,393,057 A 2/1995 Marnell, II
5,398,932 A 3/1995 Eberhardt et al.
5,401,024 A 3/1995 Simunek
5,417,430 A 5/1995 Breeding
5,423,539 A 6/1995 Nagao
5,429,361 A 7/1995 Raven et al.
5,456,465 A 10/1995 Durham
5,470,079 A 11/1995 LeStrange et al.
5,472,194 A 12/1995 Breeding et al.
5,476,259 A 12/1995 Weingardt
5,489,101 A 2/1996 Moody
5,507,489 A 4/1996 Reibel et al.
5,511,781 A 4/1996 Wood
5,524,888 A 6/1996 Heidel
5,536,016 A 7/1996 Thompson
5,544,893 A 8/1996 Jones et al.
5,547,192 A 8/1996 Ishibashi
5,560,603 A 10/1996 Seeling et al.
5,564,700 A 10/1996 Celona
5,566,337 A 10/1996 Szymanski
5,570,885 A 11/1996 Ornstein
5,580,053 A 12/1996 Crouch
5,580,309 A 12/1996 Piechowiak et al.
5,584,763 A 12/1996 Kelly et al.
5,601,487 A 2/1997 Oshima
5,605,506 A 2/1997 Hoorn et al.
5,611,535 A 3/1997 Tiberio
5,611,730 A 3/1997 Weiss
5,626,341 A 5/1997 Jones
5,641,050 A 6/1997 Smith et al.
5,645,486 A 7/1997 Nagao et al.
5,655,961 A 8/1997 Acres et al.
5,674,128 A 10/1997 Holch et al.
5,702,304 A 12/1997 Acres et al.
5,707,285 A 1/1998 Place et al.
5,707,286 A 1/1998 Carlson
5,722,891 A 3/1998 Inoue
5,732,948 A 3/1998 Yoseloff
5,741,183 A 4/1998 Acres et al.
5,743,800 A 4/1998 Huard et al.
5,752,882 A 5/1998 Acres et al.
5,761,647 A 6/1998 Boushy
5,762,552 A 6/1998 Vuong
5,766,076 A 6/1998 Pease et al.
5,769,716 A 6/1998 Saffari et al.
5,772,511 A 6/1998 Smeltzer
RE35,864 E 7/1998 Weingardt
5,779,545 A 7/1998 Berg et al.
5,779,547 A 7/1998 SoRelle et al.
5,779,549 A 7/1998 Walker et al.
5,788,573 A 8/1998 Baerlocher et al.
5,800,269 A 9/1998 Holch et al.
5,806,855 A 9/1998 Cherry
5,807,172 A 9/1998 Piechowiak
5,816,918 A 10/1998 Kelly et al.
5,820,459 A 10/1998 Acres et al.
5,823,874 A 10/1998 Adams
5,833,537 A 11/1998 Barrie
5,833,538 A 11/1998 Weiss
5,833,540 A 11/1998 Miodunski et al.
5,836,817 A 11/1998 Acres et al.
5,848,932 A 12/1998 Adams
5,851,011 A 12/1998 Lott
5,851,148 A 12/1998 Brune et al.
5,851,149 A 12/1998 Xidos et al.
5,855,514 A 1/1999 Kamille
5,855,515 A 1/1999 Pease et al.
5,876,284 A 3/1999 Acres et al.
5,885,158 A 3/1999 Torango et al.
5,902,184 A 5/1999 Bennett
5,902,983 A 5/1999 Crevelt et al.
5,910,048 A 6/1999 Feinburg
5,919,088 A 7/1999 Weiss
5,941,773 A 8/1999 Harlick
5,944,606 A 8/1999 Gerow
5,947,820 A 9/1999 Morro et al.
5,947,822 A 9/1999 Weiss
5,951,011 A 9/1999 Potter et al.
5,970,143 A 10/1999 Schneier et al.
5,980,384 A 11/1999 Barrie
5,984,779 A 11/1999 Bridgeman et al.
5,989,121 A 11/1999 Sakamoto
5,993,316 A 11/1999 Coyle et al.
5,997,400 A 12/1999 Seelig et al.
6,001,016 A 12/1999 Walker et al.
6,004,207 A 12/1999 Wilson, Jr. et al.
6,007,427 A 12/1999 Wiener
6,012,982 A 1/2000 Piechowiak et al.
6,012,983 A 1/2000 Walker et al.
6,015,346 A 1/2000 Bennett
6,030,288 A 2/2000 Davis et al.
6,039,648 A 3/2000 Guinn et al.
6,039,649 A 3/2000 Schulze
6,048,269 A 4/2000 Burns et al.
6,050,895 A 4/2000 Luciano et al.
6,056,642 A 5/2000 Bennett
6,059,289 A 5/2000 Vancura
6,068,553 A 5/2000 Parker
6,077,162 A 6/2000 Weiss
6,080,062 A 6/2000 Olson

(56) References Cited

U.S. PATENT DOCUMENTS

| | | | |
|---|---|---|---|
| 6,089,976 | A | 7/2000 | Schneider et al. |
| 6,089,977 | A | 7/2000 | Bennett |
| 6,089,978 | A | 7/2000 | Adams |
| 6,089,980 | A | 7/2000 | Gauselmann |
| 6,099,408 | A | 8/2000 | Schneier et al. |
| 6,110,041 | A | 8/2000 | Walker et al. |
| 6,110,043 | A | 8/2000 | Olsen |
| 6,117,013 | A | 9/2000 | Eiba |
| 6,135,884 | A | 10/2000 | Hedrick et al. |
| 6,142,872 | A | 11/2000 | Walker et al. |
| 6,146,270 | A | 11/2000 | Huard et al. |
| 6,146,273 | A | 11/2000 | Olsen |
| 6,149,521 | A | 11/2000 | Sanduski |
| 6,152,823 | A | 11/2000 | Lacoste et al. |
| 6,155,925 | A | 12/2000 | Giobbi et al. |
| 6,159,097 | A | 12/2000 | Gura |
| 6,159,098 | A | 12/2000 | Slomiany et al. |
| 6,162,121 | A | 12/2000 | Morro et al. |
| 6,162,122 | A | 12/2000 | Acres et al. |
| 6,167,523 | A | 12/2000 | Strong |
| 6,168,520 | B1 | 1/2001 | Baerlocher et al. |
| 6,183,366 | B1 | 2/2001 | Goldberg et al. |
| 6,186,894 | B1 | 2/2001 | Mayeroff |
| 6,190,255 | B1 | 2/2001 | Thomas et al. |
| 6,203,010 | B1 | 3/2001 | Jorasch et al. |
| 6,203,430 | B1 | 3/2001 | Walker et al. |
| 6,206,374 | B1 | 3/2001 | Jones |
| 6,210,275 | B1 | 4/2001 | Olsen |
| 6,210,277 | B1 | 4/2001 | Stefan |
| 6,217,448 | B1 | 4/2001 | Olsen |
| 6,224,482 | B1 | 5/2001 | Bennett |
| 6,224,483 | B1 | 5/2001 | Mayeroff |
| 6,224,484 | B1 | 5/2001 | Okuda et al. |
| 6,231,442 | B1 | 5/2001 | Mayeroff |
| 6,231,445 | B1 | 5/2001 | Acres |
| 6,234,896 | B1 | 5/2001 | Walker et al. |
| 6,238,288 | B1 | 5/2001 | Walker et al. |
| 6,241,608 | B1 | 6/2001 | Torango |
| 6,244,958 | B1 | 6/2001 | Acres |
| 6,254,483 | B1 | 7/2001 | Acres |
| 6,257,981 | B1 | 7/2001 | Acres et al. |
| 6,264,557 | B1 | 7/2001 | Schneier et al. |
| 6,270,409 | B1 | 8/2001 | Shuster |
| 6,287,194 | B1 | 9/2001 | Okada et al. |
| 6,287,202 | B1 | 9/2001 | Pascal et al. |
| 6,293,866 | B1 | 9/2001 | Walker et al. |
| RE37,414 | E | 10/2001 | Harlick |
| 6,302,790 | B1 | 10/2001 | Brossard |
| 6,302,793 | B1 | 10/2001 | Fertitta, III et al. |
| 6,302,794 | B1 | 10/2001 | Ogawa |
| 6,309,298 | B1 | 10/2001 | Gerow |
| 6,309,300 | B1 | 10/2001 | Glavich |
| 6,311,976 | B1 | 11/2001 | Yoseloff et al. |
| 6,312,330 | B1 | 11/2001 | Jones et al. |
| 6,312,333 | B1 | 11/2001 | Acres |
| 6,315,662 | B1 | 11/2001 | Jorasch et al. |
| 6,319,122 | B1 | 11/2001 | Packes, Jr. et al. |
| 6,319,125 | B1 | 11/2001 | Acres |
| 6,322,309 | B1 | 11/2001 | Thomas et al. |
| 6,328,649 | B1 | 12/2001 | Randall et al. |
| 6,334,814 | B1 | 1/2002 | Adams |
| 6,336,857 | B1 | 1/2002 | McBride |
| 6,340,158 | B2 | 1/2002 | Preice et al. |
| 6,346,043 | B1 | 2/2002 | Colin et al. |
| 6,347,738 | B1 | 2/2002 | Crevelt et al. |
| 6,347,996 | B1 | 2/2002 | Gilmore et al. |
| 6,358,147 | B1 | 3/2002 | Jaffe et al. |
| 6,358,149 | B1 | 3/2002 | Schneider et al. |
| 6,361,441 | B1 | 3/2002 | Walker et al. |
| 6,364,766 | B1 | 4/2002 | Anderson et al. |
| 6,364,768 | B1 | 4/2002 | Acres et al. |
| 6,364,769 | B1 | 4/2002 | Weiss et al. |
| 6,371,852 | B1 | 4/2002 | Acres |
| 6,375,567 | B1 | 4/2002 | Acres |
| 6,375,568 | B1 | 4/2002 | Roffman et al. |

| | | | |
|---|---|---|---|
| 6,375,569 | B1 | 4/2002 | Acres |
| 6,390,473 | B1 | 5/2002 | Vancura et al. |
| 6,398,218 | B1 | 6/2002 | Vancura |
| 6,406,369 | B1 | 6/2002 | Baerlocher et al. |
| 6,416,408 | B2 | 7/2002 | Tracy et al. |
| 6,416,409 | B1 | 7/2002 | Jordan |
| 6,419,579 | B1 | 7/2002 | Bennett |
| 6,419,583 | B1 | 7/2002 | Crumby et al. |
| 6,428,412 | B1 | 8/2002 | Anderson et al. |
| 6,431,983 | B2 | 8/2002 | Acres |
| 6,435,511 | B1 | 8/2002 | Vancura et al. |
| 6,435,968 | B1 | 8/2002 | Torango |
| 6,454,651 | B1 | 9/2002 | Yoseloff |
| RE37,885 | E | 10/2002 | Acres et al. |
| 6,461,241 | B1 | 10/2002 | Webb et al. |
| 6,471,208 | B2 | 10/2002 | Yoseloff et al. |
| 6,481,713 | B2 | 11/2002 | Perrie et al. |
| 6,506,118 | B1 | 1/2003 | Baerlocher et al. |
| 6,511,376 | B2 | 1/2003 | Walker et al. |
| 6,533,664 | B1 | 3/2003 | Crumby |
| 6,537,150 | B1 | 3/2003 | Luciano et al. |
| 6,546,134 | B1 | 4/2003 | Shrairman et al. |
| 6,546,374 | B1 | 4/2003 | Esposito et al. |
| 6,547,131 | B1 | 4/2003 | Foodman et al. |
| 6,554,705 | B1 | 4/2003 | Cumbers |
| 6,561,904 | B2 | 5/2003 | Locke et al. |
| 6,565,434 | B1 | 5/2003 | Acres |
| 6,569,015 | B1 | 5/2003 | Baerlocher et al. |
| 6,572,471 | B1 | 6/2003 | Bennett |
| 6,575,832 | B1 | 6/2003 | Manfredi et al. |
| 6,589,115 | B2 | 7/2003 | Walker et al. |
| 6,592,460 | B2 | 7/2003 | Torango |
| 6,595,853 | B1 | 7/2003 | Osawa |
| 6,599,185 | B1 | 7/2003 | Kaminkow et al. |
| 6,599,190 | B2 | 7/2003 | Osawa |
| 6,599,193 | B2 | 7/2003 | Baerlocher et al. |
| 6,607,438 | B2 | 8/2003 | Baerlocher et al. |
| 6,607,441 | B1 | 8/2003 | Acres |
| 6,609,973 | B1 | 8/2003 | Weiss |
| 6,620,046 | B2 | 9/2003 | Rowe |
| 6,626,758 | B1 | 9/2003 | Parham et al. |
| 6,634,944 | B2 | 10/2003 | Osawa |
| 6,637,747 | B1 | 10/2003 | Garrod |
| 6,645,074 | B2 | 11/2003 | Thomas et al. |
| 6,645,077 | B2 | 11/2003 | Rowe |
| 6,648,759 | B2 | 11/2003 | Vancura |
| 6,648,762 | B2 | 11/2003 | Walker et al. |
| 6,656,047 | B1 | 12/2003 | Tarantino et al. |
| 6,656,048 | B2 | 12/2003 | Olsen |
| 6,656,052 | B2 | 12/2003 | Abramopoulos et al. |
| 6,672,959 | B2 | 1/2004 | Moody et al. |
| 6,675,152 | B1 | 1/2004 | Prasad et al. |
| 6,682,419 | B2 | 1/2004 | Webb et al. |
| 6,682,420 | B2 | 1/2004 | Webb et al. |
| 6,682,421 | B1 | 1/2004 | Rowe et al. |
| 6,692,355 | B2 | 2/2004 | Baerlocher et al. |
| 6,702,674 | B1 | 3/2004 | De Bruin et al. |
| 6,712,695 | B2 | 3/2004 | Mothwurf et al. |
| 6,712,697 | B2 | 3/2004 | Acres |
| 6,719,630 | B1 | 4/2004 | Seelig et al. |
| 6,726,563 | B1 | 4/2004 | Baerlocher et al. |
| 6,733,389 | B2 | 5/2004 | Webb et al. |
| 6,746,328 | B2 | 6/2004 | Cannon et al. |
| 6,749,510 | B2 | 6/2004 | Giobbi |
| 6,754,346 | B2 | 6/2004 | Eiserling et al. |
| 6,761,632 | B2 | 7/2004 | Bansemer et al. |
| 6,776,714 | B2 | 8/2004 | Ungaro et al. |
| 6,776,715 | B2 | 8/2004 | Price |
| 6,780,111 | B2 | 8/2004 | Cannon et al. |
| 6,790,141 | B2 | 9/2004 | Muir |
| 6,793,578 | B2 | 9/2004 | Luccesi et al. |
| 6,800,030 | B2 | 10/2004 | Acres |
| 6,805,352 | B2 | 10/2004 | Hunter |
| 6,811,483 | B1 | 11/2004 | Webb et al. |
| 6,832,956 | B1 | 12/2004 | Boyd et al. |
| 6,832,958 | B2 | 12/2004 | Acres et al. |
| 6,837,788 | B2 | 1/2005 | Cannon |
| 6,857,958 | B2 | 2/2005 | Osawa |
| 6,869,361 | B2 | 3/2005 | Sharpless et al. |

(56) References Cited

U.S. PATENT DOCUMENTS

| | | | |
|---|---|---|---|
| 6,887,154 | B1 | 5/2005 | Luciano, Jr. et al. |
| 6,889,849 | B2 | 5/2005 | Heidel et al. |
| 6,899,625 | B2 | 5/2005 | Luciano, Jr. et al. |
| 6,908,387 | B2 | 6/2005 | Hedrick et al. |
| 6,910,964 | B2 | 6/2005 | Acres |
| 6,918,832 | B2 | 7/2005 | Baerlocher et al. |
| 6,918,834 | B2 | 7/2005 | Vancura |
| 6,932,707 | B2 | 8/2005 | Duhamel |
| 6,935,951 | B2 | 8/2005 | Paulsen et al. |
| 6,935,958 | B2 | 8/2005 | Nelson |
| 6,939,234 | B2 | 9/2005 | Beatty |
| RE38,812 | E | 10/2005 | Acres et al. |
| 6,955,600 | B2 | 10/2005 | Glavich et al. |
| 6,966,834 | B1 | 11/2005 | Johnson |
| 6,981,917 | B2 | 1/2006 | Webb et al. |
| 6,984,173 | B1 | 1/2006 | Piechowiak et al. |
| 7,011,581 | B2 | 3/2006 | Cole et al. |
| 7,037,195 | B2 | 5/2006 | Schneider et al. |
| 7,056,215 | B1 | 6/2006 | Olive |
| 7,070,501 | B2 | 7/2006 | Cormack et al. |
| 7,144,321 | B2 | 12/2006 | Mayeroff |
| 7,192,349 | B2 | 3/2007 | Baerlocher et al. |
| 7,223,172 | B2 | 5/2007 | Baerlocher et al. |
| 7,238,110 | B2 | 7/2007 | Glavich et al. |
| 7,258,611 | B2 | 8/2007 | Bigelow et al. |
| 7,300,351 | B2 | 11/2007 | Thomas |
| 7,360,764 | B2 | 4/2008 | Vancura et al. |
| 7,393,280 | B2 | 7/2008 | Cannon |
| 7,427,236 | B2 | 9/2008 | Kaminkow |
| 7,470,184 | B2 | 12/2008 | Baerlocher et al. |
| 7,470,187 | B2 | 12/2008 | Baerlocher et al. |
| 2001/0024971 | A1 | 9/2001 | Brossard |
| 2001/0049303 | A1 | 12/2001 | Found |
| 2001/0055990 | A1 | 12/2001 | Acres |
| 2002/0002674 | A1 | 1/2002 | Grimes et al. |
| 2002/0071557 | A1 | 6/2002 | Nguyen |
| 2002/0116615 | A1 | 8/2002 | Nguyen et al. |
| 2002/0138594 | A1 | 9/2002 | Rowe |
| 2002/0152120 | A1 | 10/2002 | Howington |
| 2002/0165023 | A1 | 11/2002 | Brosnan et al. |
| 2002/0187834 | A1 | 12/2002 | Rowe et al. |
| 2003/0027625 | A1 | 2/2003 | Rowe |
| 2003/0027630 | A1 | 2/2003 | Kelly et al. |
| 2003/0045350 | A1 | 3/2003 | Baerlocher et al. |
| 2003/0045353 | A1 | 3/2003 | Paulsen et al. |
| 2003/0050111 | A1 | 3/2003 | Saffari |
| 2003/0054878 | A1 | 3/2003 | Benoy et al. |
| 2003/0060266 | A1 | 3/2003 | Baerlocher |
| 2003/0060269 | A1 | 3/2003 | Paulsen et al. |
| 2003/0060279 | A1 | 3/2003 | Torango |
| 2003/0083943 | A1 | 5/2003 | Adams et al. |
| 2003/0092484 | A1 | 5/2003 | Schneider et al. |
| 2003/0100361 | A1 | 5/2003 | Sharpless et al. |
| 2003/0144965 | A1 | 7/2003 | Prasad et al. |
| 2003/0182574 | A1 | 9/2003 | Whitten et al. |
| 2003/0186733 | A1 | 10/2003 | Wolf |
| 2003/0199321 | A1 | 10/2003 | Williams |
| 2003/0211879 | A1 | 11/2003 | Englman |
| 2003/0222402 | A1 | 12/2003 | Olive |
| 2003/0223803 | A1 | 12/2003 | De Schrijver |
| 2003/0228904 | A1 | 12/2003 | Acres et al. |
| 2003/0232647 | A1 | 12/2003 | Moser |
| 2004/0009811 | A1 | 1/2004 | Torango |
| 2004/0038725 | A1 | 2/2004 | Kaminkow |
| 2004/0048644 | A1 | 3/2004 | Gerrard et al. |
| 2004/0048649 | A1 | 3/2004 | Peterson et al. |
| 2004/0072615 | A1 | 4/2004 | Maya et al. |
| 2004/0082373 | A1 | 4/2004 | Cole et al. |
| 2004/0087368 | A1 | 5/2004 | Gauselmann |
| 2004/0171416 | A1 | 9/2004 | Baerlocher et al. |
| 2004/0219962 | A1 | 11/2004 | Vancura |
| 2004/0242297 | A1 | 12/2004 | Walker |
| 2005/0012818 | A1 | 1/2005 | Kiely et al. |
| 2005/0026694 | A1 | 2/2005 | Kelly et al. |
| 2005/0032573 | A1 | 2/2005 | Acres et al. |
| 2005/0054429 | A1 | 3/2005 | Baerlocher et al. |
| 2005/0059467 | A1 | 3/2005 | Saffari et al. |
| 2005/0064932 | A1 | 3/2005 | Cannon |
| 2005/0070353 | A1 | 3/2005 | Webb et al. |
| 2005/0070356 | A1 | 3/2005 | Mothwurf |
| 2005/0079908 | A1 | 4/2005 | Pacey |
| 2005/0079911 | A1 | 4/2005 | Nakatsu |
| 2005/0086478 | A1 | 4/2005 | Peinado et al. |
| 2005/0096125 | A1 | 5/2005 | LeMay et al. |
| 2005/0101374 | A1 | 5/2005 | Acres |
| 2005/0101375 | A1 | 5/2005 | Webb et al. |
| 2005/0101384 | A1 | 5/2005 | Parham |
| 2005/0119047 | A1 | 6/2005 | Olive |
| 2005/0143168 | A1 | 6/2005 | Torango |
| 2005/0143169 | A1 | 6/2005 | Nguyen et al. |
| 2005/0159211 | A1 | 7/2005 | Englman |
| 2005/0163377 | A1 | 7/2005 | Walch |
| 2005/0176488 | A1 | 8/2005 | Olive |
| 2005/0178716 | A1 | 8/2005 | Suri |
| 2005/0181860 | A1 | 8/2005 | Nguyen |
| 2005/0192083 | A1 | 9/2005 | Iwamoto |
| 2005/0192099 | A1 | 9/2005 | Nguyen et al. |
| 2005/0209004 | A1 | 9/2005 | Torango |
| 2005/0239542 | A1 | 10/2005 | Olsen |
| 2005/0267610 | A1 | 12/2005 | Shinoda |
| 2005/0282626 | A1 | 12/2005 | Manfredi et al. |
| 2005/0282629 | A1 | 12/2005 | Gagner |
| 2006/0003829 | A1 | 1/2006 | Thomas |
| 2006/0009285 | A1 | 1/2006 | Pryzby et al. |
| 2006/0025195 | A1 | 2/2006 | Pennington |
| 2006/0025210 | A1 | 2/2006 | Johnson |
| 2006/0026604 | A1 | 2/2006 | Tan et al. |
| 2006/0030397 | A1 | 2/2006 | Chan |
| 2006/0030403 | A1 | 2/2006 | Lafky et al. |
| 2006/0035694 | A1 | 2/2006 | Fuller |
| 2006/0035705 | A1 | 2/2006 | Jordan et al. |
| 2006/0035706 | A1 | 2/2006 | Thomas et al. |
| 2006/0036552 | A1 | 2/2006 | Gunyakti et al. |
| 2006/0040732 | A1 | 2/2006 | Baerlocher et al. |
| 2006/0052159 | A1 | 3/2006 | Cahill et al. |
| 2006/0052161 | A1 | 3/2006 | Soukup et al. |
| 2006/0052162 | A1 | 3/2006 | Soukup et al. |
| 2006/0068897 | A1 | 3/2006 | Sanford et al. |
| 2006/0073872 | A1 | 4/2006 | B-Jensen et al. |
| 2006/0073887 | A1 | 4/2006 | Nguyen et al. |
| 2006/0073889 | A1 | 4/2006 | Edidin et al. |
| 2006/0073897 | A1 | 4/2006 | Englman et al. |
| 2006/0079317 | A1 | 4/2006 | Flemming et al. |
| 2006/0154718 | A1 | 7/2006 | Willyard et al. |
| 2006/0183537 | A1 | 8/2006 | Dickerson |
| 2006/0183538 | A1 | 8/2006 | Michaelson et al. |
| 2006/0189377 | A1 | 8/2006 | Gomez et al. |
| 2006/0252506 | A1 | 11/2006 | Walker et al. |
| 2006/0287077 | A1 | 12/2006 | Grav et al. |
| 2007/0004496 | A1 | 1/2007 | Gordon et al. |
| 2007/0032286 | A1 | 2/2007 | Muir |
| 2007/0054733 | A1 | 3/2007 | Baerlocher |
| 2007/0060297 | A1 | 3/2007 | Hein et al. |
| 2007/0060375 | A1 | 3/2007 | Hein et al. |
| 2007/0077979 | A1 * | 4/2007 | Cohn et al. ...................... 463/16 |
| 2007/0077990 | A1 | 4/2007 | Cuddy |
| 2007/0087811 | A1 | 4/2007 | Mayeroff |
| 2007/0105619 | A1 | 5/2007 | Kniesteadt |
| 2007/0105620 | A1 | 5/2007 | Cuddy |
| 2007/0155484 | A1 * | 7/2007 | Walker et al. ................... 463/25 |
| 2007/0155485 | A1 | 7/2007 | Cuddy |
| 2007/0167217 | A1 | 7/2007 | Kaminkow et al. |
| 2007/0207850 | A1 | 9/2007 | Darrah et al. |
| 2007/0213119 | A1 | 9/2007 | Baerlocher et al. |
| 2008/0020822 | A1 | 1/2008 | Cuddy |
| 2008/0026808 | A1 | 1/2008 | Yoshizawa |
| 2008/0076531 | A1 | 3/2008 | Baerlocher et al. |
| 2008/0076532 | A1 | 3/2008 | Graham et al. |
| 2008/0076542 | A1 | 3/2008 | Iddings et al. |
| 2008/0090650 | A1 | 4/2008 | Tarantino et al. |
| 2008/0090651 | A1 | 4/2008 | Baerlocher |
| 2008/0102916 | A1 | 5/2008 | Kovacs |
| 2008/0102920 | A1 | 5/2008 | Baerlocher |
| 2008/0102929 | A1 | 5/2008 | Inamura |

(56) References Cited

U.S. PATENT DOCUMENTS

| | | | | |
|---|---|---|---|---|
| 2008/0108401 | A1 | 5/2008 | Baerlocher et al. | |
| 2008/0108429 | A1 | 5/2008 | Davis et al. | |
| 2008/0113765 | A1 | 5/2008 | DeWaal | |
| 2008/0113770 | A1 * | 5/2008 | Gelber et al. | 463/25 |
| 2008/0139274 | A1 | 6/2008 | Baerlocher | |
| 2008/0148542 | A1 | 6/2008 | Mayeroff | |
| 2008/0176647 | A1 | 7/2008 | Acres | |
| 2008/0207304 | A1 | 8/2008 | Acres | |
| 2008/0207313 | A1 | 8/2008 | Acres | |
| 2008/0242402 | A1 * | 10/2008 | Joshi | 463/25 |
| 2009/0011822 | A1 | 1/2009 | Englman et al. | |
| 2009/0011823 | A1 | 1/2009 | Englman et al. | |
| 2009/0011824 | A1 | 1/2009 | Englman et al. | |
| 2009/0011826 | A1 | 1/2009 | Acres | |
| 2009/0036202 | A1 | 2/2009 | Baerlocher et al. | |
| 2009/0042644 | A1 | 2/2009 | Zielinski | |
| 2009/0075722 | A1 | 3/2009 | Louie et al. | |

FOREIGN PATENT DOCUMENTS

| | | |
|---|---|---|
| AU | 555905 | 10/1986 |
| AU | 567001 | 11/1987 |
| AU | 585160 | 6/1989 |
| AU | 589158 | 10/1989 |
| AU | 593059 | 2/1990 |
| AU | 630112 | 3/1990 |
| AU | 628330 | 9/1992 |
| AU | 633469 | 1/1993 |
| AU | 680920 | 2/1994 |
| AU | 649009 | 5/1994 |
| AU | 94/71515 | 8/1994 |
| AU | 655801 | 1/1995 |
| AU | 709724 | 2/1997 |
| AU | 96/69806 | 6/1997 |
| AU | 96/69807 | 6/1997 |
| AU | PO 7780 | 7/1997 |
| AU | 680920 | 8/1997 |
| AU | PO 9090 | 9/1997 |
| AU | 733599 | 10/1997 |
| AU | 97/45197 | 1/1998 |
| AU | 96/62115 | 2/1998 |
| AU | 97/45403 | 6/1998 |
| AU | 97/24645 | 7/1998 |
| AU | 97/43615 | 7/1998 |
| AU | 755826 | 8/1998 |
| AU | 98/74161 | 9/1998 |
| AU | 98/63553 | 10/1998 |
| AU | 98/63716 | 11/1998 |
| AU | 98/84162 | 3/1999 |
| AU | 98/87937 | 3/1999 |
| AU | 99/10969 | 5/1999 |
| AU | 707687 | 7/1999 |
| AU | 714299 | 8/1999 |
| AU | 99/17318 | 9/1999 |
| AU | 768285 | 9/1999 |
| AU | 711501 | 10/1999 |
| AU | 746082 | 10/1999 |
| AU | 756180 | 10/1999 |
| AU | 753102 | 11/1999 |
| AU | 765084 | 11/1999 |
| AU | 760617 | 1/2000 |
| AU | 716299 | 2/2000 |
| AU | 721968 | 7/2000 |
| AU | 722107 | 7/2000 |
| AU | 728788 | 1/2001 |
| AU | 744569 | 3/2001 |
| AU | 771847 | 3/2001 |
| AU | 2001 100032 | 11/2001 |
| AU | 2001 100033 | 11/2001 |
| AU | 748263 | 5/2002 |
| AU | 749222 | 6/2002 |
| AU | 754689 | 11/2002 |
| AU | 758306 | 3/2003 |
| DE | 3415114 | 11/1985 |
| DE | 3917683 | 12/1990 |
| EP | 0 342 797 | 11/1989 |
| EP | 0 444 932 | 2/1991 |
| EP | 0 433 420 | 1/1995 |
| EP | 0 798 676 | 10/1997 |
| EP | 0 874 337 | 10/1998 |
| EP | 0 952 563 | 2/1999 |
| EP | 0 926 645 | 6/1999 |
| EP | 0 944 030 | 9/1999 |
| EP | 1 063 622 | 12/2000 |
| EP | 1 637 196 | 9/2004 |
| EP | 1 467 329 | 10/2004 |
| EP | 1 498 860 | 1/2005 |
| EP | 1 513 114 | 3/2005 |
| EP | 1 528 516 | 5/2005 |
| EP | 1 528 517 | 5/2005 |
| GB | 2118445 | 11/1983 |
| GB | 2 137 392 | 10/1984 |
| GB | 2 139 390 | 11/1984 |
| GB | 2 153 572 | 8/1985 |
| GB | 2231189 | 11/1990 |
| GB | 2 282 690 | 4/1995 |
| GB | 2 328 311 | 2/1999 |
| GB | 2 387 703 | 10/2003 |
| JP | 7148307 | 6/1995 |
| WO | WO 95 22811 | 8/1995 |
| WO | WO 96 12262 | 4/1996 |
| WO | WO 96 24421 | 8/1996 |
| WO | WO 97 12338 | 4/1997 |
| WO | WO 97 27568 | 7/1997 |
| WO | WO 98 35309 | 8/1998 |
| WO | WO 98 47115 | 10/1998 |
| WO | WO 98 51384 | 11/1998 |
| WO | WO 99 03078 | 1/1999 |
| WO | WO 99 10849 | 3/1999 |
| WO | WO 99 60498 | 11/1999 |
| WO | WO 00 12186 | 3/2000 |
| WO | WO 00 32286 | 6/2000 |
| WO | WO 01 10523 | 2/2001 |
| WO | WO 01 15055 | 3/2001 |
| WO | WO 01 15790 | 3/2001 |
| WO | WO 03 030066 | 4/2003 |
| WO | WO 03 063019 | 7/2003 |
| WO | WO 2004 035161 | 4/2004 |
| WO | WO 2004 066061 | 8/2004 |
| WO | WO 2005 076193 | 8/2005 |
| WO | WO 2005 081623 | 9/2005 |
| WO | WO 2005 082480 | 9/2005 |
| WO | WO 2005 083599 | 9/2005 |
| WO | WO 2005 099425 | 10/2005 |
| WO | WO 2005 099845 | 10/2005 |
| WO | WO 2005 106702 | 11/2005 |
| WO | WO 2005 113093 | 12/2005 |
| WO | WO 2006 005073 | 1/2006 |
| WO | WO 2006 014770 | 2/2006 |
| WO | WO 2006 014833 | 2/2006 |
| WO | WO 2006 039366 | 4/2006 |
| WO | WO 2007 030670 | 3/2007 |
| WO | WO-2007/030670 A2 * | 3/2007 ............. A63F 13/00 |
| WO | WO 2007 130464 | 11/2007 |
| WO | WO 2007 139874 | 12/2007 |
| WO | WO 2007 139988 | 12/2007 |
| WO | WO 2008 011089 | 1/2008 |
| WO | WO 2008 048634 | 4/2008 |
| WO | WO 2008 063395 | 5/2008 |

OTHER PUBLICATIONS

Bally Slot Machines Electro-Mechanicals 1964-1980 Book [In Part], Revised 3rd Edition written by Marshall Fey.

Player Tracking on Slots, written by GRIPS Electronic GmbH, printed from website reported as archived on Feb. 20, 1997 (available at http://web.archive.org/web/19970220165921/www.grips.com/playtrac.htm).

Slot Machines A Pictorial History of the First 100 Years (pp. 216, 242 to 243), 5th edition, written by Marshall Fey, published in 1983-1997.

* cited by examiner

FIG. 4A

| Symbol Combination* | Probability of symbol combination being generated for first paytable* and for second paytable** | Average expected payout if symbol combination is generated for a game utilizing the first paytable | Contribution to total average expected payout percentage of gaming device if symbol combination is generated for a game utilizing the first paytable | Award provided to player if symbol combination is generated for a game utilizing the second paytable | Quantity of bonus event units funded in player's account if symbol combination is generated for a game utilizing the second paytable**** | Contribution to total average expected payout percentage of gaming device if symbol combination is generated for a game utilizing the second paytable |
|---|---|---|---|---|---|---|
| -- T -- -- -- | 0.175 | 0 | 0% | 0 | 9 | 3.94% |
| -- -- T -- -- | 0.148 | 0 | 0% | 0 | 9 | 3.33% |
| -- -- -- T -- | 0.068 | 0 | 0% | 0 | 9 | 1.53% |
| -- T T -- -- | 0.051 | 0 | 0% | 0 | 24 | 3.06% |
| -- T -- T -- | 0.023 | 0 | 0% | 0 | 24 | 1.38% |
| -- -- T T -- | 0.020 | 0 | 0% | 0 | 24 | 1.20% |
| -- T T T -- | 0.007 | 24.37 | 17.06% | 0 | 150 | 2.62% |
| | Total contribution to average expected payout percentage of gaming device provided in the form of bonus event units for a game utilizing the second paytable: | | | | | 17.06% |

* -- symbol represents a blank symbol or any other symbol which does not, by itself, trigger a secondary game
** First paytable utilized if player does not elect to participate in bonus event participation program
*** Second paytable utilized if player elects to participate in bonus event participation program
**** Player wagering at 25 credits per game played to utilize second paytable

FIG. 4B

| Symbol Combination* | Probability of symbol combination being generated for first paytable* and for second paytable** | Average expected payout if symbol combination is generated for a game utilizing the first paytable | Contribution to total average expected payout percentage of gaming device if symbol combination is generated for a game utilizing the first paytable | Award provided to player if symbol combination is generated for a game utilizing the second paytable | Quantity of bonus event units funded in player's account if symbol combination is generated for a game utilizing the second paytable**** | Contribution to total average expected payout percentage of gaming device if symbol combination is generated for a game utilizing the second paytable |
|---|---|---|---|---|---|---|
| -- T -- -- -- | 0.175 | 0 | 0% | 0 | 9 | 3.94% |
| -- -- T -- -- | 0.148 | 0 | 0% | 0 | 9 | 3.33% |
| -- -- -- T -- | 0.068 | 0 | 0% | 0 | 9 | 1.53% |
| -- T T -- -- | 0.051 | 0 | 0% | 0 | 24 | 3.06% |
| -- T -- T -- | 0.023 | 0 | 0% | 0 | 24 | 1.38% |
| -- -- T T -- | 0.020 | 0 | 0% | 0 | 24 | 1.20% |
| -- T T T -- | 0.007 | 20.43 | 14.30% | 0 | 150 | 2.62% |
| | Total contribution to average expected payout percentage of gaming device provided in the form of bonus event units for a game utilizing the second paytable: | | | | | 17.06% |

* -- symbol represents a blank symbol or any other symbol which does not, by itself, trigger a secondary game
** First paytable utilized if player does not elect to participate in bonus event participation program
*** Second paytable utilized if player elects to participate in bonus event participation program
**** Player wagering at 25 credits per game played to utilize second paytable

FIG. 7

| Player | Exchanged Quantitiy of Bonus Event Units | Applicable Multiplier | Modified award after 1st round | Modified award after 2nd round | Modified award after 3rd round | Modified award after 4th round |
|---|---|---|---|---|---|---|
| A | 500 | 10X | $8.00 | $10.00 | | |
| B | 1500 | 30X | $12.50 | $21.40 | $36.65 | $45.00 |
| C | 200 | 4X | $2.15 | | | |
| D | 100 | 2X | $5.60 | | | |
| E | 900 | 18X | $3.85 | | | |
| F | 50 | 1X | $1.25 | | | |
| G | 2500 | 50X | $18.35 | $25.80 | $32.35 | |
| H | 250 | 5X | $7.25 | $10.15 | $41.20 | $43.75 |
| I | 350 | 7X | $6.50 | $9.80 | | |
| J | 150 | 3X | $3.70 | | | |

FIG. 10

| Player | Amount of bonus event units in player's account | Quantity of available auction points to use in auction bidding sequence | Amount of bid in auction bidding sequence | Award for bonus event provided to player that placed the winning bid | Actual value for each redeemed bonus event unit |
|---|---|---|---|---|---|
| A | $18.00 | 600 | 500 | $75.00 | $0.04 |
| B | $12.60 | 420 | 340 | | |
| C | $36.90 | 1203 | 495 | | |

FIG. 11

| Ranking in Auction | Player | Applicable Paytable | | |
|---|---|---|---|---|
| | | Multiplier | Probability of being Selected | Average Expected Multiplier |
| 1 | Player B | 1X | 25% | 3X |
| | | 2X | 30% | |
| | | 3X | 20% | |
| | | 4X | 15% | |
| | | 5X | 5% | |
| | | 10X | 3% | |
| | | 20X | 2% | |
| 2 | Player A | 1X | 29% | 2.9X |
| | | 2X | 28% | |
| | | 3X | 21% | |
| | | 4X | 13% | |
| | | 5X | 4% | |
| | | 10X | 3% | |
| | | 20X | 2% | |
| 3 | Player C | 1X | 30% | 2.8X |
| | | 2X | 30% | |
| | | 3X | 24% | |
| | | 4X | 7% | |
| | | 5X | 4% | |
| | | 10X | 3% | |
| | | 20X | 2% | |

SERVER BASED GAMING SYSTEM AND METHOD FOR PROVIDING DEFERRAL OF BONUS EVENTS

PRIORITY CLAIM

This application is a continuation of, claims priority to and the benefit of U.S. patent application Ser. No. 12/267,156, filed on Nov. 7, 2008, the entire contents of which is incorporated by reference herein.

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

BACKGROUND

Gaming machines which provide players awards in primary games are well known. Gaming machines generally require the player to place or make a wager to activate the primary game. In many of these gaming machines, the award is based on the player obtaining a winning symbol or symbol combination and on the amount of the wager (e.g., the higher the wager, the higher the award). Symbols or symbol combinations which are less likely to occur usually provide higher awards.

Secondary games are also known in gaming machines. Secondary games usually do not require an additional wager by the player to be activated and provide an additional award, such as a secondary game award, to the player. The awards provided for such secondary games are calculated into or taken into account in the total average expected payout percentage of the gaming machines. Thus, the total average expected payout percentage or the total gaming machine return of such known gaming machines is the average expected payback percentage of the primary game plays plus the average expected payout percentage of the secondary game plays. In certain secondary games, the contribution of the secondary game accounts for around 30% of the total gaming machine return and typically varies within the range of 10% to 50% of the total gaming machine return. For example, a gaming machine having a total gaming machine return of 95% may include a primary game with 65% contribution to that total return and a secondary game with 30% contribution to that total return. It should be appreciated that gaming machine manufactures spend a significant amount of time and cost in developing the paytables utilized in determining the total gaming machine return (i.e., the paytables that account for the primary game and any secondary games of the gaming machine).

In certain known gaming machines, secondary games are activated or triggered upon an occurrence of a triggering symbol or triggering symbol combination in the primary game. For instance, a triggering symbol combination of three triggering symbols occurring on the payline (i.e., one triggering symbol on each reel) of a three reel slot machine may initiate a secondary game. In the gaming machine software of these gaming machines, the triggering symbols or the triggering symbol combinations are identified or otherwise flagged. When the triggering symbols or the triggering symbol combinations generated in the primary game are analyzed by the gaming machine's software, if a flag is associated with the analyzed triggering symbols or triggering symbol combinations, the gaming machine's software triggers the secondary game. That is, these gaming machines include symbol-driven secondary games which are triggered by the gaming machine. It should be appreciated that since these are game defined triggering symbols or triggering symbol combinations, the frequency and payouts are determined by the number of triggering symbols available, the likelihood that each triggering symbol is generated in an activation or play of the game and the randomness of such generations, and thus are considered an integral part of the game and the characteristic of the gaming machine.

Other known gaming machines include one or more secondary games that are selectively activated by the player. In these gaming machines, if the player is qualified to do so, the player decides when to play the bonus game. One such gaming machine enables a player to collect or accumulate designated symbols as such designated symbols are generated in the primary game. When enough designated symbols have been accumulated, the player can choose to participate in a secondary game by exchanging one or more of their accumulated designated symbols for one or more plays of the secondary game. Since qualifying to participate in such secondary games is based on accumulating enough designated symbols in the primary game, the frequency and payouts for such selectively accessed secondary games are determined by the number of designated symbols available, the likelihood of each designated symbol being generated and the randomness of such generations and thus are considered an integral part of the gaming device and the characteristic of the gaming machine.

Certain other known gaming machines trigger mystery secondary games (which provide mystery secondary game awards) without any apparent reason to the player. These gaming machines trigger and display a mystery secondary game (and provide a player any mystery secondary game award in the mystery secondary game) independent of any displayed event in or based specifically on any of the displayed plays of any primary game. Such mystery secondary game awards typically account for a smaller contribution to the total gaming machine return and are considered separate from the primary game (i.e., these mystery secondary games are sometimes said to sit on top of any existing primary games and any existing symbol-driven secondary games). One example of a known mystery bonus game includes enabling a player to play for one of a plurality of simultaneously maintained progressive awards arranged in a multi-level progressive ("MLP") configuration. It should be appreciated that many of these known mystery bonus games require the gaming machine's software to trigger such mystery secondary games and further to work in conjunction with any other symbol-driven secondary games.

Gaming system delivered or gaming system triggered mystery secondary games are also known. Gaming system mystery secondary games are triggered from a central server, central controller or remote host (i.e., independent from any gaming machine). Such gaming system mystery secondary games are configured to be delivered to or associated with any suitable game played on a suitable gaming machine in the gaming system without having special game software or code associated with these suitable gaming machines. However, these gaming system triggered mystery secondary games typically only add less than 1% to the gaming machine average expected total return. That is, a player would have to wager $100 to be provided an additional average secondary game award of $1 as a gaming system mystery secondary game award. Accordingly, such gaming system mystery secondary games usually require many gaming machines to be in the gaming system and operate relatively long times between payouts of substantial sized mystery secondary game awards (which are thus provided to a few players at the expense of many other players).

Accordingly, there is a continuing need to provide new and different gaming machines and gaming systems as well as new and different ways to provide awards to players.

SUMMARY

In various embodiments, the gaming system and method disclosed herein provides for one or more randomly triggered symbol based secondary games to be skipped, deferred or otherwise not provided to the players by the gaming devices which triggered such secondary games. In one such embodiment, for each skipped secondary game, a quantity of bonus event units, credits, points or counts is contributed to or accumulated in a player account associated with the player that enrolled to defer or skip such triggered secondary games. Each bonus event unit contributed to a player's account has a theoretical value or average expected value which is based on the average expected payout of the skipped secondary game. The gaming system and method disclosed herein thus incorporates a level of randomness in providing these bonus event units to players and also enables gaming system manufacturers to control an amount of volatility in the accumulation of these bonus event units.

The gaming system and method disclosed herein further enables the player to accumulate such bonus event units until the player decides to selectively redeem one or more bonus event units in exchange for one or more plays of one or more bonus events. In one embodiment, to provide an increased level of volatility in the redemption of these bonus event units, the selected bonus event includes at least one random determination, wherein the actual award provided to the player for the bonus event is based, at least in part, on the exchanged for quantity of bonus event units and the result of this random determination. Accordingly, various embodiments of the gaming system disclosed herein provides for a triggered secondary game to be converted to a quantity of bonus event units which the player may subsequently redeem to play one or more different bonus events to win one or more awards. That is, the gaming system and method disclosed herein provides for an exchange of an average expected payout of a secondary game for a subsequent bonus event award opportunity which is provided via one or more different bonus event mechanisms.

More specifically, in one embodiment, the gaming system disclosed herein includes a central server configured to communicate with a plurality of gaming devices. The gaming system enables a player to participate or otherwise enroll in a bonus event participation feature or program described herein. If the player decides to participate in the bonus event participation feature, the gaming system: (1) establishes or otherwise accesses a player account for that player, and (2) causes a modification of one or more of the available payouts from the player's currently played primary game.

In one embodiment, such a modification of one or more of the available payouts from the player's currently played primary game includes identifying one or more secondary game triggering elements and flagging such identified secondary game triggering elements to skip or defer one or more of any associated secondary games. That is, for each skipped or deferred secondary game, the gaming system removes or changes an association of triggering that secondary game with such identified secondary game triggering elements for such secondary game. In one embodiment, the secondary game triggering elements include the secondary game triggering symbols of the symbol combination which causes a trigger of a secondary game (and thus is associated with the average expected payout of the secondary game). In other embodiments, the secondary game triggering elements also (or alternatively) include one or more symbols which do not, when generated by themselves, trigger a secondary game, but trigger a secondary game in combination with other symbols.

In one embodiment, after flagging such secondary game triggering elements to skip or defer any associated secondary game, the modification of one or more of the available payouts from the player's currently played primary game includes designating such identified secondary game triggering elements as bonus event unit generating elements or bonus event unit generating symbols. That is, the gaming system: (i) identifies one or more secondary game triggering elements which either trigger a secondary game or are part of a symbol combination which trigger a secondary game, (ii) flags such identified secondary game triggering elements to skip or defer any secondary game which is triggered when such secondary game triggering elements are generated (either alone or in combination with other symbols), and (iii) designates such identified secondary game triggering elements as bonus event unit generating elements or symbols.

In one embodiment, if a player enrolls or is enrolled in the bonus event participation feature, to account for the average expected payout of any skipped secondary games, in modifying the payouts available, the gaming system determines and assigns a quantity of bonus event units, credits, points or counts for each symbol combination which includes at least one designated bonus event unit generating element or symbol. Such determination and assignment includes a reallocation or a redistribution of the average expected payout of any skipped secondary games amongst one or more symbol combinations which includes such designated bonus event unit generating symbols. For example of one embodiment, if a secondary game represents 12% of the total average expected payout of a gaming device, to account for this 12% that is not provided to the player in the form of this secondary game, the gaming system determines a quantity of bonus event units for each symbol combination that includes at least one designated bonus event unit generating symbol. In this example, the gaming system determines and assigns: (i) a quantity of nine bonus event units (i.e., a virtual or theoretical amount equivalent to \$0.09) to any symbol combination which includes only one designated bonus event unit generating symbol; (ii) a quantity of twenty-four bonus event units (i.e., a virtual or theoretical amount equivalent to \$0.24) to any symbol combination which includes only two designated bonus event unit generating symbols; and (iii) a quantity of one-hundred-fifty bonus event units (i.e., a virtual or theoretical amount equivalent to \$1.50) to any symbol combination which includes three designated bonus event unit generating symbols. It should be appreciated that in this example, rather than providing 12% of the total average expected payout of the gaming device via a secondary game that is triggered if one specific or designated symbol combination is generated, the gaming system reallocates such 12% of the total average expected payout of the gaming device and provides: (i) 6.19% of the total average expected payout of the gaming device to the player in the form of at least nine bonus event units if any symbol combination which includes only one designated bonus event unit generating symbol is generated; (ii) 3.97% of the total average expected payout of the gaming device to the player in the form of at least twenty-four bonus event units if any symbol combination which includes only two designated bonus event unit generating symbols are generated; and (iii) 1.84% of the total average expected payout of the gaming device to the player in the form of at least one-hundred-fifty bonus event units if any symbol combination which includes three designated bonus event unit generating symbols are generated. Accordingly, this reallocation or redistribution provides that the generation of one or more symbols which did not previously contribute to the total average expected payout of the gaming device (i.e., one or more symbols which did not by themselves trigger a secondary game, but triggered a secondary game in combination with other symbols and thus previously contributed 0% to the total average expected payout of the gaming device) will contribute to the total average expected payout of the gaming device in the form of bonus event units.

In operation of one embodiment, if the player elects to participate in the bonus event participation program (i.e., an accumulation mode is enabled), the gaming system enables a player to play one or more primary games utilizing a paytable which accounts for such modified available payouts. In this embodiment, if a bonus event unit accumulation event occurs (such as the gaming device causing one of the designated bonus event unit generating symbols to occur in association with one of the played primary games), the gaming system defers, withholds or otherwise skips any secondary game associated with the designated bonus event unit generating symbol. Moreover, if the gaming device causes one of the designated bonus event unit generating symbols to occur, the gaming system further credits or funds the player's account with a quantity of bonus event units. That is, rather than displaying a secondary game to be played in association with the occurrence of a secondary game triggering event, the gaming system disclosed herein funds a player's account with an amount of bonus event units (to be used by the player for play of a bonus event, but not for play of a primary game). It should be appreciated that each bonus event unit has a theoretical value or average expected value which is based on the average expected payout of the skipped secondary game or payout. That is, prior to being redeemed, each bonus event unit has a theoretical value because an actual value for such bonus event units cannot be determined until one or more random determinations occur in association with the redemption of such bonus event units (as described below).

In one embodiment, if a bonus event unit accumulation event occurs and the gaming system determines to fund a player's account with one or more bonus event units, the gaming system determines a number or quantity of bonus event units to fund the player's account based on one or more aspects or game parameters of the player's gaming experience. In one such embodiment, the amount of funded bonus event units is based on the specific designated bonus event unit generating symbol which occurred and the player's wager associated with the occurrence of the designated bonus event unit generating symbol. For example, if a first symbol combination including only one secondary game triggering element (identified as one bonus event unit generating symbol) is generated and a player wagered one credit on the payline which generated this first symbol combination, the gaming system credits the player's account with nine bonus event units (i.e., a virtual or theoretical amount equivalent to $0.09). In this example, if a second symbol combination including only two secondary game triggering elements (identified as two bonus event unit generating symbols) is generated and a player wagered one credit on the payline which generated this second symbol combination, the gaming system credits the player's account with twenty-four bonus event units (i.e., a virtual or theoretical amount equivalent to $0.24). In a different example, if a third symbol combination including three secondary game triggering elements (identified as three bonus event unit generating symbols) is generated and a player wagered one credit on the payline which generated this third symbol combination, the gaming system credits the player's account with one-hundred-fifty bonus event units (i.e., a virtual or theoretical amount equivalent to $1.50). In this example, if the third symbol combination including three secondary game triggering elements (identified as three bonus event unit generating symbols) is generated and a player wagered four credits on the payline which generated this third symbol combination, the gaming system credits the player's account with six-hundred bonus event units (i.e., a virtual or theoretical amount equivalent to $6.00). It should be appreciated that in different embodiments, the gaming system tracks the funded quantity of bonus event units as points, counts or otherwise using one or more meters.

In addition to enabling one or more players to each skip any triggered secondary games in exchange for funding that player's account with an amount of bonus event units, the gaming system and method disclosed herein further enables these players to redeem such bonus event units to participate in one or more bonus events or group bonus events. That is, the gaming system includes one or more redemption modes or bonus event unit redemption events that provide one or more players the opportunity to exchange some or all of their accumulated bonus event units for one or more plays of a bonus event to win one or more awards. In one embodiment, upon an occurrence of a bonus event redemption trigger, the gaming system enables any player with a designated or qualifying amount of bonus event units to participate (or attempt to participate) in a bonus event. In one such embodiment, the gaming system utilizes part or all of a display device on one or more gaming devices to display: (i) the quantity of bonus event units in the player's account, (ii) the currently available bonus events, (iii) any upcoming bonus events, (iv) the amount of bonus event units that must be redeemed or exchanged to participate in such bonus events, or (v) any other information related to the players account or one or more bonus events.

In one embodiment, depending on the specific bonus event the player elects to participate in (or elects to attempt to participate in), the gaming system converts the player's bonus event units to different forms of bonus event components or bonus event currency for that elected bonus event. For example, if a player elects to participate in a competitive group free spin bonus event, the gaming system converts each set of fifty bonus event units (i.e., a virtual or theoretical amount equivalent to $0.50) in the player's account to a 1×multiplier to be used in the competitive group free spin bonus event. In another example, if the player elects to participate in an ongoing maze or path-type group bonus event, the gaming system converts each set of three bonus event units (i.e., a virtual or theoretical amount equivalent to $0.03) in the player's account to one step or move in the maze or path-type game. In another example, if the player elects to participate in a point based auction type bonus event (to win a play of a bonus sequence), the gaming system converts each set of three bonus event units (i.e., a virtual or theoretical amount equivalent to $0.03) in the player's account to one point to bid in the point based auction-type game. Accordingly, the gaming system and method disclosed herein provides that in exchange for deferring or skipping one or more secondary games, a player's account is credited with a quantity of bonus event units which are subsequently converted to one or more bonus event components based on the type of bonus event the player elects to participate in.

In one embodiment, the gaming system configures or modifies one or more aspects of the specific bonus event the player elects to participate in based on the quantity of bonus event units the player redeemed to participate in such bonus event. In this embodiment, the gaming system determines, based on the average expected value of the redeemed bonus event units and the quantity of bonus event units the player elected to redeem to participate in the bonus event, an average expected payout for the bonus event the player elected to participate in. Based on this determined average expected value for the bonus event, the gaming system determines one or more aspects or features of the bonus event to provide to the player. For example, if a player participates in an auction sequence (to play a bonus sequence) and wins the auction sequence by redeeming one-thousand bonus event units, the gaming system determines that these one-thousand bonus event units are associated with an average expected payout of $30.00. In this example, if the bonus sequence provided to the player for winning the auction is a free spin sequence, the gaming system configures the bonus sequence (such as selecting a number of free spins and/or a multiplier to apply to each free spin) such that the provided free spin bonus sequence will have an approximate average expected payout of $30.00.

In one embodiment, after determining which bonus event, if any, the player will participate in and determining the configuration of such a bonus event, the gaming system randomly determines and displays a bonus event award in the participated bonus event. For example, if the player elects to redeem one-thousand bonus event units to participate in a competitive group free spin bonus event with an applicable multiplier of 20× and the gaming system randomly determines an award of $25.00 for such free spins, the player's virtual account is reduced by one-thousand bonus event units and the player's credit meter is increased by $25.00. It should be appreciated that in this embodiment, the actual value of the player's redeemed bonus event units are determined based on the randomly determined bonus event award and the quantity of bonus event units the player redeemed to participate in the bonus event. For example, if a first player redeems one-thousand bonus event units from their player account and is provided a bonus event award of $10.00, then each of the first player's bonus event units has an actual value of $0.01. In this example, if a second player redeems one-thousand bonus event units from their player account and is provided, in the same or a different bonus event, a bonus event award of $40.00, then each of the second player's bonus event units has an actual value of $0.04. Thus, the gaming system disclosed herein provides bonus event units that have a theoretical or average expected value prior to being redeemed and have an actual value after being redeemed, wherein the theoretical value and the actual value may differ.

Accordingly, the gaming system disclosed herein provides for the accumulation of a plurality of secondary game triggering events (or the accumulation of a plurality of bonus event unit generating symbols) and the contribution of the average expected payouts of these accumulated events (in the form of bonus event units or points) to a player account which are subsequently utilized by the player for one or more awards. The gaming system disclosed herein further provides that a plurality of different primary games played at gaming machines from the same gaming machine manufacturer and/or a plurality of different primary games at gaming machines from different gaming machine manufacturers may each contribute a quantity of bonus event units to one or more player's accounts. Such players may redeem these bonus event units to participate in one or more bonus events that are provided to such different gaming machines via one or more remote servers, such as a remote server controlled by the gaming establishment. Such a configuration of accumulating bonus event units via a local gaming device and redeeming such bonus event units via a remote server thus enables a gaming establishment operator to differentiate their gaming establishment by offering a distinct product mix which includes providing incentives to players in the form of bonus event units and further offering a mix of bonus events (unique to that gaming establishment) to players in exchange for these accumulated bonus event units.

Additional features and advantages are described in, and will be apparent from, the following Detailed Description and the figures.

BRIEF DESCRIPTION OF THE FIGURES

FIGS. 4A and 4B are charts of different embodiments of the gaming system disclosed herein illustrating a plurality of bonus event unit generating symbol combinations and the quantity of bonus event units associated with each.

FIG. 7 is a chart of one embodiment of the gaming system disclosed herein illustrating the results of a free spin bonus event.

FIG. 10 is a chart of one embodiment of the gaming system disclosed herein illustrating the results of an auction bidding sequence and the resulting bonus event award provided to the player that placed the winning bid.

FIG. 11 is a chart of another embodiment of the gaming system disclosed herein illustrating the results of an auction bidding sequence and the different paytables offered to the players that did not win the auction bidding sequence but may still want to participate in a bonus event.

DETAILED DESCRIPTION

The present disclosure may be implemented in various configurations for gaming machines or gaming devices, including but not limited to: (1) a dedicated gaming machine or gaming device, wherein the computerized instructions for controlling any games (which are provided by the gaming machine or gaming device) are provided with the gaming machine or gaming device prior to delivery to a gaming establishment; and (2) a changeable gaming machine or gaming device, where the computerized instructions for controlling any games (which are provided by the gaming machine or gaming device) are downloadable to the gaming machine or gaming device through a data network when the gaming machine or gaming device is in a gaming establishment. In one embodiment, the computerized instructions for controlling any games are executed by at least one central server, central controller or remote host. In such a "thin client" embodiment, the central server remotely controls any games (or other suitable interfaces) and the gaming device is utilized to display such games (or suitable interfaces) and receive one or more inputs or commands from a player. In another embodiment, the computerized instructions for controlling any games are communicated from the central server, central controller or remote host to a gaming device local processor and memory devices. In such a "thick client" embodiment, the gaming device local processor executes the communicated computerized instructions to control any games (or other suitable interfaces) provided to a player.

In one embodiment, one or more gaming devices in a gaming system may be thin client gaming devices and one or more gaming devices in the gaming system may be thick client gaming devices. In another embodiment, certain functions of the gaming device are implemented in a thin client environment and certain other functions of the gaming device are implemented in a thick client environment. In one such embodiment, computerized instructions for controlling any primary games are communicated from the central server to the gaming device in a thick client configuration and computerized instructions for controlling any secondary games or bonus functions are executed by a central server in a thin client configuration.

Figure 1A:
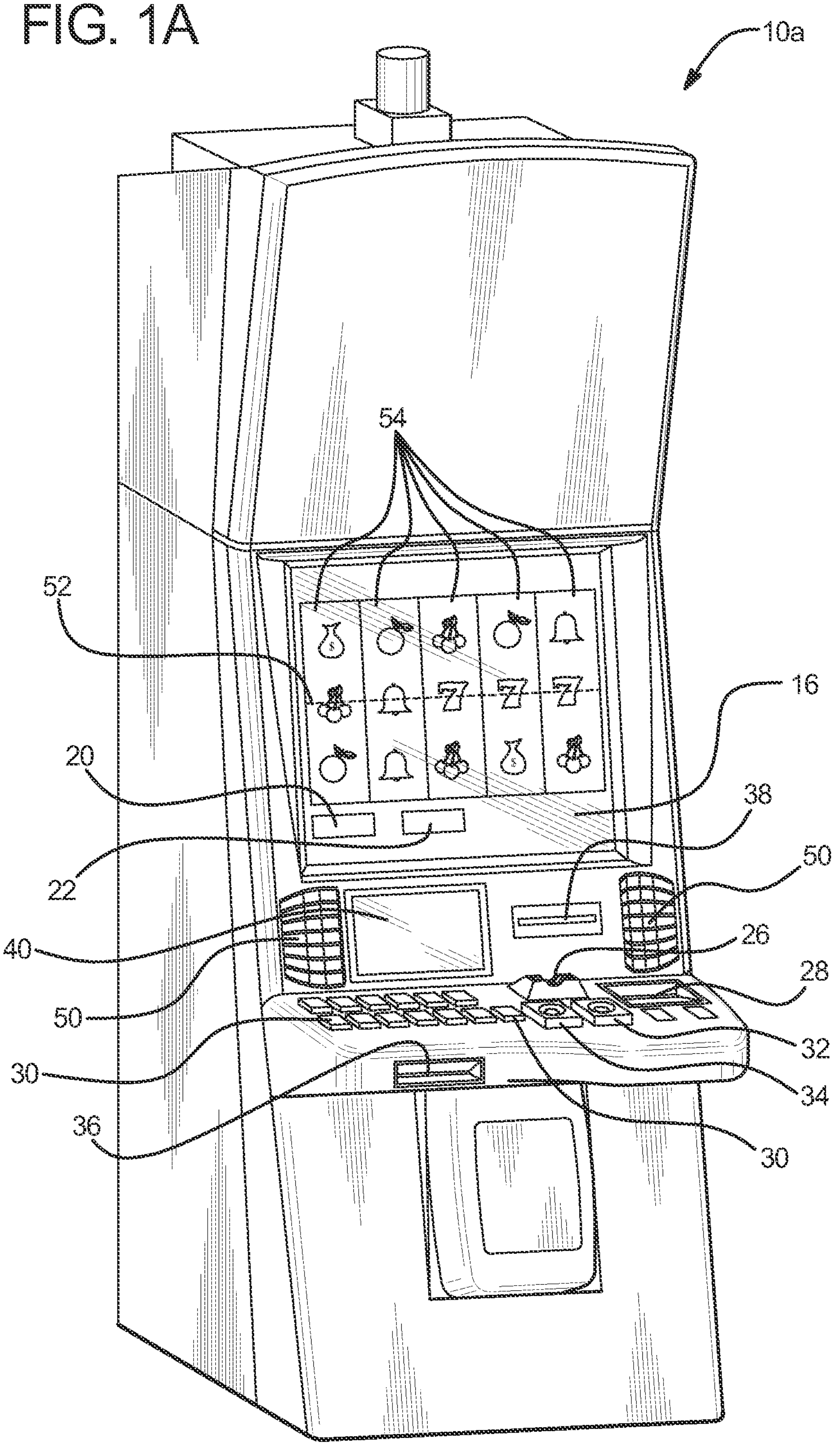
FIGS. 1A and 1B are front perspective views of alternative embodiments of gaming devices disclosed herein.
Figure 1B:
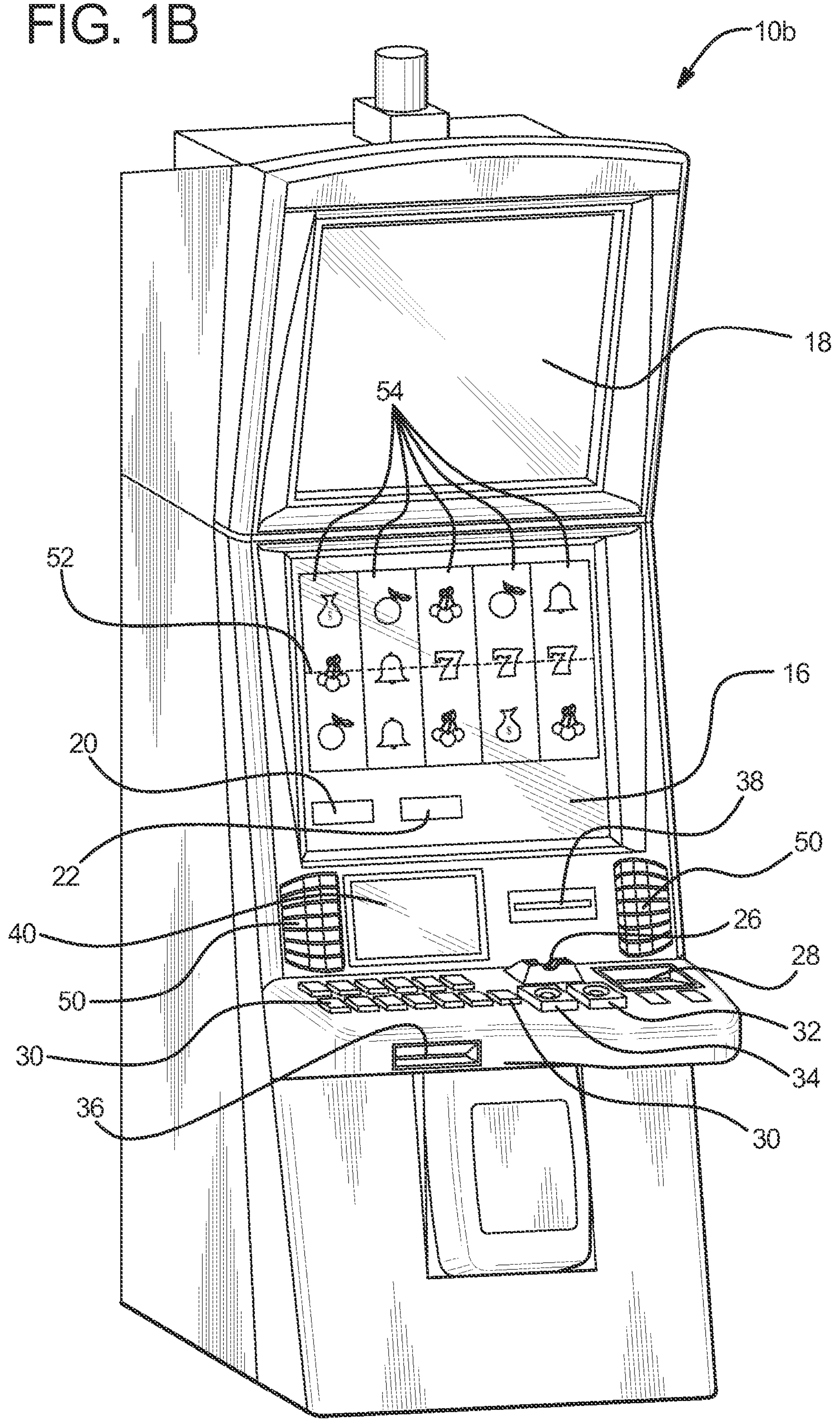

Referring now to the drawings, two example alternative embodiments of the gaming device disclosed herein are illustrated in FIGS. 1A and 1B as gaming device 10*a* and gaming device 10*b*, respectively. Gaming device 10*a* and/or gaming device 10*b* are generally referred to herein as gaming device 10.

In the embodiments illustrated in FIGS. 1A and 1B, gaming device 10 has a support structure, housing or cabinet which provides support for a plurality of displays, inputs, controls and other features of a conventional gaming machine. R is configured so that a player can operate it while standing or sitting. The gaming device may be positioned on a base or stand or can be configured as a pub-style table-top game (not shown) which a player can operate preferably while sitting. As illustrated by the different configurations shown in FIGS. 1A and 1B, the gaming device may have varying cabinet and display configurations.

Figure 2A:
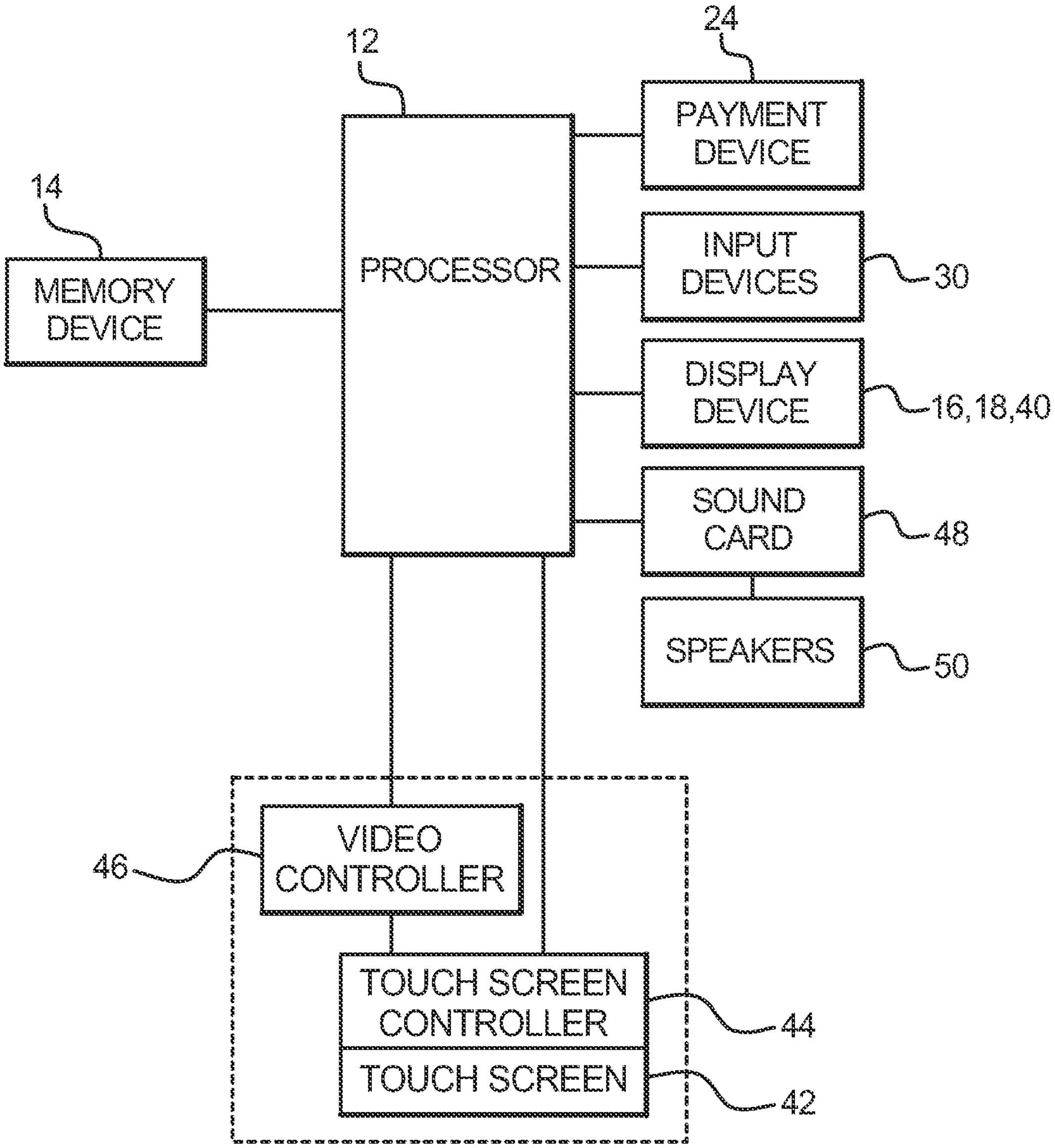
FIG. 2A is a schematic block diagram of the electronic configuration of one embodiment of a gaming device disclosed herein.

In one embodiment, as illustrated in FIG. 2A, the gaming device preferably includes at least one processor 12, such as a microprocessor, a microcontroller-based platform, a suitable integrated circuit or one or more application-specific integrated circuits (ASIC's). The processor is in communication with or operable to access or to exchange signals with at least one data storage or memory device 14. In one embodiment, the processor and the memory device reside within the cabinet of the gaming device. The memory device stores program code and instructions, executable by the processor, to control the gaming device. The memory device also stores other data such as image data, event data, player input data, random or pseudo-random number generators, pay-table data or information and applicable game rules that relate to the play of the gaming device. In one embodiment, the memory device includes random access memory (RAM), which can include non-volatile RAM (NVRAM), magnetic RAM (MRAM), ferroelectric RAM (FeRAM) and other forms as commonly understood in the gaming industry. In one embodiment, the memory device includes read only memory (ROM). In one embodiment, the memory device includes flash memory and/or EEPROM (electrically erasable programmable read only memory). Any other suitable magnetic, optical and/or semiconductor memory may operate in conjunction with the gaming device disclosed herein.

In one embodiment, part or all of the program code and/or operating data described above can be stored in a detachable or removable memory device, including, but not limited to, a suitable cartridge, disk, CD ROM, DVD or USB memory device. In other embodiments, part or all of the program code and/or operating data described above can be downloaded to the memory device through a suitable network.

In one embodiment, an operator or a player can use such a removable memory device in a desktop computer, a laptop personal computer, a personal digital assistant (PDA), portable computing device, or other computerized platform to implement the present disclosure. In one embodiment, the gaming device or gaming machine disclosed herein is operable over a wireless network, such as part of a wireless gaming system. In this embodiment, the gaming machine may be a hand held device, a mobile device or any other suitable wireless device that enables a player to play any suitable game at a variety of different locations. It should be appreciated that a gaming device or gaming machine as disclosed herein may be a device that has obtained approval from a regulatory gaming commission or a device that has not obtained approval from a regulatory gaming commission. It should be appreciated that the processor and memory device may be collectively referred to herein as a "computer" or "controller."

In one embodiment, as discussed in more detail below, the gaming device randomly generates awards and/or other game outcomes based on probability data. In one such embodiment, this random determination is provided through utilization of a random number generator (RNG), such as a true random number generator, a pseudo random number generator or other suitable randomization process. In one embodiment, each award or other game outcome is associated with a probability and the gaming device generates the award or other game outcome to be provided to the player based on the associated probabilities. In this embodiment, since the gaming device generates outcomes randomly or based upon one or more probability calculations, there is no certainty that the gaming device will ever provide the player with any specific award or other game outcome.

In another embodiment, as discussed in more detail below, the gaming device employs a predetermined or finite set or pool of awards or other game outcomes. In this embodiment, as each award or other game outcome is provided to the player, the gaming device flags or removes the provided award or other game outcome from the predetermined set or pool. Once flagged or removed from the set or pool, the specific provided award or other game outcome from that specific pool cannot be provided to the player again. This type of gaming device provides players with all of the available awards or other game outcomes over the course of the play cycle and guarantees the amount of actual wins and losses.

In another embodiment, as discussed below, upon a player initiating game play at the gaming device, the gaming device enrolls in a bingo game. In this embodiment, a bingo server calls the bingo balls that result in a specific bingo game outcome. The resultant game outcome is communicated to the individual gaming device to be provided to a player. In one embodiment, this bingo outcome is displayed to the player as a bingo game and/or in any form in accordance with the present disclosure.

In one embodiment, as illustrated in FIG. 2A, the gaming device includes one or more display devices controlled by the processor. The display devices are preferably connected to or mounted to the cabinet of the gaming device. The embodiment shown in FIG. 1A includes a central display device 16 which displays a primary game. This display device may also display any suitable secondary game associated with the primary game as well as information relating to the primary or secondary game. The alternative embodiment shown in FIG. 1B includes a central display device 16 and an upper display device 18. The upper display device may display the primary game, any suitable secondary game associated or not associated with the primary game and/or information relating to the primary or secondary game. These display devices may also serve as digital glass operable to advertise games or other aspects of the gaming establishment. As seen in FIGS. 1A and 1B, in one embodiment, the gaming device includes a credit display 20 which displays a player's current number of credits, cash, account balance or the equivalent. In one embodiment, the gaming device includes a bet display 22 which displays a player's amount wagered. In one embodiment, as described in more detail below, the gaming device includes a player tracking display 40 which displays information regarding a player's playing tracking status.

In another embodiment, at least one display device may be a mobile display device, such as a PDA or tablet PC, that enables play of at least a portion of the primary or secondary game at a location remote from the gaming device.

The display devices may include, without limitation, a monitor, a television display, a plasma display, a liquid crystal display (LCD) a display based on light emitting diodes (LED), a display based on a plurality of organic light-emitting diodes (OLEDs), a display based on polymer light-emitting diodes (PLEDs), a display based on a plurality of surface-conduction electron-emitters (SEDs), a display including a projected and/or reflected image or any other suitable electronic device or display mechanism. In one embodiment, as described in more detail below, the display device includes a touch-screen with an associated touch-screen controller. The display devices may be of any suitable size and configuration, such as a square, a rectangle or an elongated rectangle.

The display devices of the gaming device are configured to display at least one and preferably a plurality of game or other suitable images, symbols and indicia such as any visual representation or exhibition of the movement of objects such as mechanical, virtual or video reels and wheels, dynamic lighting, video images, images of people, characters, places, things and faces of cards, and the like.

In one alternative embodiment, the symbols, images and indicia displayed on or of the display device may be in mechanical form. The display device may include any electromechanical device, such as one or more mechanical objects, such as one or more rotatable wheels, reels or dice, configured to display at least one or a plurality of game or other suitable images, symbols or indicia.

As illustrated in FIG. 2A, in one embodiment, the gaming device includes at least one payment device 24 in communication with the processor. As seen in FIGS. 1A and 1B, a payment device such as a payment acceptor includes a note, ticket or bill acceptor 28 wherein the player inserts paper money, a ticket or voucher and a coin slot 26 where the player inserts money, coins, or tokens. In other embodiments, payment devices such as readers or validators for credit cards, debit cards or credit slips may accept payment. In one embodiment, a player may insert an identification card into a card reader of the gaming device. In one embodiment, the identification card is a smart card having a programmed microchip or a magnetic strip coded with a player's identification, credit totals (or related data) and other relevant information. In another embodiment, a player may carry a portable device, such as a cell phone, a radio frequency identification tag or any other suitable wireless device, which communicates a player's identification, credit totals (or related data) and other relevant information to the gaming device. In one embodiment, money may be transferred to a gaming device through electronic funds transfer. When a player funds the gaming device, the processor determines the amount of funds entered and displays the corresponding amount on the credit or other suitable display as described above.

As seen in FIGS. 1A, 1B and 2A, in one embodiment the gaming device includes at least one and preferably a plurality of input devices 30 in communication with the processor. The input devices can include any suitable device which enables the player to produce an input signal which is received by the processor. In one embodiment, after appropriate funding of the gaming device, the input device is a game activation device, such as a play button 32 or a pull arm (not shown) which is used by the player to start any primary game or sequence of events in the gaming device. The play button can be any suitable play activator such as a bet one button, a max bet button or a repeat the bet button. In one embodiment, upon appropriate funding, the gaming device begins the game play automatically. In another embodiment, upon the player engaging one of the play buttons, the gaming device automatically activates game play.

In one embodiment, one input device is a bet one button. The player places a bet by pushing the bet one button. The player can increase the bet by one credit each time the player pushes the bet one button. When the player pushes the bet one button, the number of credits shown in the credit display preferably decreases by one, and the number of credits shown in the bet display preferably increases by one. In another embodiment, one input device is a bet max button (not shown) which enables the player to bet the maximum wager permitted for a game of the gaming device.

In one embodiment, one input device is a cash out button 34. The player may push the cash out button and cash out to receive a cash payment or other suitable form of payment corresponding to the number of remaining credits. In one embodiment, when the player cashes out, a payment device, such as a ticket, payment or note generator 36 prints or otherwise generates a ticket or credit slip to provide to the player. The player receives the ticket or credit slip and may redeem the value associated with the ticket or credit slip via a cashier (or other suitable redemption system). In another embodiment, when the player cashes out, the player receives the coins or tokens in a coin payout tray. It should be appreciated that any suitable payout mechanisms, such as funding to the player's electronically recordable identification card may be implemented in accordance with the gaming device disclosed herein.

In one embodiment, as mentioned above and seen in FIG. 2A, one input device is a touch-screen 42 coupled with a touch-screen controller 44, or some other touch-sensitive display overlay to allow for player interaction with the images on the display. The touch-screen and the touch-screen controller are connected to a video controller 46. A player can make decisions and input signals into the gaming device by touching the touch-screen at the appropriate places. One such input device is a conventional touch-screen button panel.

The gaming device may further include a plurality of communication ports for enabling communication of the processor with external peripherals, such as external video sources, expansion buses, game or other displays, an SCSI port or a key pad.

In one embodiment, as seen in FIG. 2A, the gaming device includes a sound generating device controlled by one or more sounds cards 48 which function in conjunction with the processor. In one embodiment, the sound generating device includes at least one and preferably a plurality of speakers 50 or other sound generating hardware and/or software for generating sounds, such as playing music for the primary and/or secondary game or for other modes of the gaming device, such as an attract mode. In one embodiment, the gaming device provides dynamic sounds coupled with attractive multimedia images displayed on one or more of the display devices to provide an audio-visual representation or to otherwise display fu I-motion video with sound to attract players to the gaming device. During idle periods, the gaming device may display a sequence of audio and/or visual attraction messages to attract potential players to the gaming device. The videos may also be customized for or to provide any appropriate information.

In one embodiment, the gaming machine may include a sensor, such as a camera in communication with the processor (and possibly controlled by the processor) that is selectively positioned to acquire an image of a player actively using the gaming device and/or the surrounding area of the gaming device. In one embodiment, the camera may be configured to selectively acquire still or moving (e.g., video) images and may be configured to acquire the images in either an analog, digital or other suitable format. The display devices may be configured to display the image acquired by the camera as well as display the visible manifestation of the game in split screen or picture-in-picture fashion. For example, the camera may acquire an image of the player and the processor may incorporate that image into the primary and/or secondary game as a game image, symbol or indicia.

Gaming device 10 can incorporate any suitable wagering primary game. The gaming machine or device may include some or all of the features of conventional gaming machines or devices. The primary game may comprise any suitable reel-type game, card game, cascading or falling symbol game, number game or other game of chance susceptible to representation in an electronic or electromechanical form, which in one embodiment produces a random outcome based on probability data at the time of or after placement of a wager. That is, different primary wagering games, such as video poker games, video blackjack games, video keno, video bingo or any other suitable primary game may be implemented.

In one embodiment, as illustrated in FIGS. 1A and 1B, a base or primary game may be a slot game with one or more paylines 52. The paylines may be horizontal, vertical, circular, diagonal, angled or any combination thereof. In this embodiment, the gaming device includes at least one and preferably a plurality of reels 54, such as three to five reels 54, in either electromechanical form with mechanical rotating reels or video form with simulated reels and movement thereof. In one embodiment, an electromechanical slot machine includes a plurality of adjacent, rotatable reels which may be combined and operably coupled with an electronic display of any suitable type. In another embodiment, if the reels 54 are in video form, one or more of the display devices, as described above, display the plurality of simulated video reels 54. Each reel 54 displays a plurality of indicia or symbols, such as bells, hearts, fruits, numbers, letters, bars or other images which preferably correspond to a theme associated with the gaming device. In another embodiment, one or more of the reels are independent reels or unisymbol reels. In this embodiment, each independent or unisymbol reel generates and displays one symbol to the player. In one embodiment, the gaming device awards prizes after the reels of the primary game stop spinning if specified types and/or configurations of indicia or symbols occur on an active payline or otherwise occur in a winning pattern, occur on the requisite number of adjacent reels and/or occur in a scatter pay arrangement.

In an alternative embodiment, rather than determining any outcome to provide to the player by analyzing the symbols generated on any wagered upon paylines as described above, the gaming device determines any outcome to provide to the player based on the number of associated symbols which are generated in active symbol positions on the requisite number of adjacent reels (i.e., not on paylines passing through any displayed winning symbol combinations). In this embodiment, if a winning symbol combination is generated on the reels, the gaming device provides the player one award for that occurrence of the generated winning symbol combination. For example, if one winning symbol combination is generated on the reels, the gaming device will provide a single award to the player for that winning symbol combination (i.e., not based on the number of paylines that would have passed through that winning symbol combination). It should be appreciated that because a gaming device with wagering on ways to win provides the player one award for a single occurrence of a winning symbol combination and a gaming device with paylines may provide the player more than one award for the same occurrence of a single winning symbol combination (i.e., if a plurality of paylines each pass through the same winning symbol combination), it is possible to provide a player at a ways to win gaming device with more ways to win for an equivalent bet or wager on a traditional slot gaming device with paylines.

In one embodiment, the total number of ways to win is determined by multiplying the number of symbols generated in active symbol positions on a first reel by the number of symbols generated in active symbol positions on a second reel by the number of symbols generated in active symbol positions on a third reel and so on for each reel of the gaming device with at least one symbol generated in an active symbol position. For example, a three reel gaming device with three symbols generated in active symbol positions on each reel includes 27 ways to win (i.e., 3 symbols on the first reel×3 symbols on the second reel×3 symbols on the third reel). A four reel gaming device with three symbols generated in active symbol positions on each reel includes 81 ways to win (i.e., 3 symbols on the first reel×3 symbols on the second reel×3 symbols on the third reel×3 symbols on the fourth reel). A five reel gaming device with three symbols generated in active symbol positions on each reel includes 243 ways to win (i.e., 3 symbols on the first reel×3 symbols on the second reel×3 symbols on the third reel×3 symbols on the fourth reel×3 symbols on the fifth reel). It should be appreciated that modifying the number of generated symbols by either modifying the number of reels or modifying the number of symbols generated in active symbol positions by one or more of the reels, modifies the number of ways to win.

In another embodiment, the gaming device enables a player to wager on and thus activate symbol positions. In one such embodiment, the symbol positions are on the reels. In this embodiment, if based on the player's wager, a reel is activated, then each of the symbol positions of that reel will be activated and each of the active symbol positions will be part of one or more of the ways to win. In one embodiment, if based on the player's wager, a reel is not activated, then a designated number of default symbol positions, such as a single symbol position of the middle row of the reel, will be activated and the default symbol position(s) will be part of one or more of the ways to win. This type of gaming machine enables a player to wager on one, more or each of the reels and the processor of the gaming device uses the number of wagered on reels to determine the active symbol positions and the number of possible ways to win. In alternative embodiments, (1) no symbols are displayed as generated at any of the inactive symbol positions, or (2) any symbols generated at any inactive symbol positions may be displayed to the player but suitably shaded or otherwise designated as inactive.

In one embodiment wherein a player wagers on one or more reels, a player's wager of one credit may activate each of the three symbol positions on a first reel, wherein one default symbol position is activated on each of the remaining four reels. In this example, as described above, the gaming device provides the player three ways to win (i.e., 3 symbols on the first reel×1 symbol on the second reel×1 symbol on the third reel×1 symbol on the fourth reel×1 symbol on the fifth reel). In another example, a player's wager of nine credits may activate each of the three symbol positions on a first reel, each of the three symbol positions on a second reel and each of the three symbol positions on a third reel wherein one default symbol position is activated on each of the remaining two reels. In this example, as described above, the gaming device provides the player twenty-seven ways to win (i.e., 3 symbols on the first reel×3 symbols on the second reel×3 symbols on the third reel×1 symbol on the fourth reel×1 symbol on the fifth reel).

In one embodiment, to determine any award(s) to provide to the player based on the generated symbols, the gaming device individually determines if a symbol generated in an active symbol position on a first reel forms part of a winning symbol combination with or is otherwise suitably related to a symbol generated in an active symbol position on a second reel. In this embodiment, the gaming device classifies each pair of symbols which form part of a winning symbol combination (i.e., each pair of related symbols) as a string of related symbols. For example, if active symbol positions include a first cherry symbol generated in the top row of a first reel and a second cherry symbol generated in the bottom row of a second reel, the gaming device classifies the two cherry symbols as a string of related symbols because the two cherry symbols form part of a winning symbol combination.

After determining if any strings of related symbols are formed between the symbols on the first reel and the symbols on the second reel, the gaming device determines if any of the symbols from the next adjacent reel should be added to any of the formed strings of related symbols. In this embodiment, for a first of the classified strings of related symbols, the gaming device determines if any of the symbols generated by the next adjacent reel form part of a winning symbol combination or are otherwise related to the symbols of the first string of related symbols. If the gaming device determines that a symbol generated on the next adjacent reel is related to the symbols of the first string of related symbols, that symbol is subsequently added to the first string of related symbols. For example, if the first string of related symbols is the string of related cherry symbols and a related cherry symbol is generated in the middle row of the third reel, the gaming device adds the related cherry symbol generated on the third reel to the previously classified string of cherry symbols.

On the other hand, if the gaming device determines that no symbols generated on the next adjacent reel are related to the symbols of the first string of related symbols, the gaming device marks or flags such string of related symbols as complete. For example, if the first string of related symbols is the string of related cherry symbols and none of the symbols of the third reel are related to the cherry symbols of the previously classified string of cherry symbols, the gaming device marks or flags the string of cherry symbols as complete.

After either adding a related symbol to the first string of related symbols or marking the first string of related symbols as complete, the gaming device proceeds as described above for each of the remaining classified strings of related symbols which were previously classified or formed from related symbols on the first and second reels.

After analyzing each of the remaining strings of related symbols, the gaming device determines, for each remaining pending or incomplete string of related symbols, if any of the symbols from the next adjacent reel, if any, should be added to any of the previously classified strings of related symbols. This process continues until either each string of related symbols is complete or there are no more adjacent reels of symbols to analyze. In this embodiment, where there are no more adjacent reels of symbols to analyze, the gaming device marks each of the remaining pending strings of related symbols as complete.

When each of the strings of related symbols is marked complete, the gaming device compares each of the strings of related symbols to an appropriate paytable and provides the player any award associated with each of the completed strings of symbols. It should be appreciated that the player is provided one award, if any, for each string of related symbols generated in active symbol positions (i.e., as opposed to being based on how many paylines that would have passed through each of the strings of related symbols in active symbol positions).

In one embodiment, a base or primary game may be a poker game wherein the gaming device enables the player to play a conventional game of video draw poker and initially deals five cards all face up from a virtual deck of fifty-two card deck. Cards may be dealt as in a traditional game of cards or in the case of the gaming device, may also include that the cards are randomly selected from a predetermined number of cards. If the player wishes to draw, the player selects the cards to hold via one or more input device, such as pressing related hold buttons or via the touch screen. The player then presses the deal button and the unwanted or discarded cards are removed from the display and the gaming machine deals the replacement cards from the remaining cards in the deck. This results in a final five-card hand. The gaming device compares the final five-card hand to a payout table which utilizes conventional poker hand rankings to determine the winning hands. The gaming device provides the player with an award based on a winning hand and the credits the player wagered.

In another embodiment, the base or primary game may be a multi-hand version of video poker. In this embodiment, the gaming device deals the player at least two hands of cards. In one such embodiment, the cards are the same cards. In one embodiment each hand of cards is associated with its own deck of cards. The player chooses the cards to hold in a primary hand. The held cards in the primary hand are also held in the other hands of cards. The remaining non-held cards are removed from each hand displayed and for each hand replacement cards are randomly dealt into that hand. Since the replacement cards are randomly dealt independently for each hand, the replacement cards for each hand will usually be different. The poker hand rankings are then determined hand by hand and awards are provided to the player.

In one embodiment, a base or primary game may be a keno game wherein the gaming device displays a plurality of selectable indicia or numbers on at least one of the display devices. In this embodiment, the player selects at least one or a plurality of the selectable indicia or numbers via an input device such as the touch screen. The gaming device then displays a series of drawn numbers to determine an amount of matches, if any, between the player's selected numbers and the gaming device's drawn numbers. The player is provided an award based on the amount of matches, if any, based on the amount of determined matches and the number of numbers drawn.

In one embodiment, in addition to winning credits or other awards in a base or primary game, the gaming device may also give players the opportunity to win credits in a bonus or secondary game or bonus or secondary round. The bonus or secondary game enables the player to obtain a prize or payout in addition to the prize or payout, if any, obtained from the base or primary game. In general, a bonus or secondary game produces a significantly higher level of player excitement than the base or primary game because it provides a greater expectation of winning than the base or primary game and is accompanied with more attractive or unusual features than the base or primary game. In one embodiment, the bonus or secondary game may be any type of suitable game, either similar to or completely different from the base or primary game.

In one embodiment, as described below, the triggering event or qualifying condition may be a selected outcome in the primary game or a particular arrangement of one or more indicia on a display device in the primary game, such as the number seven appearing on three adjacent reels along a payline in the primary slot game embodiment seen in FIGS. 1A and 1B. In other embodiments, the triggering event or qualifying condition may be by exceeding a certain amount of game play (such as number of games, number of credits, amount of time), or reaching a specified number of points earned during game play.

In another embodiment, if the player has not enrolled in the bonus event participation program (as described below), the gaming device processor 12 or central server 56 randomly provides the player one or more plays of one or more secondary games. In one such embodiment, the gaming device does not provide any apparent reasons to the player for qualifying to play a secondary game. In this embodiment, qualifying for a secondary game may not be triggered by an event in or based specifically on any of the plays of any primary game. The gaming device may simply qualify a player to play a secondary game without any explanation or alternatively with simple explanations. In another embodiment, the gaming device (or central server) qualifies a player for a secondary game at least partially based on a game triggered or symbol triggered event, such as at least partially based on the play of a primary game.

In one embodiment, if the player has not enrolled in the bonus event participation program (as described below), the gaming device includes a program which will automatically begin a secondary game after the player has achieved a triggering event or qualifying condition in the primary game. In another embodiment, after a player has qualified for a secondary game, the player may subsequently enhance his/her secondary game participation through continued play on the primary game. Thus, for each secondary game qualifying event, such as a secondary game symbol, that the player obtains, a given number of secondary game wagering points or credits may be accumulated in a "secondary game meter" programmed to accrue the secondary game wagering credits or entries toward eventual participation in a secondary game. The occurrence of multiple such secondary game qualifying events in the primary game may result in an arithmetic or exponential increase in the number of secondary game wagering credits awarded. In one embodiment, the player may redeem extra secondary game wagering credits during the secondary game to extend play of the secondary game.

In one embodiment, no separate entry fee or buy in for a secondary game need be employed. In this embodiment, a player may not purchase an entry into a secondary game, rather they must win or earn entry through play of the primary game thus, encouraging play of the primary game. In another embodiment, qualification of the secondary game is accomplished through a simple "buy in" by the player, for example, if the player has been unsuccessful at qualifying through other specified activities. In another embodiment, the player must make a separate side-wager on the secondary game or wager a designated amount in the primary game to qualify for the secondary game. In this embodiment, the secondary game triggering event must occur and the side-wager (or designated primary game wager amount) must have been placed to trigger the secondary game.

Figure 2B:
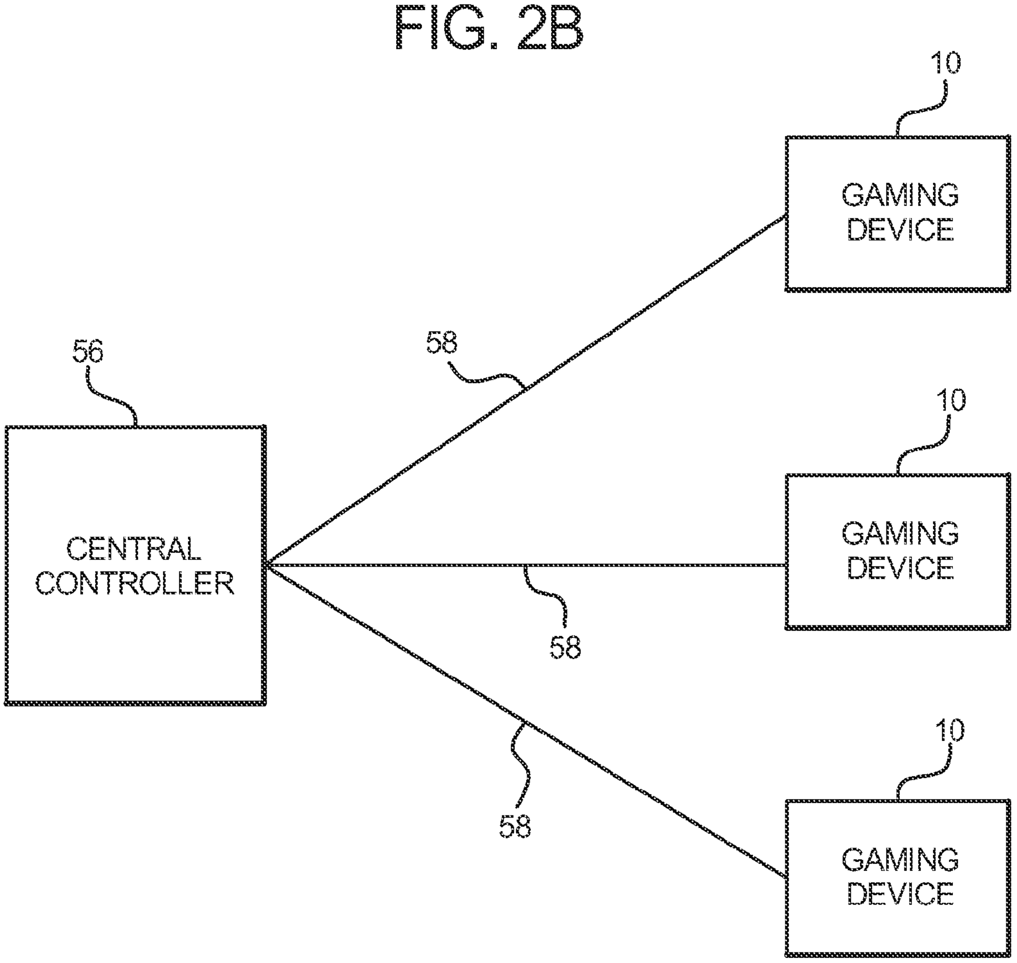
FIG. 2B is a schematic diagram of the central server in communication with a plurality of gaming machines in accordance with one embodiment of the gaming system disclosed herein.

In one embodiment, as illustrated in FIG. 2B, one or more of the gaming devices 10 are in communication with each other and/or at least one central server, central controller or remote host 56 through a data network or remote communication link 58. In this embodiment, the central server, central controller or remote host is any suitable server or computing device which includes at least one processor and at least one memory or storage device. In different such embodiments, the central server is a progressive controller or a processor of one of the gaming devices in the gaming system. In these embodiments, the processor of each gaming device is designed to transmit and receive events, messages, commands or any other suitable data or signal between the individual gaming device and the central server. The gaming device processor is operable to execute such communicated events, messages or commands in conjunction with the operation of the gaming device. Moreover, the processor of the central server is designed to transmit and receive events, messages, commands or any other suitable data or signal between the central server and each of the individual gaming devices. The central server processor is operable to execute such communicated events, messages or commands in conjunction with the operation of the central server. It should be appreciated that one, more or each of the functions of the central controller as disclosed herein may be performed by one or more gaming device processors. It should be further appreciated that one, more or each of the functions of one or more gaming device processors as disclosed herein may be performed by the central controller.

In one embodiment, the game outcome provided to the player is determined by a central server or controller and provided to the player at the gaming device. In this embodiment, each of a plurality of such gaming devices are in communication with the central server or controller. Upon a player initiating game play at one of the gaming devices, the initiated gaming device communicates a game outcome request to the central server or controller.

In one embodiment, the central server or controller receives the game outcome request and randomly generates a game outcome for the primary game based on probability data. In another embodiment, the central server or controller randomly generates a game outcome for the secondary game based on probability data. In another embodiment, the central server or controller randomly generates a game outcome for both the primary game and the secondary game based on probability data. In this embodiment, the central server or controller is capable of storing and utilizing program code or other data similar to the processor and memory device of the gaming device.

In an alternative embodiment, the central server or controller maintains one or more predetermined pools or sets of predetermined game outcomes. In this embodiment, the central server or controller receives the game outcome request and independently selects a predetermined game outcome from a set or pool of game outcomes. The central server or controller flags or marks the selected game outcome as used. Once a game outcome is flagged as used, it is prevented from further selection from the set or pool and cannot be selected by the central controller or server upon another wager. The provided game outcome can include a primary game outcome, a secondary game outcome, primary and secondary game outcomes, or a series of game outcomes such as free games.

The central server or controller communicates the generated or selected game outcome to the initiated gaming device. The gaming device receives the generated or selected game outcome and provides the game outcome to the player. In an alternative embodiment, how the generated or selected game outcome is to be presented or displayed to the player, such as a reel symbol combination of a slot machine or a hand of cards dealt in a card game, is also determined by the central server or controller and communicated to the initiated gaming device to be presented or displayed to the player. Central production or control can assist a gaming establishment or other entity in maintaining appropriate records, controlling gaming, reducing and preventing cheating or electronic or other errors, reducing or eliminating win-loss volatility and the like.

In another embodiment, a predetermined game outcome value is determined for each of a plurality of linked or networked gaming devices based on the results of a bingo, keno or lottery game. In this embodiment, each individual gaming device utilizes one or more bingo, keno or lottery games to determine the predetermined game outcome value provided to the player for the interactive game played at that gaming device. In one embodiment, the bingo, keno or lottery game is displayed to the player. In another embodiment, the bingo, keno or lottery game is not displayed to the player, but the results of the bingo, keno or lottery game determine the predetermined game outcome value for the primary or secondary game.

In the various bingo embodiments, as each gaming device is enrolled in the bingo game, such as upon an appropriate wager or engaging an input device, the enrolled gaming device is provided or associated with a different bingo card. Each bingo card consists of a matrix or array of elements, wherein each element is designated with a separate indicia, such as a number. It should be appreciated that each different bingo card includes a different combination of elements. For example, if four bingo cards are provided to four enrolled gaming devices, the same element may be present on all four of the bingo cards while another element may solely be present on one of the bingo cards.

In operation of these embodiments, upon providing or associating a different bingo card to each of a plurality of enrolled gaming devices, the central controller randomly selects or draws, one at a time, a plurality of the elements. As each element is selected, a determination is made for each gaming device as to whether the selected element is present on the bingo card provided to that enrolled gaming device. This determination can be made by the central controller, the gaming device, a combination of the two, or in any other suitable manner. If the selected element is present on the bingo card provided to that enrolled gaming device, that selected element on the provided bingo card is marked or flagged. This process of selecting elements and marking any selected elements on the provided bingo cards continues until one or more predetermined patterns are marked on one or more of the provided bingo cards. It should be appreciated that in one embodiment, the gaming device requires the player to engage a daub button (not shown) to initiate the process of the gaming device marking or flagging any selected elements.

After one or more predetermined patterns are marked on one or more of the provided bingo cards, a game outcome is determined for each of the enrolled gaming devices based, at least in part, on the selected elements on the provided bingo cards. As described above, the game outcome determined for each gaming device enrolled in the bingo game is utilized by that gaming device to determine the predetermined game outcome provided to the player. For example, a first gaming device to have selected elements marked in a predetermined pattern is provided a first outcome of win $10 which will be provided to a first player regardless of how the first player plays in a first game and a second gaming device to have selected elements marked in a different predetermined pattern is provided a second outcome of win $2 which will be provided to a second player regardless of how the second player plays a second game. It should be appreciated that as the process of marking selected elements continues until one or more predetermined patterns are marked, this embodiment ensures that at least one bingo card will win the bingo game and thus at least one enrolled gaming device will provide a predetermined winning game outcome to a player. It should be appreciated that other suitable methods for selecting or determining one or more predetermined game outcomes may be employed.

In one example of the above-described embodiment, the predetermined game outcome may be based on a supplemental award in addition to any award provided for winning the bingo game as described above. In this embodiment, if one or more elements are marked in supplemental patterns within a designated number of drawn elements, a supplemental or intermittent award or value associated with the marked supplemental pattern is provided to the player as part of the predetermined game outcome. For example, if the four corners of a bingo card are marked within the first twenty selected elements, a supplemental award of $10 is provided to the player as part of the predetermined game outcome. It should be appreciated that in this embodiment, the player of a gaming device may be provided a supplemental or intermittent award regardless of if the enrolled gaming device's provided bingo card wins or does not win the bingo game as described above.

In another embodiment, one or more of the gaming devices are in communication with a central server or controller for monitoring purposes only. That is, each individual gaming device randomly generates the game outcomes to be provided to the player and the central server or controller monitors the activities and events occurring on the plurality of gaming devices. In one embodiment, the gaming network includes a rear-time or on-line accounting and gaming information system operably coupled to the central server or controller. The accounting and gaming information system of this embodiment includes a player database for storing player profiles, a player tracking module for tracking players and a credit system for providing automated casino transactions.

In one embodiment, the gaming device disclosed herein is associated with or otherwise integrated with one or more player tracking systems. Player tracking systems enable gaming establishments to recognize the value of customer loyalty through identifying frequent customers and rewarding them for their patronage. In one embodiment, the gaming device and/or player tracking system tracks any players gaming activity at the gaming device. In one such embodiment, the gaming device includes at least one card reader 38 in communication with the processor. In this embodiment, a player is issued a player identification card which has an encoded player identification number that uniquely identifies the player. When a player inserts their playing tracking card into the card reader to begin a gaming session, the card reader reads the player identification number off the player tracking card to identify the player. The gaming device and/or associated player tracking system timely tracks any suitable information or data relating to the identified player's gaming session. Directly or via the central controller, the gaming device processor communicates such information to the player tracking system. The gaming device and/or associated player tracking system also timely tracks when a player removes their player tracking card when concluding play for that gaming session. In another embodiment, rather than requiring a player to insert a player tracking card, the gaming device utilizes one or more portable devices carried by a player, such as a cell phone, a radio frequency identification tag or any other suitable wireless device to track when a player begins and ends a gaming session. In another embodiment, the gaming device utilizes any suitable biometric technology or ticket technology to track when a player begins and ends a gaming session.

During one or more gaming sessions, the gaming device and/or player tracking system tracks any suitable information or data, such as any amounts wagered, average wager amounts and/or the time these wagers are placed. In different embodiments, for one or more players, the player tracking system includes the player's account number, the player's card number, the player's first name, the player's surname, the player's preferred name, the player's player tracking ranking, any promotion status associated with the player's player tracking card, the player's address, the player's birthday, the player's anniversary, the player's recent gaming sessions, or any other suitable data. In one embodiment, such tracked information and/or any suitable feature associated with the player tracking system is displayed on a player tracking display 40. In another embodiment, such tracked information and/or any suitable feature associated with the player tracking system is displayed via one or more service windows (not shown) which are displayed on the central display device and/or the upper display device.

In one embodiment, a plurality of the gaming devices are capable of being connected together through a data network. In one embodiment, the data network is a local area network (LAN), in which one or more of the gaming devices are substantially proximate to each other and an on-site central server or controller as in, for example, a gaming establishment or a portion of a gaming establishment. In another embodiment, the data network is a wide area network (WAN) in which one or more of the gaming devices are in communication with at least one off-site central server or controller. In this embodiment, the plurality of gaming devices may be located in a different part of the gaming establishment or within a different gaming establishment than the off-site central server or controller. Thus, the WAN may include an off-site central server or controller and an off-site gaming device located within gaming establishments in the same geographic area, such as a city or state. The WAN gaming system may be substantially identical to the LAN gaming system described above, although the number of gaming devices in each system may vary relative to each other.

In another embodiment, the data network is an internet or intranet. In this embodiment, the operation of the gaming device can be viewed at the gaming device with at least one internet browser. In this embodiment, operation of the gaming device and accumulation of credits may be accomplished with only a connection to the central server or controller (the internet/intranet server) through a conventional phone or other data transmission line, digital subscriber line (DSL), T-1 line, coaxial cable, fiber optic cable, or other suitable connection. In this embodiment, players may access an internet game page from any location where an internet connection and computer, or other internet facilitator is available. The expansion in the number of computers and number and speed of internet connections in recent years increases opportunities for players to play from an ever-increasing number of remote sites. It should be appreciated that enhanced bandwidth of digital wireless communications may render such technology suitable for some or all communications, particularly if such communications are encrypted. Higher data transmission speeds may be useful for enhancing the sophistication and response of the display and interaction with the player.

As mentioned above, in one embodiment, the present disclosure may be employed in a server based gaming system. In one such embodiment, as described above, one or more gaming devices are in communication with a central server or controller. The central server or controller may be any suitable server or computing device which includes at least one processor and a memory or storage device. In alternative embodiments, the central server is a progressive controller or another gaming machine in the gaming system. In one embodiment, the memory device of the central server stores different game programs and instructions, executable by a gaming device processor, to control the gaming device. Each executable game program represents a different game or type of game which may be played on one or more of the gaming devices in the gaming system. Such different games may include the same or substantially the same game play with different pay tables. In different embodiments, the executable game program is for a primary game, a secondary game or both. In another embodiment, the game program may be executable as a secondary game to be played simultaneous with the play of a primary game (which may be downloaded to or fixed on the gaming device) or vice versa.

In this embodiment, each gaming device at least includes one or more display devices and/or one or more input devices for interaction with a player. A local processor, such as the above-described gaming device processor or a processor of a local server, is operable with the display device(s) and/or the input device(s) of one or more of the gaming devices.

In operation, the central controller is operable to communicate one or more of the stored game programs to at least one local processor. In different embodiments, the stored game programs are communicated or delivered by embedding the communicated game program in a device or a component (e.g., a microchip to be inserted in a gaming device), writing the game program on a disc or other media, downloading or streaming the game program over a dedicated data network, internet or a telephone line. After the stored game programs are communicated from the central server, the local processor executes the communicated program to facilitate play of the communicated program by a player through the display device(s) and/or input device(s) of the gaming device. That is, when a game program is communicated to a local processor, the local processor changes the game or type of game played at the gaming device.

In another embodiment, a plurality of gaming devices at one or more gaming sites may be networked to the central server in a progressive configuration, as known in the art, wherein a portion of each wager to initiate a base or primary game may be allocated to one or more progressive awards. In one embodiment, a progressive gaming system host site computer is coupled to a plurality of the central servers at a variety of mutually remote gaming sites for providing a multi-site linked progressive automated gaming system. In one embodiment, a progressive gaming system host site computer may serve gaming devices distributed throughout a number of properties at different geographical locations including, for example, different locations within a city or different cities within a state.

In one embodiment, the progressive gaming system host site computer is maintained for the overall operation and control of the progressive gaming system. In this embodiment, a progressive gaming system host site computer oversees the entire progressive gaming system and is the master for computing all progressive jackpots. All participating gaming sites report to, and receive information from, the progressive gaming system host site computer. Each central server computer is responsible for all data communication between the gaming device hardware and software and the progressive gaming system host site computer. In one embodiment, an individual gaming machine may trigger a progressive award win. In another embodiment, a central server (or the progressive gaming system host site computer) determines when a progressive award win is triggered. In another embodiment, an individual gaming machine and a central controller (or progressive gaming system host site computer) work in conjunction with each other to determine when a progressive win is triggered, for example through an individual gaming machine meeting a predetermined requirement established by the central controller.

In one embodiment, a progressive award win is triggered based on one or more game play events, such as a symbol-driven trigger. In other embodiments, the progressive award triggering event or qualifying condition may be by exceeding a certain amount of game play (such as number of games, number of credits, or amount of time), or reaching a specified number of points earned during game play. In another embodiment, a gaming device is randomly or apparently randomly selected to provide a player of that gaming device one or more progressive awards. In one such embodiment, the gaming device does not provide any apparent reasons to the player for winning a progressive award, wherein winning the progressive award is not triggered by an event in or based specifically on any of the plays of any primary game. That is, a player is provided a progressive award without any explanation or alternatively with simple explanations. In another embodiment, a player is provided a progressive award at least partially based on a game triggered or symbol triggered event, such as at least partially based on the play of a primary game.

In one embodiment, one or more of the progressive awards are each funded via a side bet or side wager. In this embodiment, a player must place or wager a side bet to be eligible to win the progressive award associated with the side bet. In one embodiment, the player must place the maximum bet and the side bet to be eligible to win one of the progressive awards. In another embodiment, if the player places or wagers the required side bet, the player may wager at any credit amount during the primary game (i.e., the player need not place the maximum bet and the side bet to be eligible to win one of the progressive awards). In one such embodiment, the greater the player's wager (in addition to the placed side bet), the greater the odds or probability that the player will win one of the progressive awards. It should be appreciated that one or more of the progressive awards may each be funded, at least in part, based on the wagers placed on the primary games of the gaming machines in the gaming system, via a gaming establishment or via any suitable manner.

In another embodiment, one or more of the progressive awards are partially funded via a side-bet or side-wager which the player may make (and which may be tracked via a side-bet meter). In one embodiment, one or more of the progressive awards are funded with only side-bets or side-wagers placed. In another embodiment, one or more of the progressive awards are funded based on player's wagers as described above as well as any side-bets or side-wagers placed.

In one alternative embodiment, a minimum wager level is required for a gaming device to qualify to be selected to obtain one of the progressive awards. In one embodiment, this minimum wager level is the maximum wager level for the primary game in the gaming machine. In another embodiment, no minimum wager level is required for a gaming machine to qualify to be selected to obtain one of the progressive awards.

In another embodiment, a plurality of players at a plurality of linked gaming devices in a gaming system participate in a group gaming environment. In one embodiment, a plurality of players at a plurality of linked gaming devices work in conjunction with one another, such as playing together as a team or group, to win one or more awards. In one such embodiment, any award won by the group is shared, either equally or based on any suitable criteria, amongst the different players of the group. In another embodiment, a plurality of players at a plurality of linked gaming devices compete against one another for one or more awards. In one such embodiment, a plurality of players at a plurality of linked gaming devices participate in a gaming tournament for one or more awards. In another embodiment, a plurality of players at a plurality of linked gaming devices play for one or more awards wherein an outcome generated by one gaming device affects the outcomes generated by one or more linked gaming devices.

Accumulation of Bonus Event Units

Figure 3A:
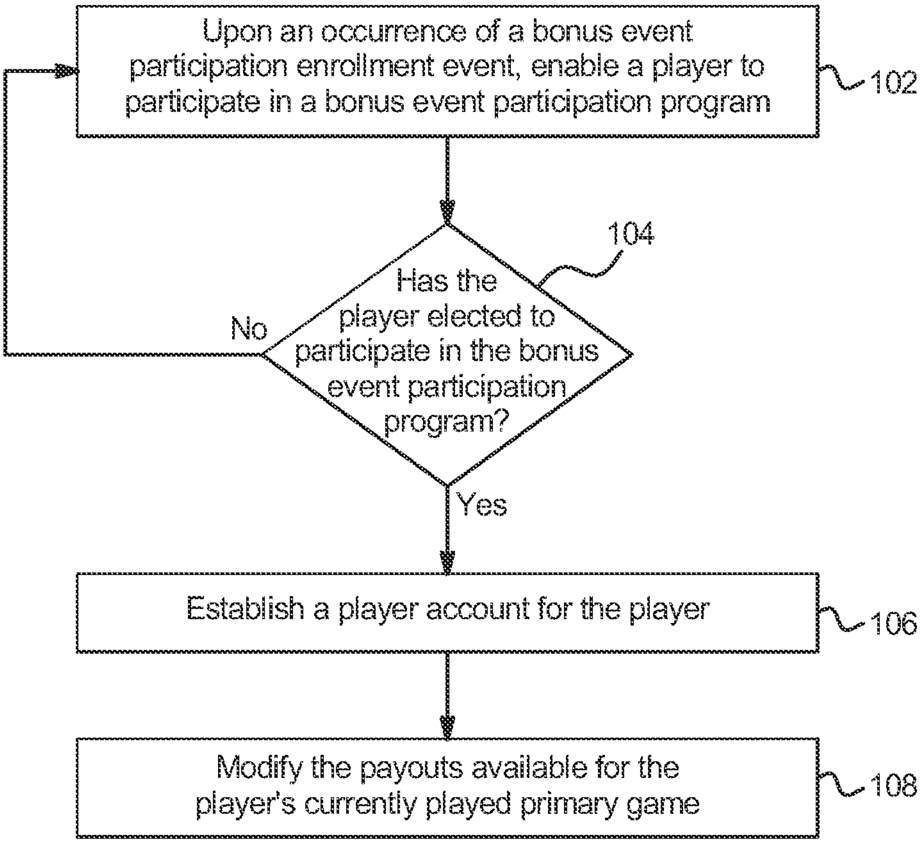
FIGS. 3A and 3B are flowcharts of one embodiment of the gaming system disclosed herein illustrating a player accumulating a quantity of bonus event units.

Referring now to FIG. 3A, in one embodiment, upon a bonus event participation enrollment event, the gaming system enables a player to participate or otherwise enroll in the bonus event participation program or feature as illustrated in block 102. In one such embodiment, a bonus event participation enrollment event occurs when a player submits (such as inserting) a player tracking card or inputs other identification into the gaming device. In another such embodiment, a bonus event participation enrollment event occurs when a secondary game triggering event occurs but before any secondary game is displayed to the player. In another such embodiment, a bonus event participation enrollment event occurs when a player begins play at a dedicated account based gaming machine that is configured to play with a specific player.

In one embodiment, if the bonus event participation enrollment event occurs, the gaming system determines whether the player has enrolled to participate in the bonus event participation program as indicated in diamond 104. In this embodiment, if the player elects not to enroll or participate in the bonus event participation feature, the gaming system enables the player to proceed with any triggered secondary game and returns to block 102 awaiting another occurrence of the bonus event participation enrollment event.

On the other hand, if the player has elected or elects to enroll or participate in the bonus event participation feature, the gaming system establishes a player account (or otherwise accesses a previously created player account) for the player as indicated in block 106. In one embodiment, the gaming system utilizes a player's maintained account with a player tracking system as the player's account. In another embodiment, if the player does not have a player tracking account (or the player has not submitted their player tracking card), the gaming system creates or establishes a player account for that player.

In one embodiment, if the bonus event participation enrollment event occurs, the gaming system also modifies the payouts available for the player's currently played primary game as indicated in block 108. In one embodiment, such a modification of one or more of the available payouts from the player's currently played primary game includes identifying one or more secondary game triggering elements and flagging such identified secondary game triggering elements to skip or defer any associated secondary games. That is, the gaming system removes any association of triggering a secondary game with such identified secondary game triggering elements. In one such embodiment, the secondary game triggering elements include the secondary game triggering symbols of any symbol combination which causes a trigger of a secondary game (and thus is associated with the average expected payout of the secondary game). For example, if according to a first paytable, a secondary game was previously triggered when the symbol combination of "trigger symbol-trigger symbol-trigger symbol" was generated, then each "trigger symbol" of this example is a secondary game triggering element.

In another such embodiment, the secondary game triggering elements also (or alternatively) include one or more symbols which do not by themselves trigger a secondary game, but trigger a secondary game when generated in combination with other symbols. In this example, if according to the first paytable, a secondary game was not previously triggered when the symbol combination of "bar symbol-trigger symbol-cherry symbol" was generated, then the "trigger symbol" (i.e., the secondary game triggering symbol) of this example is a secondary game triggering element.

In one embodiment, after flagging such secondary game triggering elements to skip or defer any associated secondary game, the modification one or more of the available payouts from the player's currently played primary game includes designating such identified secondary game triggering elements as bonus event unit generating elements or bonus event unit generating symbols. For example, the gaming system identifies the symbol combination of "trigger symbol-trigger symbol-trigger symbol" as including three secondary game triggering elements and designates this symbol combination as including three bonus event unit generating symbols. That is, the gaming system: (i) identifies one or more secondary game triggering elements which either trigger a secondary game or are part of a symbol combination which trigger a secondary game, (ii) flags such identified secondary game triggering elements to skip or defer any secondary game which is triggered when such secondary game triggering elements are generated (either alone or in combination with other symbols), and (iii) designates such identified secondary game triggering elements as bonus event unit generating elements or symbols.

In one embodiment, such a modification of one or more of the available payouts from the player's currently played primary game further includes determining and assigning a quantity of bonus event units, credits, points or counts for each designated bonus event unit generating symbol or bonus event unit generating symbol combination. In this embodiment, such assigned bonus event units provide an alternative manner of providing the average expected payout of the skipped secondary games to the player. That is, to account for the average expected payout of any skipped secondary games, the gaming system assigns an expected value to such designated bonus event unit generating symbols or symbol combinations in the form of bonus event units. Accordingly, such determination and assignment includes a reallocation or redistribution of the average expected payout of any skipped secondary games amongst one or more symbol combinations which includes such designated bonus event unit generating symbols.

For example, as seen in FIG. 4A, if a secondary game of a first paytable represents around 17% of the total average expected payout of a gaming device, to account for this 17% that is not provided to the player in the form of this secondary game, for a second paytable, the gaming system determines a quantity of bonus event units for each symbol combination that includes at least one designated bonus event unit generating symbol. In this example, if the player is wagering twenty-five credits per game played to utilize the second paytable, the gaming system determines and assigns: (i) a quantity of nine bonus event units (i.e., a theoretical or virtual amount equivalent to $0.09) to any symbol combination which includes only one designated bonus event unit generating symbol; (ii) a quantity of twenty-four bonus event units (i.e., a theoretical or virtual amount equivalent to $0.24) to any symbol combination which includes only two designated bonus event unit generating symbols; and (iii) a quantity of one-hundred-fifty bonus event units (i.e., a theoretical or virtual amount equivalent to $1.50) to any symbol combination which includes three designated bonus event unit generating symbols.

As further seen in FIG. 4A, the utilization of the second paytable (which may reside on an individual gaming device and/or on the central server) provides that the gaming system reallocates this 17% of the total average expected payout of the gaming device amongst a plurality of different symbol combinations which each include at least one bonus event unit generating symbol. In this example, since the probability of certain symbol combinations being generated remains the same from the first paytable to the second paytable, the gaming system determines that: (i) around 8.8% of the total average expected payout of the gaming device will be provided to players in the form of bonus event units if any symbol combination which includes only one designated bonus event unit generating symbol is generated; (ii) around 5.6% of the total average expected payout of the gaming device will be provided to players in the form of bonus event units if any symbol combination which includes only two designated bonus event unit generating symbols is generated; and (iii) around 2.6% of the total average expected payout of the gaming device will be provided to players in the form of bonus event units if any symbol combination which includes three designated bonus event unit generating symbols is generated. It should be appreciated that in this example, the utilization of the second paytable (if the player is enrolled in the bonus event participation program) provides that rather than providing: (i) 17% of the total average expected payout of the gaming device via a secondary game that is triggered if the first paytable is utilized and one symbol combination is generated (e.g., the "-T T T-" symbol combination), and (ii) 0% of the total average expected payout of the gaming device if any symbol combination is generated which includes at least one secondary game triggering element, but does not trigger the secondary game is generated (e.g., the " - - T - - " symbol combination), the gaming system reallocates this 17% amongst a plurality of different symbol combinations which previously contributed 0% to the total average expected payout of the gaming device.

Accordingly, this reallocation provides that the generation of one or more symbols which did not previously contribute to the total average expected payout of the gaming device (i.e., one or more symbols which did not by themselves trigger a secondary game, but triggered a secondary game in combination with other symbols and thus previously contributed 0% to the total average expected payout of the gaming device) wifi contribute to the total average expected payout of the gaming device in the form of bonus event units. For example, as seen in FIG. 4A, according to the first paytable which is utilized if the player does not elect to participate in the bonus event participation program, the symbol combination of " - T - - - " is associated with an award of zero and thus contributes 0% to the total average expected payout of the gaming device. However, according to the second paytable which is utilized if the player elects to participate in the bonus event participation program, the same symbol combination of " - T - - - " is associated with a quantity of nine bonus event units and thus contributes 3.94% to the total average expected payout of the gaming device. It should be appreciated that in this example, regardless of whether the player declines to participate in the bonus event participation program (i.e., the first paytable is utilized) or the player enrolls to participate in the bonus event participation program (i.e., the second paytable is utilized), the contribution to the total average expected payout of the gaming device from the secondary game (i.e., the 17.06% provided to the player via the secondary game if the first paytable is utilized) or from the bonus event (i.e., the 17.06% provided to the player via one or more bonus events if the second paytable is utilized) remains the same.

In one embodiment, the gaming system modifies the payouts available for the player's currently played primary game to account for more than the average expected payout of the deferred secondary game. In this embodiment, in exchange for participating in the bonus event participation program, the gaming system provides that any players that participate in the bonus event participation program utilizes a paytable with an average expected payout that is greater than the paytable utilized for the players that do not participate in the bonus event participation program. For example, as seen in FIG. 4B, if a gaming device contributes around 14% to the total gaming device average expected payout percentage in the form of one or more secondary games, then for any players that elect to participate in the bonus event participation program, the gaming system modifies one or more available payouts such that around 17% of the average expected payout percentage is provided to players in the form of bonus event units. In other words, such a modification provides that if a gaming device is not enrolled in the bonus event participation program, the gaming device utilizes a first paytable with an average expected payout percentage of 85%, but if the player elects to enroll in the bonus event participation program, the gaming device utilizes a second paytable with an average expected payout percentage of 88%.

In one embodiment, each bonus event unit has a theoretical value or average expected value which is based on the average expected payout of the skipped secondary game and which is different than the value of each monetary credit. That is, prior to being redeemed, each bonus event unit has a theoretical value because an actual value for such bonus event units cannot be determined until one or more random determinations occur in association with the redemption of such bonus event units (as described below). In different embodiments, the gaming system tracks the funded quantity of bonus event units as points, credits, counts or otherwise using one or more meters.

Figure 3B:
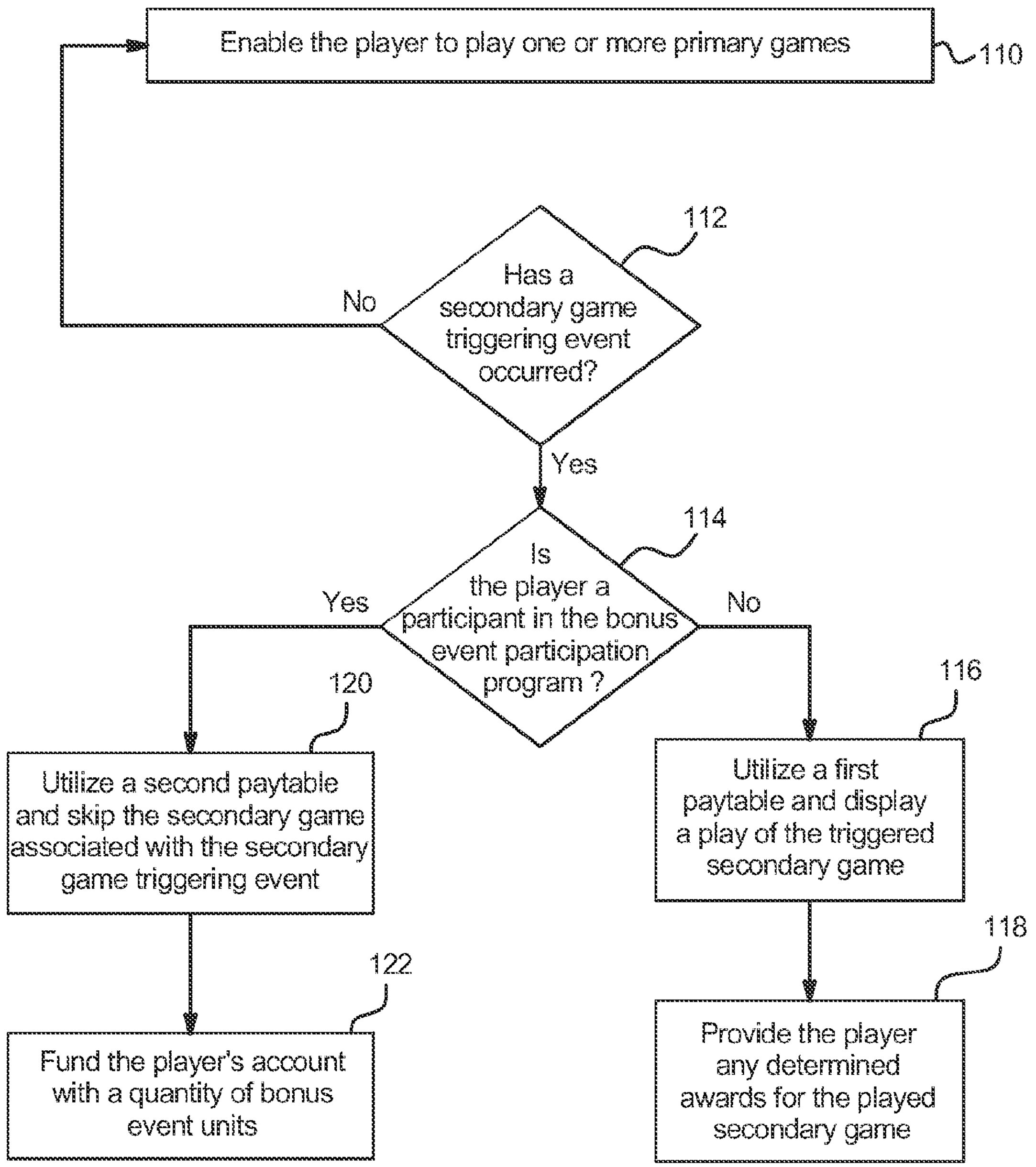

In operation of one disclosed embodiment, the gaming system enables a player to play one or more primary games as indicated in block 110 of FIG. 3B and as described above. In this embodiment, the gaming system determines if a secondary game triggering event occurred (in association with one of the plays of the primary game) as indicated in diamond 112. If the gaming system determines that secondary game triggering event has not occurred, the gaming system returns to block 110 and enables the player to continue playing one or more primary games.

If the gaming system determines that secondary game triggering event has occurred, the gaming system next determines if the player is a participant in the bonus event participation program as indicated in diamond 114. In one embodiment, if the gaming system determines that the player did not enroll in the bonus event participation program, the gaming system utilizes a first paytable and displays a play of the triggered secondary game as indicated in block 116. In this embodiment, the gaming system provides the player any determined awards for the played secondary game as indicated in block 118.

On the other hand, if the gaming system determines that the player enrolled in the bonus event participation program and the secondary game triggering event occurred, the gaming system utilizes a second paytable and defers, withholds or otherwise skips any secondary game associated with the secondary game triggering event as indicated in block 120. It should be appreciated that with the exception of modifying the paytable to skip one or more symbol-driven triggered secondary games, the look and feel of the played game presented to the player remains unchanged.

In addition to skipping the secondary game associated with the secondary game triggering event, the gaming system further credits or funds the player's account with a quantity of bonus event units as indicated in block 122. That is, rather than displaying a secondary game to be played in association with the occurrence of the secondary game triggering event, the gaming system disclosed herein provides a bonus event unit accumulation event which funds a player's account with an amount of bonus event units (to be subsequently used by the player).

In one embodiment, if the gaming system determines to fund a player's account with one or more bonus event units, the gaming system determines a number or quantity of bonus event units to fund the player's account. In one embodiment, the gaming system determines a quantity of bonus event units to fund the player's account based on one or more aspects or game parameters of the player's gaming experience. In one such embodiment, the amount of funded bonus event units is based on the specific designated bonus event unit generating symbol which occurred and the player's wager associated with the occurrence of the designated bonus event unit generating symbol. That is, the quantity of bonus event units funded in the player's account is linked to or otherwise based on the specific paytable of the underlying game played. For example, if the same symbol combination including the same quantity of the same bonus event unit generating symbols were generated for two players and these two players each wagered different amounts on the payline which generated this symbol combination, the gaming system would credit each of these player's respective accounts with different amounts of bonus event units. In a different example, if two players wagered the same amount and two different symbol combinations with different bonus event unit generating symbols (or different quantities of bonus event unit generating symbols) were generated for these two players, the gaming system would credit each player's respective account with a different amount of bonus event units. In a different embodiment, if the same symbol combination including the same quantity of the same bonus event unit generating symbols were generated for two players and these two players each wagered the same amount on the payline which generated this symbol combination, but these two players were playing gaming devices of different credit denominations or different bet denominations, the gaming system would credit each of these player's respective accounts with different amounts of bonus event units.

In different embodiments, the determined quantity of funded bonus event units is at least based on the underlying paytable of the specific game played and is at least partially predetermined, randomly determined, determined based on a generated symbol or symbol combination, determined based on a random determination by the central controller, determined based on a random determination by one or more gaming devices, determined based on the status of one or more players (such as determined through a player tracking system), determined based on one or more side wagers placed, determined based on a player's primary game wager, determined based on time (such as the time of day), determined based on the amount of coin-in accumulated in one or more pools, or determined based on any other suitable method or criteria. It should be appreciated that the use of bonus event units enables different players playing at different denominations to accumulate bonus event units at different rates and participate in the same bonus events or the same types of bonus events.

Figure 5A:
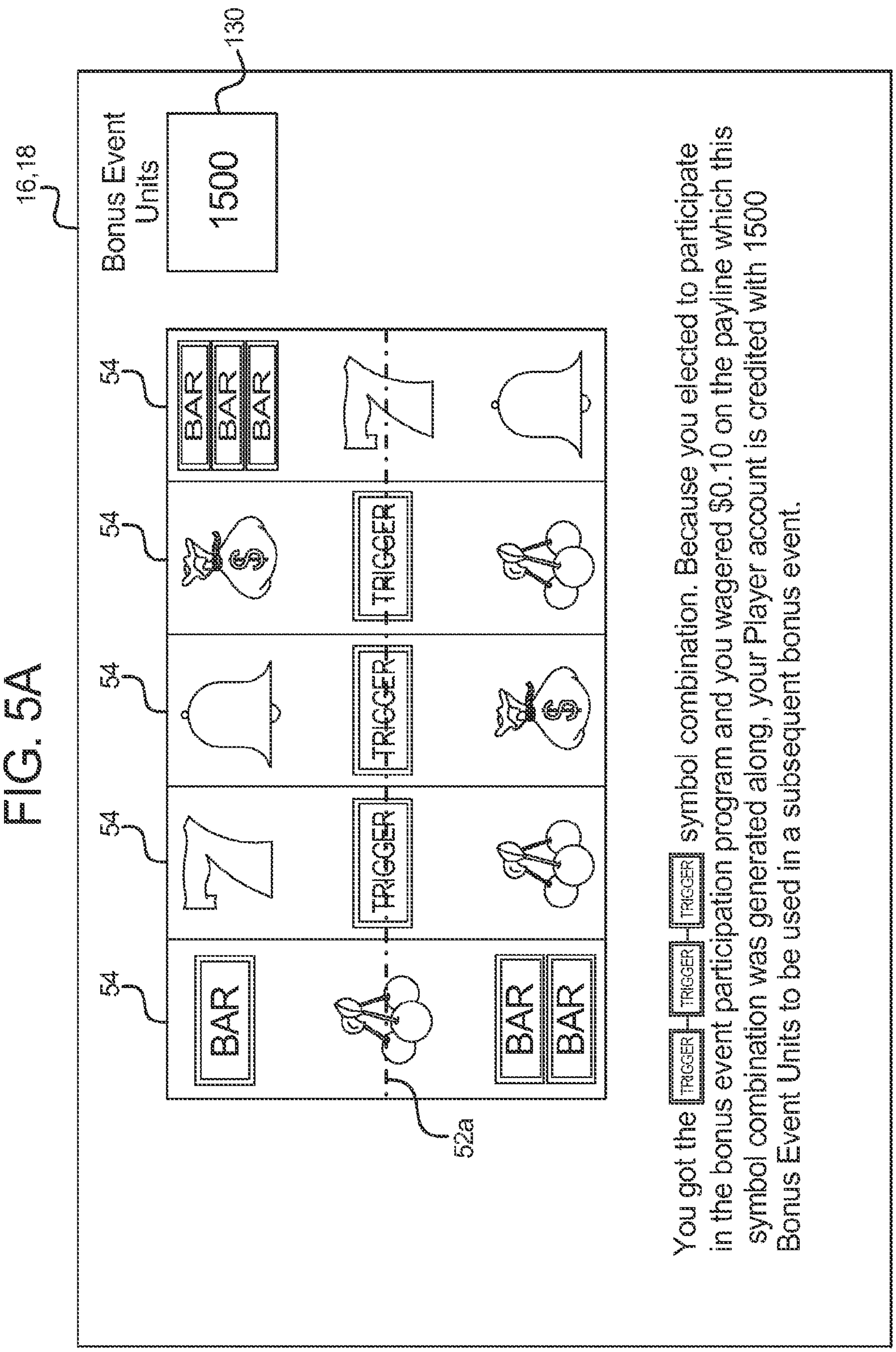
FIGS. 5A and 5B are enlarged elevation views of different embodiments of the display of a gaming device of the gaming system disclosed herein illustrating different occurrences of a bonus event unit accumulation event and different displays of a player's accumulated bonus event units.

For example, as seen in FIG. 5A, for a play of a primary game, the gaming device generated a secondary game triggering event symbol combination (i.e., trigger symbol-trigger symbol-trigger symbol) along a wagered on payline. Since the player previously elected to participate in the bonus event participation program, rather than displaying a play of the secondary game to the player, the gaming system determines a quantity of bonus event units to deposit in the player's account. In this example, the gaming system determines that based on the quantity of bonus event units associated with the generated secondary game triggering event combination and the player's wager of $0.10 on the payline which such a symbol combination was generated along, the gaming system funds the player's account with 1500 bonus event units (i.e., a theoretical or virtual amount equivalent to $15.00) as indicated in the bonus event unit meter 130. In this embodiment, the gaming device displays appropriate messages such as "YOU GOT THE TRIGGER-TRIGGER-TRIGGER SYMBOL COMBINATION" and "BECAUSE YOU ELECTED TO PARTICIPATE IN THE BONUS EVENT PARTICIPATION PROGRAM AND YOU WAGERED $0.10 ON THE PAYLINE WHICH THIS SYMBOL COMBINATION WAS GENERATED ALONG, YOUR PLAYER'S ACCOUNT IS CREDITED WITH 1500 BONUS EVENT UNITS TO BE USED IN A SUBSEQUENT BONUS EVENT" to the player visually, or through suitable audio or audiovisual displays. It should be appreciated that in one embodiment, the gaming system does not display to the player the theoretical value or average expected value of the bonus event units in the player's account.

Figure 5B:
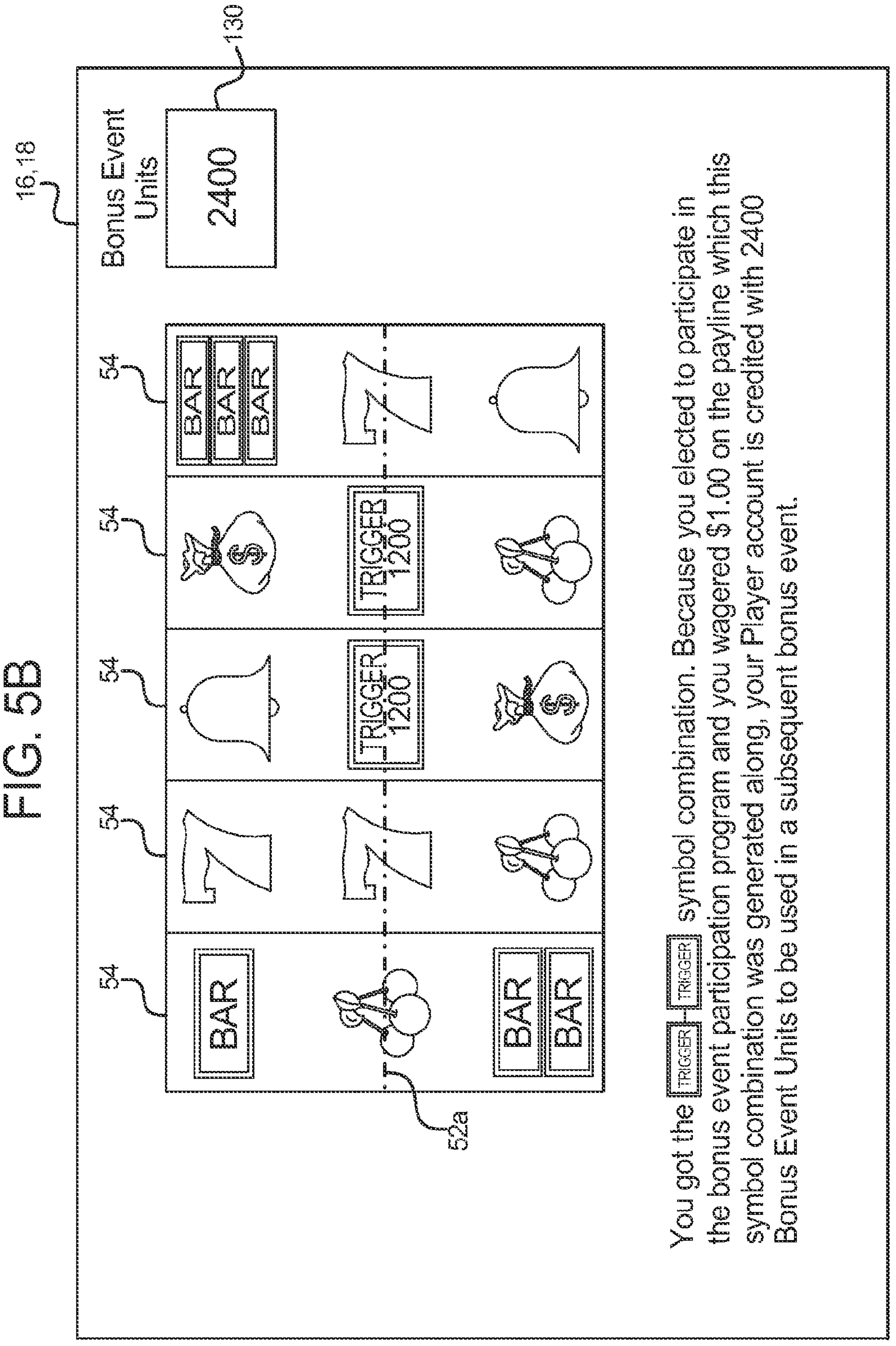

In another embodiment, for each bonus event unit generating symbol generated, the gaming system displays to the player the quantity of bonus event units associated with that generated bonus event unit generating symbol. For example, as seen in FIG. 5B, for a play of a primary game, the gaming device generated, along a wagered on payline, a symbol combination which would not trigger the secondary game but which includes two bonus event unit generating symbols. Since the player previously elected to participate in the bonus event participation program, rather than providing the player no award for this symbol combination, the gaming system reallocates part of the average expected payout for any previously skipped secondary game in the form of bonus event units to the player. In this example, the gaming system determines that based on the quantity of bonus event units associated with this generated symbol combination and the player's wager of $1.00 on the payline which such a symbol combination was generated along, the gaming system funds the player's account with 2400 bonus event units (i.e., a theoretical or virtual amount equivalent to $24.00) as indicated in the bonus event unit meter 130. In this embodiment, based on one or more messages communicated from the central server, the gaming device displays to the player the quantity of bonus event units each generated bonus event unit generating symbol contributed to the player's account and also display appropriate messages such as "YOU GOT THE TRIGGER-TRIGGER SYMBOL COMBINATION" and "BECAUSE YOU ELECTED TO PARTICIPATE IN THE BONUS EVENT PARTICIPATION PROGRAM AND YOU WAGERED $1.00 ON THE PAYLINE WHICH THIS SYMBOL COMBINATION WAS GENERATED ALONG, YOUR PLAYER'S ACCOUNT IS CREDITED WITH 2400 BONUS EVENT UNITS TO BE USED IN A SUBSEQUENT BONUS EVENT" to the player visually, or through suitable audio or audiovisual displays. In one such embodiment, the gaming system utilizes one or more service windows, pop-up windows or non-overlapping windows that are controlled by the central server and displayed on an individual gaming device (i.e., one or more thin-client displays) to convey such information to the player.

In one alternative embodiment, a bonus event participation enrollment event occurs when a player deposits money or funds. In different embodiments, the determination of if a bonus event participation enrollment event occurs is predetermined, randomly determined, determined based on a generated symbol or symbol combination, determined based on a random determination by the central controller, determined based on a random determination by one or more gaming devices, determined based on the status of one or more players (such as determined through a player tracking system), determined based on one or more side wagers placed, determined based on a player's primary game wager, determined based on time (such as the time of day), determined based on the amount of coin-in accumulated in one or more pools, or determined based on any other suitable method or criteria.

In one embodiment, if the player has elected or elects to enroll or participate in the bonus event participation program but the player does not have a player account, the gaming system creates a temporary account for the player and funds this temporary account with any accumulated bonus event units. In this embodiment, upon a designated event occurring (such as the player's credit meter being reduced to $0.00, after an amount of time or when the player presses a suitable cash out button), the gaming system displays one or more messages advising the player to set up a player account to retain any accumulated bonus event units. In one such embodiment, if the player declines to set up a player account, the gaming system enables the player to access their temporary account via a printed ticket or code specific to that player.

In another embodiment, the gaming system enables a player that is enrolled in the bonus event participation program to unenroll or opt-out of the bonus event participation program. In different embodiments, the gaming system enables a player to opt-out of the bonus event participation program at a designated time, upon the player selecting to opt-out from the bonus event participation program, upon a designated event occurring (such as the player's credit meter falling below a threshold) or upon any suitable occurrence. In one such embodiment, if the player opts-out of the bonus event participation program, the gaming system enables the player to save or retain one or more of any accumulated bonus event units in the player's account. In another such embodiment, if the player opts-out of the bonus event participation program, the gaming system causes the player to forfeit one or more of any accumulated bonus event units in the player's account.

In another embodiment, the gaming system enables a plurality of, but not all players at all gaming devices the opportunity to participate in the bonus event participation program. In different embodiments, the determination of whether or not a player is provided the opportunity to participate in the bonus event participation program is predetermined, randomly determined, determined based on a generated symbol or symbol combination, determined based on a random determination by the central controller, determined based on a random determination by one or more gaming devices, determined based on the status of one or more players (such as determined through a player tracking system), determined based on one or more side wagers placed, determined based on a player's primary game wager, determined based on time (such as the time of day), determined based on the amount of coin-in accumulated in one or more pools, or determined based on any other suitable method or criteria. In another embodiment, the gaming system automatically enrolls each player in the bonus event participation program.

In one embodiment, the gaming system establishes a gaming device account for participation in the bonus event participation program. In such embodiments, either a player or a gaming establishment operator can elect for a gaming device to participate in the bonus event participation program, wherein if the gaming device is determined to participate in the program, the gaming system establishes an account (or otherwise accesses a previously established account) for the gaming device. It should be appreciated that in this embodiment, the accumulation of one or more bonus event units are stored in an account associated with the gaming device and are not specific to the player that is playing that gaming device at any particular point in time.

In one embodiment, if the player has elected or elects to enroll or participate in the bonus event participation program, the modification of one or more of the available payouts from the player's currently played primary game includes modifying the paytable of such a primary game. In this embodiment, the gaming system modifies the paytable of the player's currently played primary game (by identifying one or more secondary game triggering elements, flagging such identified secondary game triggering elements to skip or defer any secondary game, and designating such identified secondary game triggering elements as bonus event unit generating elements or symbols) and proceeds in operation with this modified paytable.

In another embodiment, if the player has elected or elects to enroll or participate in the bonus event participation program, the modification of one or more of the available payouts from the player's currently played primary game includes utilizing a different paytable from another primary game. In this embodiment, the different paytable includes a plurality of symbols which are the same as the symbols from the previous paytable (i.e., non-secondary game triggering symbols) and a plurality of symbols which are different than the symbols from the previously paytable (i.e., secondary game triggering symbols). In this embodiment, rather than modifying the current paytable, the gaming system causes the player's gaming device to proceed in operation with a different paytable. In another embodiment, if the player has elected or elects to enroll or participate in the bonus event participation program, the modification of one or more of the available payouts from the player's currently played primary game includes activating an interrupt or override feature to prevent the gaming device from playing any triggered secondary games. It should be appreciated that in these embodiments, in the player changes one or more aspects or parameters of their primary game played (such as changing the amount of their wager, changing the number of paylines wagered on or changing to play a different primary game) and the player remains enrolled in the bonus event participation program, the gaming system modifies one or more of the available payouts from the player's currently played primary game as described herein. For example, if a player switches from a first primary game to a second primary game (either at the same gaming device or at a different gaming device) and the player remains enrolled in the bonus event participation program, the gaming system modifies one or more of the available payouts from the second primary game as described herein.

In another embodiment, the gaming system enables a player to purchase a designated quantity of bonus event units. In this embodiment, rather than accumulating bonus event units based on one or more aspects of game play, the gaming system enables the player to directly or indirectly purchase one or more bonus event units. In different embodiments, the quantity of bonus event units which the player may purchase and/or the cost of each purchased bonus event unit is predetermined, randomly determined, determined based on a generated symbol or symbol combination, determined based on a random determination by the central controller, determined based on a random determination by one or more gaming devices, determined based on the status of one or more players (such as determined through a player tracking system), determined based on one or more side wagers placed, determined based on a player's primary game wager, determined based on time (such as the time of day), determined based on the amount of coin-in accumulated in one or more pools, or determined based on any other suitable method or criteria.

In another embodiment, the gaming system funds a player's account with one or more bonus event units in association with a promotion. In this embodiment, the central server provides one or more bonus event units to a player for accepting or participating in a promotion. For example, in exchange for signing up for a gaming establishment's player loyalty club, for visiting a gaming establishment's website or some activity thereon, such as learning about a new game, or for trying a new game, the central server funds a player's account with one or more bonus event units. In another embodiment, the central server is configured to fund a player's account with modified quantities of bonus event units for a bonus event unit accumulation event occurring in association with a promotion. For example, during a designated promotion time at a gaming establishment, the central server funds a player's account with double bonus event units compared to the quantity of bonus event units the player would have received during the non-promotion time. In another embodiment, a bonus event unit accumulation event occurs in association with a player purchasing one or more items. For example, in exchange for purchasing a trip to a gaming establishment buffet, the central server funds a player's account with one or more bonus event units.

In another embodiment, the gaming system enables the player the opportunity to modify the quantity of bonus event units in the player's account. In one such embodiment, the gaming system provides a gamble feature, such as a suitable double-up type game, wherein if the player accepts to participate in this feature, the gaming system randomly determines whether to modify, such as double, the quantity of bonus event units in the player's account. In this embodiment, if the player is successful in this feature, the gaming system increases, such as doubles, the quantity of bonus event units in the player's account. On the other hand, if the player is unsuccessful in this feature, the gaming system decreases, such as halves, the quantity of bonus event units in the player's account. In one such embodiment, the gaming system enables the player to participate in this feature to modify the bonus event component associated with an available or upcoming bonus event (e.g., modify an applicable multiplier of 4× to either 8× or 1×).

In another embodiment, the gaming system funds the bonus event participation program by modifying the average expected payout of one or more secondary games and reallocating the amount of this modification to one or more secondary game triggering elements or symbols. In one such embodiment, if the bonus event participation enrollment event occurs, the gaming system identifies one or more secondary game triggering elements which cause the triggering of the secondary game (i.e., a symbol combination which causes a trigger of the secondary game) and flags such identified secondary game triggering elements to provide a secondary game with a modified average expected payout. That is, the gaming system modifies, such as decreases, the average expected payout associated with the secondary game which is triggered if the identified secondary game triggering elements are generated. It should be appreciated that in this embodiment, if such identified secondary game triggering elements are generated, the gaming system still provides the player a play of a secondary game, but the play of the secondary game has a modified average expected payout. For example, if a symbol combination of trigger symbol-trigger symbol-trigger symbol is associated with the triggering of a secondary game having an average expected payout of one-hundred credits, the gaming system modifies the average expected payout of this secondary game to fifty credits.

In this embodiment, after modifying the average expected payout for one or more secondary games, the gaming system: (i) identifies one or more secondary game triggering elements or symbols which do not, when generated by themselves, trigger a secondary game, but trigger a secondary game in combination with other symbols and (ii) flags such secondary game triggering elements or symbols as bonus event unit generating symbols. In this embodiment, the gaming system then determines and assigns a quantity of bonus event units, credits, points or counts for each identified bonus event unit generating symbol. Following the example, the gaming system designates the symbol combination of trigger symbol-bar symbol-bar symbol as a bonus event unit generating symbol combination and at least partially accounts for the reduction in the average expected payout of the secondary game from one-hundred credits to fifty credits by assigning ten bonus event units with such a symbol combination. In this example, if this symbol combination is subsequently generated in a play of a primary game, the player wagered one credit per payline and the player is enrolled in the bonus event participation program, the gaming system funds the player's account with ten bonus event units.

Accordingly, this embodiment provides a reallocation of the modified average expected payout of one or more secondary games amongst one or more symbol combinations which includes such flagged bonus event unit generating symbols. That is, the generation of one or more symbols which did not previously contribute to the total average expected payout of the gaming device (i.e., one or more symbols which did not by themselves trigger a secondary game, but triggered a secondary game in combination with other symbols and thus previously contributed 0% to the total average expected payout of the gaming device) will contribute to the total average expected payout of the gaming device in the form of bonus event units. For example, if a secondary game represents 15% of the total average expected payout of a gaming device and the gaming system modifies the average expected payout of this secondary game to represent 10% of the total average expected payout of the gaming device, to account for this 5% that is not provided to the player via the triggered secondary game, the gaming system determines a quantity of bonus event units for one or more symbol combinations that includes at least one designated bonus event unit generating symbol, wherein the quantity of bonus event units assigned to such symbols or symbol combinations represent the 5% that is not provided to the player via the triggered secondary game. In another embodiment, the gaming system modifies the average expected payout percentage of a paytable by modifying the quantity of bonus event units for one or more symbols combinations.

In another embodiment, the gaming system funds the bonus event participation program by modifying the payouts associated with one or more designated symbols or symbol combinations (described herein as one or more non-secondary game triggering elements or symbol combinations). In one such embodiment, if the bonus event participation enrollment event occurs, the gaming system modifies the payouts available for the player's currently played primary game by identifying one or more non-secondary game triggering elements and flagging such identified non-secondary game triggering elements to not provide the award amount associated with such non-secondary game triggering elements. That is, the gaming system removes the association with an award amount with such identified non-secondary game triggering elements. For example, if a symbol combination of bar symbol-bar symbol-bar symbol is associated with an award of ten credits (and is not associated with triggering the secondary game), the gaming system removes the award amount of ten credits associated with this symbol combination.

In one such embodiment, the gaming system then identifies such non-secondary game triggering elements as bonus event unit generating elements or bonus event unit generating symbols and determines and assigns a quantity of bonus event units, credits, points or counts for each designated bonus event unit generating symbol or bonus event unit generating symbol combination. Following the above-described example, the gaming system designates the symbol combination of bar symbol-bar symbol-bar symbol as a bonus event unit generating symbol combination and assigns fifty bonus event units with such a symbol combination. In this example, if this symbol combination is subsequently generated in a play of a primary game, the player wagered one credit per payline and the player is enrolled in the bonus event participation program, the gaming system does not provide the play any monetary award amount for this generation, but rather funds the player's account with fifty bonus event units.

In another embodiment, the gaming system funds the bonus event participation program by removing or modifying the payouts associated with one or more non-secondary game triggering elements or symbol combinations and modifying the average expected payout for any triggered secondary games. In this embodiment, the gaming system accounts for the amounts of the modified payouts for such non-secondary game triggering symbol combinations and any triggered secondary game by funding the player's account with an amount of bonus event units. In one such embodiment, the gaming system reduces the probability of being generated associated with one or more non-secondary game triggering symbol combinations (and/or reduces the probability of any secondary games being triggered). In another such embodiment, the gaming system reduces the award amount associated with one or more non-secondary game triggering symbol combinations (and/or reduces the average expected payout for any triggered secondary games).

In one example of this embodiment, if a symbol combination of bar symbol-bar symbol-bar symbol is associated with an award of ten credits (and is not associated with triggering the secondary game), and the symbol combination of trigger symbol-trigger symbol-trigger symbol is associated with a trigger of the secondary game (which has an average expected payout of one-hundred credits) the gaming system removes the award amount of ten credits associated with the bar symbol-bar symbol-bar symbol combination and assigns fifty bonus event units with this symbol combination. In this example, the gaming system further modifies the average expected payout of the secondary game to fifty credits and assigns two-hundred-fifty bonus event units with this symbol combination. In this example, if the bar symbol-bar symbol-bar symbol is subsequently generated in a play of a primary game, the player wagered one credit per payline and the player is enrolled in the bonus event participation program, the gaming system does not provide the play any monetary award amount for this generation, but rather funds the player's account with fifty bonus event units. Moreover, if the trigger symbol-trigger symbol-trigger symbol is subsequently generated in a play of a primary game, the player wagered one credit per payline and the player is enrolled in the bonus event participation program, the gaming system funds the player's account with two-hundred-fifty bonus event units and provides the player a play of a secondary game with an average expected payout of fifty credits. It should be appreciated that the gaming system disclosed herein may modify the payouts associated with any suitable symbol or symbol combination to fund the bonus event participation program described herein.

In another embodiment, the gaming system enables a player to place a side bet or side wager to participate in the bonus event participation program. In one such embodiment, the bonus event participation program is funded via such side bets, wherein if a secondary game triggering event occurs, the gaming system; (i) enables the player to participate in the secondary game and (ii) provides the player one or more bonus event units based on the player's wager (or side wager) and the bonus event unit generating symbols or elements which were generated. For example, rather than skipping a secondary game that contributed, on average, 14% of the total average expected payout of the gaming device (and reallocating this 14% of the total average expected payout in the form of bonus event units), the gaming system enables the player to play any triggered secondary games (which contributes, on average, 14% of the total average expected payout of the gaming device) and accounts for any bonus event units provided to the player via the side bets or side wagers placed. In this embodiment, for each generated bonus event unit generating element or symbol which is generated but does not trigger the secondary game, the gaming system funds the player's account with the appropriate quantity of bonus event units wherein such bonus event units are accounted for by the side bets or side wagers placed.

In another such embodiment, the bonus event participation program is funded via one or more side bets, wherein if a secondary game triggering event occurs, the gaming system: (i) enables the player to participate in a modified secondary game and (ii) provides the player one or more bonus event units based on the player's wager (or side wager) and the bonus event unit generating symbols or elements which were generated. For example, rather than skipping a secondary game that contributed, on average, 14% of the total average expected payout of the gaming device (and reallocating this 14% of the total average expected payout in the form of bonus event units), the gaming system enables the player to play a modified secondary game (which contributes, on average, 10% of the total average expected payout of the gaming device) and accounts for any bonus event units provided to the player via: (i) the side bets or side wagers placed and (ii) the reallocated 4% of the total average expected payout which is not provided via the triggered modified secondary game. In this embodiment, for each generated bonus event unit generating element or symbol which is generated but does not trigger the secondary game, the gaming system funds the player's account with the appropriate quantity of bonus event units wherein such bonus event units are accounted for by the side bets or side wagers placed and the reallocated average expected payout which is not provided via any triggered modified secondary games.

In different embodiments, one or more bonus event unit accumulation events may occur for each play of a primary game. In one such embodiment, each play of a primary game in which a plurality of paylines are wagered on provides the player multiple opportunities to accumulate bonus event units. For example, for one play of a primary game, a first bonus event unit generating symbol combination on a first payline may cause a first bonus event unit accumulation event which results in an accumulation of a first quantity of bonus event units and a second bonus event unit generating symbol combination on a second payline may cause a second bonus event unit accumulation event which results in an accumulation of a second quantity of bonus event units. Accordingly, in association with a play of a primary game, a plurality of events may occur which result in a plurality of quantities of bonus event units provided to the player.

In one embodiment, the gaming machines of the gaming system are operable to cause multiple bonus event unit accumulation events to occur for multiple players at the multiple linked gaming machines at the same time or substantially the same time. Alternatively, the gaming machines of the gaming system are operable to cause multiple bonus event unit accumulation events to occur for multiple players at the multiple linked gaming machines in an overlapping or sequential manner. In one such embodiment, an occurrence of a bonus event unit accumulation event results in a plurality of players each receiving one or more bonus event units. In another such embodiment, a plurality of these players receive the same amount of bonus event units. In another such embodiment, each of these players receives the same amount of bonus event units. In another such embodiment, a plurality of these players receive different amounts of bonus event units. In another embodiment, each of these players receives a different amount of bonus event units.

In another embodiment, a bonus event unit accumulation event occurs and a quantity of bonus event units are provided to a player based on an elapsed amount of time. For example, if a player has actively played a gaming device for a designated amount of time, the gaming system funds the player's account with a quantity of bonus event units. In another embodiment, a bonus event unit accumulation event occurs and a quantity of bonus event units are provided to a player based on a player's wagering history, such as an amount of coin-in associated with the player. For example, if a player has wagered a certain amount such that their coin-in at least meets a threshold, the gaming system funds the player's account with a quantity of bonus event units. In different embodiments, a bonus event unit accumulation event occurs (and a quantity of bonus event units are provided to a player) based on a predetermined event, based on a randomly determination, based on a random determination by the central controller, based on a random determination by one or more gaming devices, based on the status of one or more players (such as determined through a player tracking system), based on one or more side wagers placed, based on a player's primary game wager, or based on any other suitable method or criteria.

In one embodiment, upon at least one occurrence of a bonus event unit accumulation event, one bonus event unit is provided to a player. In another embodiment, upon at least one occurrence of a bonus event unit accumulation event, a plurality of bonus event units are provided to a player. In one such embodiment, as described above, the quantity or amount of bonus event units provided to a player is predetermined upon the occurrence of a bonus event unit accumulation event. In another embodiment, the quantity or amount of bonus event units provided to a player is based, at least in part, on a random determination upon the occurrence of a bonus event unit accumulation event. In one embodiment, for a plurality of gaming devices in the gaming system, the same amount of bonus event units are provided for each occurrence of a bonus event unit accumulation event. In another embodiment, for a plurality of gaming devices in the gaming system, different amounts of bonus event units are provided for each occurrence of a bonus event unit accumulation event.

In another embodiment, upon the occurrence of a bonus event unit accumulation event, the quantity or amount of bonus event units provided to a player is based, at least in part, on that player's status in a player tracking system. For example, upon an occurrence of an equivalent bonus event unit accumulation event for a plurality of players, a Gold Player is provided forty bonus event units, a Silver Player is provided thirty bonus event units, a Bronze Player is provided twenty bonus event units and an uncarded player is provided ten bonus event units.

In another embodiment, accumulated bonus event units are associated with an expiration date and time. In this embodiment, the gaming system/gaming device is configured to communicate to the player the proximity of the expiration of any stored bonus event units (i.e., "your bonus event units will expire at 6:00 am tomorrow"). In one embodiment, such notice of expiration of stored bonus event units is at the player's currently played gaming device. In another embodiment, such notice of expiration of stored bonus event units is external from the player's currently played gaming device, such as via e-mail. In different embodiments, bonus event units accumulated at different times are redeemed in order of expiration (first to expire shows first), or in order of first earned basis.

Redemption of Bonus Event Units

In addition to enabling one or more players to each skip any triggered secondary games in exchange for funding that player's account with an amount of bonus event units, the gaming system and method disclosed herein further enables these players to selectively redeem such bonus event units to participate in one or more bonus events or group bonus events. That is, if a player elects to participate in the bonus event participation program, the gaming system includes one or more redemption modes or bonus event redemption triggers that provide one or more players the opportunity to exchange some or all of their accumulated bonus event units for one or more plays of a selectively accessible bonus event to win one or more awards.

Figure 6:
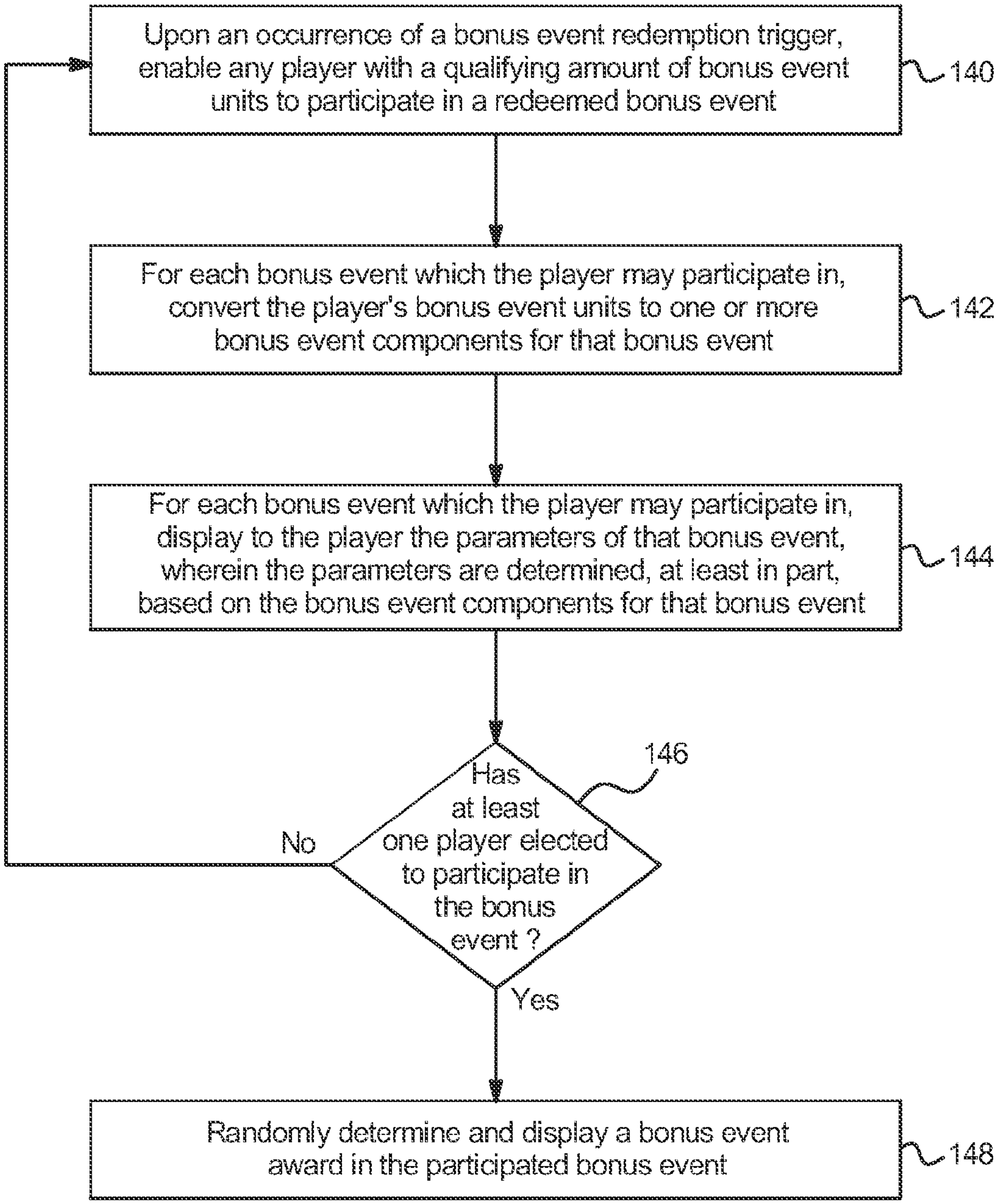
FIG. 6 is a flowchart of one embodiment of the gaming system disclosed herein illustrating a player redeeming a quantity of bonus event units for a play of a bonus event.

In one embodiment, upon an occurrence of a bonus event redemption trigger, the gaming system enables any player with a designated or qualifying amount of bonus event units to participate in a redeemed bonus event as indicated in block 140 of FIG. 6. In one embodiment, a bonus event redemption trigger occurs based on time. For example, at a designated point in time or after a designated time period, a bonus event redemption trigger occurs and the gaming system triggers one or more bonus events which zero, one or more players may participate in.

In another embodiment, zero, one or more bonus events are ongoing, perpetual or continuous bonus events which may be played at any time by the player. In this embodiment, as the bonus event is ongoing, the bonus event redemption trigger occurs when a player selects to participate in such an ongoing bonus event. For example, the gaming system may include a maze or path-type group bonus event that is continuously being played by zero, one or more players. In this example, a player's accumulation of the qualifying quantity of bonus event units to participate in this maze bonus event is the occurrence of the bonus event redemption trigger. In another embodiment, a bonus event redemption trigger occurs in association with a displayed event of a play of a primary game at one or more of the gaming devices in the gaming system. In another embodiment, a bonus event redemption event occurs independent of any displayed event in any play of any primary game at any of the gaming devices in the gaming system.

In one embodiment, the gaming system includes a plurality of different bonus events or group bonus events with different configurations that may be available at the same time, at substantially the same time, at overlapping times or at different times. In this embodiment, the gaming system enables different players to selectively access one or more of such available games to play (or attempt to play via an auction bidding sequence as described below). In different embodiments, the games a player may redeem their bonus event units for includes, but is not limited to:

(i) one or more activations or plays of a game of choice,
(ii) one or more activations or plays of a generic game,
(iii) one or more activations or plays of the player's current game,
(iv) one or more activations or plays of a primary game,
(v) one or more activations or plays of a bonus event,
(vi) one or more activations or plays of a selection game,
(vii) one or more activations or plays of an offer and acceptance type game,
(viii) one or more activations or plays of an advancement game,
(ix) one or more activations or plays of a competition type game,
(x) one or more activations or plays of an elimination style game,
(xi) one or more activations or plays of a path game,
(xii) one or more activations or plays of a skill game,
(xiii) one or more activations or plays of a perceived skill game, (xiv) one or more activations of an instant win bonus event,
(xv) one or more activations of a convert to cash bonus event,
(xvi) one or more activations or plays of a slot game,
(xvii) one or more activations or plays of a poker game,
(xviii) one or more activations or plays of a blackjack game,
(xix) one or more activations or plays of a bingo or keno game,
(xx) one or more activations or plays of a wheel game,
(xxi) one or more activations or plays of a game incorporating a physical device,
(xxii) one or more activations or plays of a game incorporating a non-physical device,
(xxiii) one or more activations or plays of a group game or event,
(xxiv) one or more activations or plays of a promotional game or event,
(xxv) one or more activations or plays of a game for one or more items of merchandise,
(xxvi) one or more activations or plays of a video game,
(xxvii) one or more activations or plays of a game at a gaming table,
(xxviii) one or more activations or plays of a tournament game,
(xxix) one or more drawing tickets,
(xxx) one or more modifiers of one or more game,
(xxxi) any game disclosed herein,
(xxxii) one or more free activations or plays of any game disclosed herein,
(xxxiii) any combination thereof, or
(xxxiv) any other type of game defined or desired by the gaming system operator.

In one embodiment, the game program of a gaming device in the gaming system includes a library of one or more of the games which, if available, a player may play in exchange for a quantity of bonus event units. In another embodiment, a library of one or more of the games which, if available, a player may play in exchange for a quantity of bonus event units is communicated from the central server.

In one embodiment, after determining that a bonus event redemption trigger has occurred, as illustrated in block 142, for each available bonus event which the player may participate in, the gaming system converts the player's bonus event units to one or more bonus event components for that bonus event. That is, a player's account is credited with a quantity of bonus event units which are subsequently converted to one or more bonus event components for the specific type of bonus event offered to the player to participate in. For example, if a competitive group free spin bonus event is triggered and a player qualifies to participate in the competitive group free spin bonus event, the gaming system converts each set of fifty bonus event units (i.e., a virtual or theoretical amount equivalent to $0.50) in the player's account to a 1× multiplier to be used in the competitive group free spin bonus event. In another example, if an ongoing maze or path-type group bonus event is triggered and a player qualifies to participate in the ongoing maze or path-type group bonus event, the gaming system converts each set of three bonus event units (i.e., a virtual or theoretical amount equivalent to $0.03) in the player's account to one step or move in the maze or path-type game.

After converting the player's bonus event units to one or more bonus event components for each of the player's qualifying bonus events, for each available bonus event which the player may participate in, the gaming system displays to the player the parameters of that bonus event, wherein the parameters are determined, at least in part, based on the bonus event components for that bonus event as indicated in block 144. That is, for each bonus event available for the player to participate in, the gaming system displays to the player the parameters of that bonus event if the player were to select to participate in such a bonus event. Following the example above, if a player with one-thousand-five-hundred bonus event units (i.e., a virtual or theoretical amount equivalent to $15.00) qualifies to participate in the triggered competitive group free spin bonus event, the gaming system displays to the player that the player may participate in the competitive group free spin bonus event with an applicable modifier of 30× (1500 bonus event units/50 bonus event units per 1× multiplier). In another example, if a player with one-thousand-five-hundred bonus event units (i.e., a virtual or theoretical amount equivalent to $15.00) qualifies to participate in the triggered ongoing maze or path-type group bonus event, the gaming system displays to the player that the player may participate in the maze or path-type game with 500 steps or moves (1500 bonus event units/3 bonus event units per step). It should be appreciated that at this point in time, the gaming system does not deduct any bonus event units from the player's account but rather determines and displays to the player the different parameters of the triggered bonus event the player may participate in if the player elects to proceed.

In one embodiment, after displaying to any qualified player (i.e., any player with a designated or qualifying amount of bonus event units) the parameters of each bonus event that they may participate in, the gaming system determines if at least one player elected to participate in the available bonus event as indicated in diamond 146. In one embodiment, if the gaming system determines that no players elected to participate in any available bonus event(s), the gaming system enables each player (that opted to participate in the bonus event participation program) to play one or more primary games and accumulate one or more bonus event units based on the outcomes of such primary games until another bonus event redemption trigger occurs as described above. In one such embodiment, if a player does not elect to participate in an available bonus event, the gaming system stores any bonus event units in that player's account to be redeemed at a later time on a future bonus event. In this embodiment, since the bonus event units are stored by the gaming system in the player's account, such bonus event units are transferable and the player may earn and redeem such bonus event units at a plurality of different gaming devices in the gaming establishment.

On the other hand, if at least one player elected to participate in an available bonus event, then after determining which bonus event, if any, the player will participate in, the gaming system randomly determines and displays a bonus event award in the participated bonus event as indicated in block 148. In this embodiment, the gaming system determines the bonus event award for the player based on the determined parameters for the bonus event the player elected to participate in. For example, if the player elects to redeem one-thousand-five-hundred bonus event units to participate in a competitive group free spin game with an applicable multiplier of 30× and the gaming system randomly determines a bonus event award of $60.00 for such free spins, the player's virtual account is reduced by one-thousand-five-hundred bonus event units and the player's credit meter is increased by $60.00. It should be appreciated that in this embodiment, the actual value of the player's redeemed bonus event units are determined based on the randomly determined bonus event award and the quantity of bonus event units the player redeemed to participate in that bonus event. For example, if a first player redeems one-thousand bonus event units (i.e., a virtual or theoretical amount equivalent to $10.00) from their player account and is provided an award of $10.00 in the bonus event, then each of the first player's bonus event units has an actual value of $0.01. In this example, if a second player redeems one-thousand bonus event units from their player account and is provided an award of $40.00 in the same or a different bonus event, then each of the second player's bonus event units has an actual value of $0.04. Thus, the gaming system disclosed herein provides bonus event units that have a theoretical or average expected value prior to being redeemed and an actual value after being redeemed, wherein the theoretical value and the actual value may differ.

Accordingly, the gaming system and method disclosed herein provides that the accumulation of one or more bonus event units occurs in association with a local gaming machine and the redemption of one or more bonus event units occurs in association with a remote server. That is, the local gaming machine determines if a player is provided one or more bonus event units and the remote server determines a bonus event award to provide to the player for the redemption of such bonus event units. Such a configuration provides that players playing a plurality of different primary games played at gaming machines from the same gaming machine manufacturer and/or a plurality of different primary games at gaming machines from different gaming machine manufacturers can each be credited with a quantity of bonus event units wherein the redemption of such bonus event units (and the delivery of any suitable content associated with one or more bonus events) is controlled by a gaming establishment remote server.

In one embodiment, to facilitate the bonus event participation program described herein, the remote server and gaming devices communicate messages, data or other suitable information pertaining to any aspect of the bonus event participation program, one or more bonus events and one or more player's accounts. In one such embodiment, the remote server communicates messages or data to one, more or each of the gaming devices regarding: (i) a player's enrollment in the bonus event participation program, (ii) one or more currently available bonus events, (iii) one or more upcoming bonus events, (iv) the quantity of bonus event units available to a player, (v) the determined bonus event component for a player; (vi) the minimum amount of bonus event units that must be redeemed or exchanged to participate in each bonus event, (vii) any help screens to describe a bonus event to a player, (viii) one or more timers for when one or more bonus events will occur, and (ix) any other information related to the bonus event participation program, one or more player's accounts, one or more bonus events or the gaming establishment In this embodiment, one, more or each of the gaming devices communicate messages or data to the remote server regarding: (i) a player's enrollment in the bonus event participation program, (ii) which bonus event the player selects to participate in, (iii) a quantity of bonus event units the player selects to exchange for a play of a bonus event, (iv) a player's preferences regarding one or more bonus events, (v) any notifications a player requests regarding one or more bonus event, and (vi) any other information related to the bonus event participation program, one or more player's account, one or more bonus events or the gaming establishment.

In one embodiment, one of the bonus events that the player may selectively participate in is a competitive free spin bonus event. In this embodiment, a plurality of players participate in a multi-round free spin bonus event wherein only certain players qualify to advance to subsequent rounds as the competitive free spin bonus event proceeds. In one embodiment, as mentioned above, in exchange for a player's quantity of bonus event units, the gaming system enables a player to participate in the free spin bonus event wherein the quantity of exchanged bonus event units determines the applicable multiplier for the free spins event. For example, as seen in FIG. 7, if each set of fifty bonus event units in a player's account is converted to a 1× multiplier to be used in the competitive free spin bonus event and a first player (i.e., Player A) exchanges five-hundred bonus event units to play in the free spin bonus event, the gaming system provides the first player an applicable multiplier of 10× for the free spin bonus event. In this example, if a second player (i.e., Player B) exchanges one-thousand-five-hundred bonus event units to play in the free spin bonus event, the gaming system provides the second player an applicable multiplier of 30× for the free spin bonus event.

In one such embodiment, after determining an applicable multiplier for each player that elected to participate in the free spins bonus event, the gaming system enables each of the participating players to play a first round of the free spin bonus event. In this embodiment, the first round (and all other rounds) includes a predetermined number of spins or symbol generations. This predetermined number of symbol generations is defined by the central server and may differ from one free spin bonus event to another.

After enabling each participating player to play the first round, the gaming system determines which players advance to the second round of the multi-round free spin bonus event. In one embodiment, the gaming system ranks each player's provided free spin bonus event awards (i.e., each player's score) for the first round (based on the symbol combinations generated and any applicable multiplier applied to the award associated with each generated symbol combination) and determines a quantity of players to advance to the next round. For example, as seen in FIG. 7, if ten players participated in the first round of the multi-round free spin bonus event, the gaming system ranks each of these ten players and determines that the top five ranked players are qualified to advance to the next round. It should be appreciated that since each player's ranking in the free spin bonus event (and thus the advancement from round to round of the free spin bonus event) is based, at least in part, on the applicable multiplier, player's that exchange greater quantities of bonus event units for greater applicable multipliers are at an advantage in the free spin bonus event. However, since each player's ranking in the free spin bonus event is also based on the symbols randomly generated for each free spin, every player, regardless of their applicable multiplier, is provided a chance to generate symbol combinations associated with large awards and thus advance to later rounds of the free spin bonus event.

After determining a quantity of players to advance to the next round, the gaming system enables each of the qualifying players to play the next round of the free spin bonus event. After the predetermined number of spins or symbol generations of this round, the gaming system determines which players qualify to advance as described above. This process continues until the gaming system determines a winner of the free spin bonus event. In this example, the gaming system determines that the second player (i.e., Player B) is the winner of this free spin bonus event.

Following the example described above (wherein the first player exchanges five-hundred bonus event units to participate in the free spin bonus event with an applicable multiplier of 10× and the second player exchanges one-thousand-five-hundred bonus event units to participate in the free spin bonus event with an applicable multiplier of 30×), the gaming system determined that the first player advanced to the second round of the free spin bonus event and was provided a free spin bonus event award of $10.00 and the second player advanced to the fourth and final round of the free spin bonus event was provided a free spin bonus event award of $45.00. In this example, since the first player (i.e., Player A) exchanged or redeemed five-hundred bonus event units from their player account and is provided a bonus event award of $10.00, then each of the first players bonus event units has an actual value of $0.02 and since the second player exchanged or redeemed one-thousand-five-hundred bonus event units from their player account and is provided a bonus event award of $45.00, then each of the second player's bonus event units has an actual value of $0.03. It should be appreciated that in this embodiment, the actual value for each player's bonus event unit is based, at least in part, on the random generations which occur in the free spin bonus event.

In one embodiment, one of the bonus events that the player may selectively participate in is a competitive maze or path-type group bonus event. Such a maze includes various maze entry points and one or more bonus event awards placed throughout. In this embodiment, a designated quantity of accumulated bonus event units equate to one move along the path or in the maze. That is, this embodiment provides that in exchange for a quantity of bonus event units, the gaming system enables a player to make a move through a maze to reach a destination. In this embodiment, the distance the player is able to move through the maze depends on the quantity of bonus event units funded in the player's account (which is based on the symbol combination generated and the player's wager on the payline which generated that symbol combination). Thus, players who play faster and wager great amounts may accumulate greater quantities of bonus event units and may move faster through the maze to obtain bonus event awards before other players.

In one such embodiment of the group maze bonus event, as mentioned above, the maze bonus event is continuously played wherein one or more players may join the maze group bonus event at any time. In another embodiment, at the start of each player's gaming session, each player enters the maze. In this embodiment, only if the player elects to participate in the maze bonus event and exchanges a quantity of bonus event units for a quantity of moves does the player move throughout the maze.

In one embodiment, as a player begins playing the maze group bonus event, the player is enabled to select one of a plurality of different starting positions for the player in the maze group bonus event. In another such embodiment, as a player begins playing the maze group bonus game, the gaming system determines a starting position for the player in the maze group bonus event. In one embodiment, as a player is playing the maze group bonus event, the player is enabled to select the direction of movement in the maze. In another such embodiment, an automatic option is available regarding the player's direction of movement. In one implementation of the group maze bonus event, one of the displays of the gaming device is used to provide a first person view of the maze and a small overview insert of the entire maze (to show where other players are as well as hints or locations of the bonus event awards).

In operation of one embodiment, as players (that selected to participate in the bonus event participation program and further elected to participate in the ongoing maze bonus event) are playing their primary game, each time their player account is credited with a quantity of bonus event units, the gaming system converts this quantity of bonus event units into a quantity of moves for the player throughout the maze. In this embodiment, if a player moves throughout the maze and locates a bonus event award in the maze, the player is provided the located bonus event award and that bonus event award is removed from the maze. That is, the maze bonus event provides a competitive bonus event wherein a plurality of players compete for a limited number of bonus event awards that populate the maze. In one embodiment, once a player moves to and locates a bonus event award, the gaming system notifies each of the other players participating in the maze bonus event that a bonus event award has been won. In another embodiment, the gaming system maintains at least a designated quantity of bonus event awards throughout the maze bonus event, wherein if the quantity of bonus event awards throughout the maze bonus event falls below this designated quantity (i.e., a plurality of bonus event awards are located), the gaming system adds additional bonus event award throughout the maze.

Figure 8:
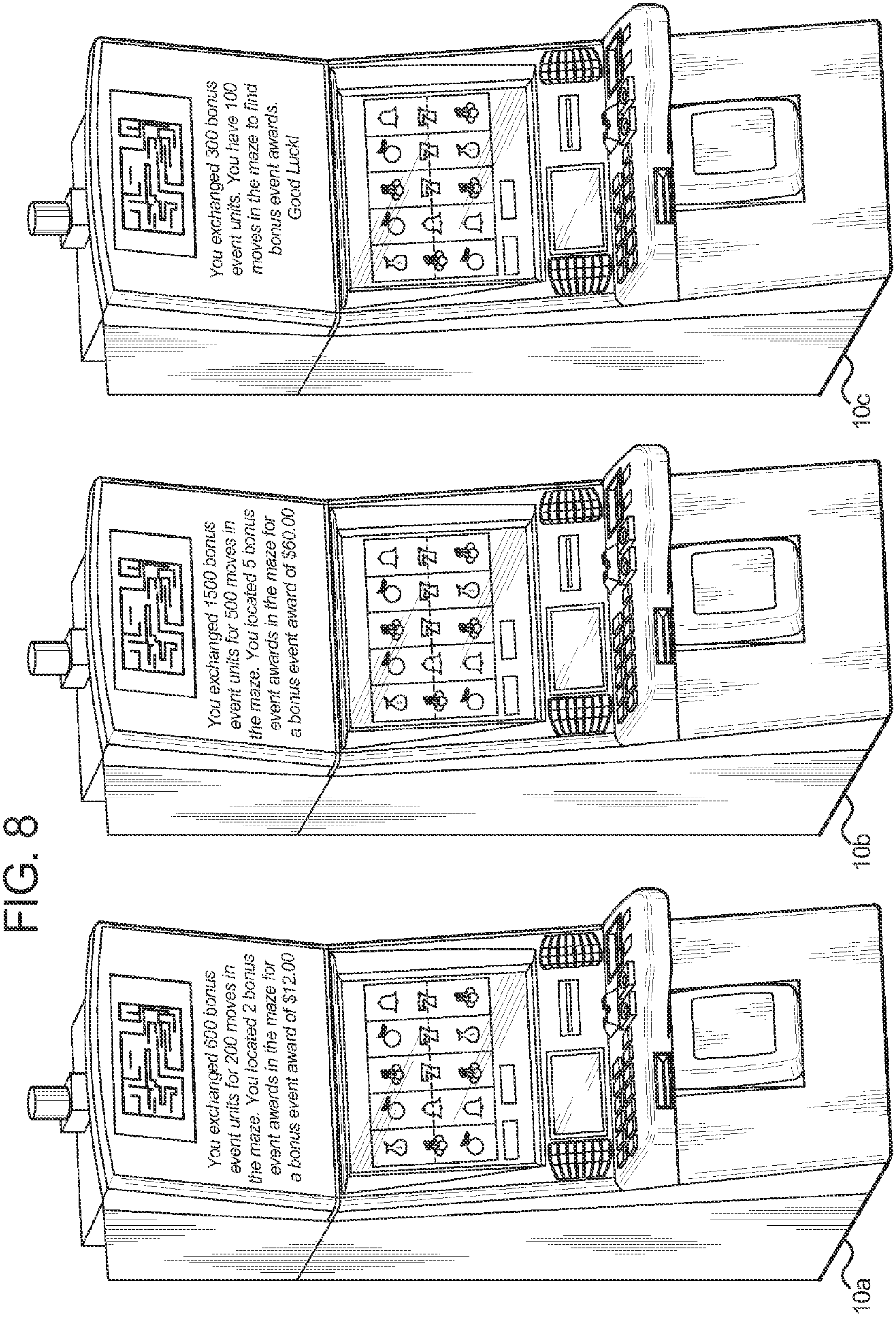
FIG. 8 is a schematic diagram of one embodiment of the gaming system disclosed herein illustrating a plurality of gaming machines each playing a community maze bonus event.

For example, as seen in FIG. 8, a first player at a first gaming device 10*a* exchanges six-hundred bonus event units to participate in the maze bonus event with two-hundred moves in the maze and is provided a bonus event award of $12.00 for locating two bonus event awards in the maze. The first gaming device displays appropriate messages such as "YOU EXCHANGED 600 BONUS EVENT UNITS FOR 200 MOVES IN THE MAZE" and "YOU LOCATED 2 BONUS EVENT AWARDS IN THE MAZE FOR A BONUS EVENT AWARD OF $12.00" to the player visually, or through suitable audio or audiovisual displays. In this example, a second player at a second gaming device 10*b* exchanges one-thousand-five-hundred bonus event units to participate in the maze bonus event with five-hundred moves in the maze and is provided a bonus event award of $60.00 for locating five bonus event awards in the maze. The second gaming device displays appropriate messages such as "YOU EXCHANGED 1500 BONUS EVENT UNITS FOR 500 MOVES IN THE MAZE" and "YOU LOCATED 5 BONUS EVENT AWARDS IN THE MAZE FOR A BONUS EVENT AWARD OF $60.00" to the player visually, or through suitable audio or audiovisual displays.

In this example, since the first player exchanged or redeemed six-hundred bonus event units (i.e., a virtual or theoretical amount equivalent to $6.00) from their player account and is provided a bonus event award of $12.00, then each of the first player's bonus event units has an actual value of $0.02 and since the second player exchanged or redeemed one-thousand-five-hundred bonus event units (i.e., a virtual or theoretical amount equivalent to $15.00) from their player account and is provided a bonus event award of $60.00, then each of the second player's bonus event units has an actual value of $0.04.

As further seen in FIG. 8, in this example, upon the first and second players concluding their play of the maze-type bonus event, a third player at a third gaming device 10*c* begins play of this ongoing maze-type bonus event by exchanging three-hundred bonus event units to participate in the maze bonus event with one-hundred moves in the maze. In this example, the gaming system enables the third player to move to various locations in the maze to try and locate one or more bonus event awards in the maze as described above. The third gaming device displays appropriate messages such as "YOU EXCHANGED 300 BONUS EVENT UNITS" and "YOU HAVE 100 MOVES IN THE MAZE TO FIND BONUS EVENT AWARDS. GOOD LUCK" to the player visually, or through suitable audio or audiovisual displays.

In another embodiment, the maze bonus event includes a plurality of different bonus event collectors, wherein each move the player makes in the maze bonus event is associated with a random award determination. In this embodiment, if the player reaches a bonus event collector in the maze bonus event, the amount of the reached bonus event award is based on the results of the random award determinations associated with the moves the player used to reach that bonus event collector. For example, if a player exchanged thirty bonus event units to participate in the maze bonus event with ten moves in the maze, then after the player's first move that did not reach a bonus event collector, the gaming system randomly determines an award amount of $0.25 to associate with that first move. In this example, if the player's seventh move in the maze results in the player reaching a bonus event collector, the gaming system provides the player a bonus event award which includes the results of the seven previous random award determinations for the seven previous moves in the maze.

In another embodiment, the maze bonus event includes a plurality of different bonus event collectors wherein if a player collects a bonus event collector, the amount of the bonus event award provided to the player is based on the quantity of bonus event units exchanged from the player's account. In one such embodiment, the gaming system determines a player's moves in the maze bonus event based on one or more symbols generated in one or more plays of a primary game. In one embodiment, the gaming system determines an multiplier or modifier for the bonus event collector and modifies the player's quantity of exchanged bonus event units by this multiplier. For example, if a player that exchanged one-thousand bonus event units to participate in the maze bonus event collects a bonus event collector in the maze, the gaming system determines multiplier of a 4× for the collected bonus event collector. In this example, the gaming system applies this determined 4× multiplier to the one-thousand bonus event units exchanged from the player's account to determine a bonus event award of $40.00 which is provided to the player. In this example, since the player exchanged or redeemed one-thousand bonus event units from their player account and is provided a bonus event award of $40.00, then each of the player's bonus event units has an actual value of $0.04 (wherein the actual value for each player's bonus event unit is based, at least in part, on the determination of the multiplier for the collected bonus event collector). Accordingly, this embodiment provides that rather than exchanging a quantity of bonus event units for a quantity of moves in the maze bonus event (as described above), a player exchanges a quantity of bonus event units for a bonus event award in the maze bonus event.

In another embodiment wherein the maze bonus event is an ongoing bonus event, the gaming system simultaneously maintains a plurality of mazes. In one such embodiment, the gaming system maintains a plurality of different mazes, wherein one or more mazes are each accessible by players of at least a designated player tracking level. For example, gold status players may participate in the gold maze bonus event and platinum status players may participate in the platinum maze bonus event. In another such embodiment, the gaming system maintains a plurality of different mazes having different available awards and/or different configurations.

In another embodiment, the gaming system maintains separate mazes for separate groups of players to play together. For example, the gaming system maintains a maze for a plurality of employees of a designated corporation wherein the employees participate in this maze bonus event together (and the designated corporation may fund the awards distributed in this maze). In one such embodiment, the gaming system enables a plurality of players to play the maze bonus event as a group, wherein if a designated quantity of the bonus event awards in the maze are located, the group of players continues on to another maze.

In another embodiment, the gaming system limits the number of players that may be participating in a designated maze at a given point in time. In one such embodiment, if the number of players participating in a designated maze (or attempting to participate in a designated maze) reaches a threshold, the gaming system initiates a new maze for one or more of such players to participate in. In another such embodiment, if the number of players participating in a designated maze (or attempting to participate in a designated maze) reaches a threshold, the gaming system employs a lobby or waiting room for players waiting to play in that maze.

In another embodiment, one of the bonus events that the player may selectively participate in is a play of an ongoing community selection bonus event. In one such embodiment, the gaming system displays a plurality of selections to a plurality of players. Each selection is associated with a bonus event award. In operation, the gaming system enables the player to redeem a quantity of bonus event units for a pick of one of the selections. If the player proceeds with this exchange, the gaming system enables the player to pick one of the selections. The gaming system reveals the bonus event award associated with the picked selection and contributes this bonus event award to a community selection bonus event pool. The gaming system continues this process as described above until a terminating event occurs (i.e., an elapsed period of time, a designated quantity of selections picked or a collector symbols is generated). Upon the occurrence of the terminating event, the community selection bonus event ends and each player is provided a portion of the current value of the community selection bonus event pool relative to the quantity of selections the player picked. For example, the gaming system converts each set of five bonus event units (i.e., a virtual or theoretical amount equivalent to $0.05) into a pick of a community selection bonus event and prior to the occurrence of the terminating event, a first player has redeemed two-hundred-fifty bonus event units to pick fifty of the selections (to reveal fifty bonus event awards which were contributed to the community selection bonus event pool). In this example, if the terminating event occurs at a first point in time and the player's portion of the community selection bonus event pool is $5.00, then each of the player's bonus event units has an actual value of $0.02. In another example, if the terminating event occurs at a second, different point in time and the player's portion of the community selection bonus event pool is $25.00, then each of the player's bonus event units has an actual value of $0.10. By providing each player a portion of the community selection bonus event pool, the gaming system of this embodiment provides that a player's selections in the community selection bonus event correspond to a player's equity or share in the community selection bonus event pool.

In another embodiment, upon an occurrence of a bonus event redemption trigger, the gaming system enables any player with a designated or qualifying amount of bonus event units to participate in an auction bidding sequence wherein the winner of the auction bidding sequence participates in a redeemed bonus event. In this embodiment, rather than enabling a player to directly participate in a bonus event, the gaming system includes one or more auction bidding sequences wherein the winning bid is provided a play of a bonus event, a prize or a mystery award. That is, the gaming system disclosed herein enables a player to participate in one or more auction sequences using the bonus event units accumulated in that player's account. In this embodiment, the gaming system converts a designated quantity of bonus event units into a designated quantity of auction points which the player may use to bid on the subsequent participation in a bonus event. For example, if the player elects to participate in an auction bidding sequence (to win a play of a bonus event), the gaming system converts each $0.03 of bonus event unit in the player's account to one point to bid in the auction bidding sequence.

In one embodiment, at a designated point in time, an auction bidding sequence begins. Each auction bidding sequence is at least associated with a minimum bid amount for that auction bidding sequence and the bonus event the winner of such an auction bidding sequence will participate in. In one embodiment, an auction bidding sequence ends after a predetermined amount of time. In another embodiment, an auction bidding sequence ends after a length of time which is based on player activity or player inactivity. For example, if all players stop bidding in an auction bidding sequence for a designated amount of time, such as five seconds, the gaming system concludes the auction bidding sequence.

Figure 9A:
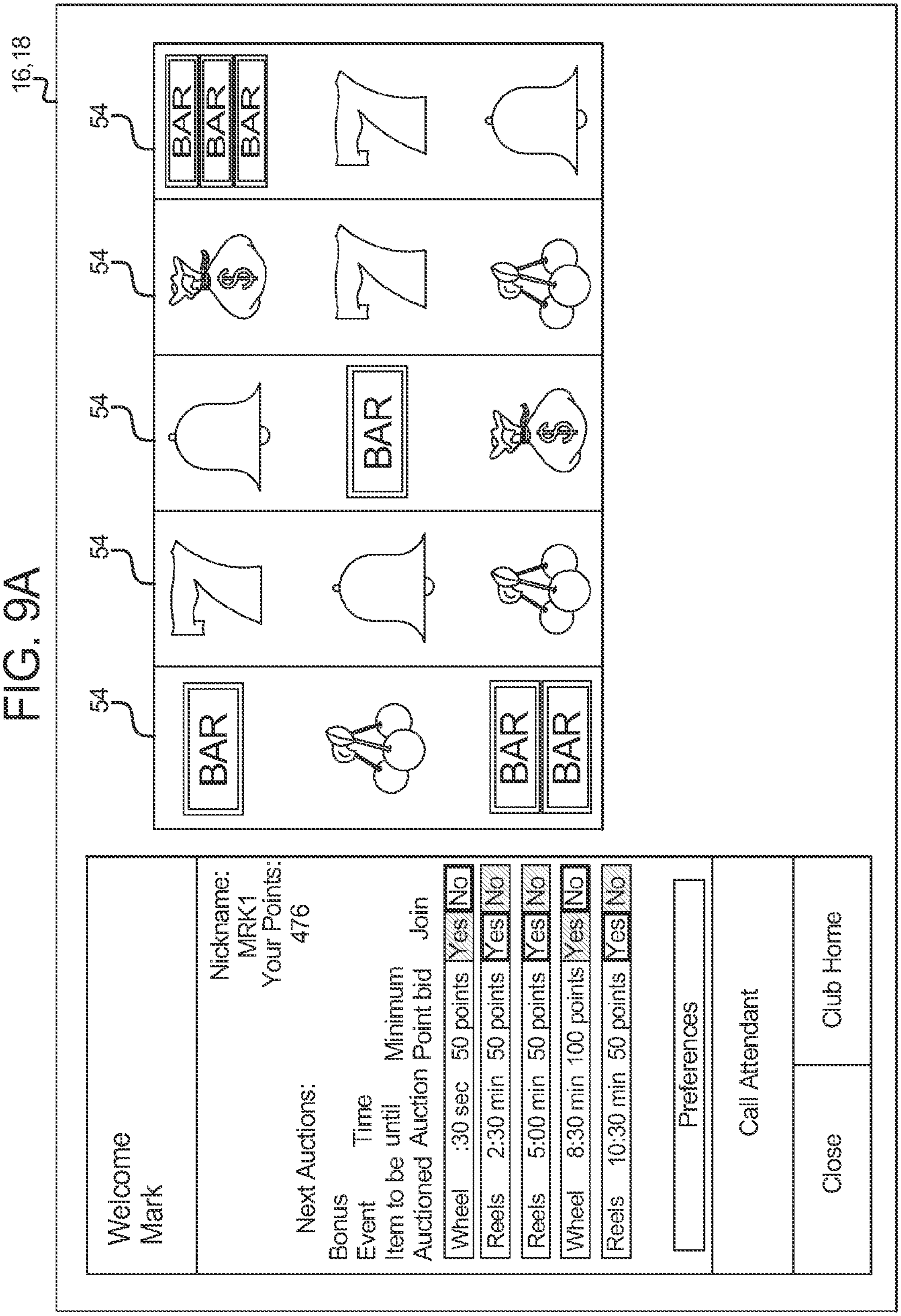
FIGS. 9A and 9B are enlarged elevation views of the display of one embodiment of a gaming device of the gaming system disclosed herein illustrating a display of information to a player regarding the player's current quantity of bonus event units and the status of any upcoming bonus events.

In one embodiment, as seen in FIG. 9A, the gaming system utilizes at least part or all of a display device on one or more gaming devices to display: (i) the quantity of auction points available to the player (i.e., which is a ratio of the amount of bonus event units in the player's account), (ii) any currently running auction bidding sequences, (iii) any upcoming auction bidding sequences, (iv) which type of bonus event the player that places the winning bid in the auction bidding sequence will participate in, (v) the minimum amount of auction points that must be redeemed or exchanged to participate in each auction bidding sequence, (vi) any help screens to describe the auction bidding sequence to the player, and (vii) any other information related to the player's account, one or more auction bidding sequences or the gaming establishment. In one such embodiment, the gaming system utilizes one or more service windows, pop-up windows or non-overlapping windows, such as described in U.S. Published Patent Application No. 2007/10243925 to convey any suitable information to the player.

It should be appreciated that although the gaming system displays to the player the type of bonus event the player that places the winning bid will participate in, the gaming system does not display any value for such a bonus event. Rather, at most the gaming system discloses to the player that the award for the winning bid will be at least of a certain value or at least enable the player to participate in a certain award opportunity. Accordingly, the gaming system disclosed herein provides an auction bidding sequence in which players bid on bonus events of unknown value to the player.

In one embodiment, if an auction bidding sequence is currently in progress, then during the predetermined amount of time which that auction bidding sequence runs, the gaming system enables any players with at least one auction point (or a designated amount of auction points) to bid on participating in a bonus event with an unknown value. In this embodiment, after the auction bidding sequence concludes, the gaming system determines which player placed the winning auction bid (i.e., which player placed the highest auction bid). The gaming system reduces this player's bonus event unit account with an amount of bonus event units equal to their winning bid and maintains each of the remaining player's bonus event unit accounts.

For example, at a designated point in time, the gaming system beings an auction bidding sequence (which will last for 90 seconds). During this auction sequence, for any players that opted to participate in the bonus event participation program, the gaming system converts $0.03 of bonus event units into one auction point to be used in the triggered auction sequence. As seen in FIG. 10, for an example auction bidding sequence, Player A had $18.00 of bonus event units which converted to 600 auction points, Player B had $12.60 of bonus event units which converted to 420 auction points and Player C had $36.09 of bonus event units which converted to 1203 auction points. During this auction bidding sequence, any participating players placed zero, one or more bids until the end of the 90 second auction time period. After the auction bidding sequence, the gaming system determines that Player A had the winning auction bid of 500 points (which is greater than the highest bids of 340 auction points and 495 auction points by Players B and C, respectively). Accordingly, Player A's account is decreased by $15.00 of bonus event units (or 500 auction points×$0.03 bonus event units per point) and Player B and Player C's accounts remain unchanged.

After determining the winner of the auction bidding sequence, the gaming system determines, based on the average expected value of the redeemed bonus event units and the quantity of bonus event units the player elected to redeem to participate in the bonus event, an average expected payout for the bonus event to be provided. For example, after determining that Player A's bid of 500 auction points wins the auction bidding sequence and deducting $15.00 of bonus event units from the Player A's account, the gaming system determines that a bonus event with an average expected payout of $15.00 (or 500 auction points×$0.03 bonus event units per point) should be provided to Player A.

In this embodiment, after determining an average expected payout for the bonus event to be provided to the player, the gaming system configures or modifies one or more aspects of the bonus event to be provided based on the determined average expected payout for the bonus event. Based on this determined average expected value for the bonus event, the gaming system determines one or more aspects or features of the bonus event to provide to the player. The gaming system proceeds in providing the bonus event (including the determined features) to the player and randomly determines an award for the player in the bonus event. Following the example described above, as illustrated in FIG. 10, the gaming system displays a bonus event (with an average expected payout of $15.00) to the player and randomly determines an award of $75.00 to be provided to the player. It should be appreciated that in this example, since the player redeemed $15.00 of bonus event units from their player account and is provided an award of $75.00 in the bonus event, then each of the player's bonus event units has an actual value of $0.05 (and each auction point has a value of $0.15). It should be appreciated that in this example, the gaming system utilizes a ratio of one auction point to three bonus event units. Such a ratio enables the gaming system to provide one or more bonus events to the winner of the auction bidding sequence wherein such bonus events employ a paytable that greatly exceeds 100% in average expected payback percentage.

In one embodiment, the winning bid of the auction bidding sequence is provided a free spin bonus event. In one such embodiment, based on the determined average expected payout of the bonus event, the gaming system determines one or more aspects or configurations of the free spin bonus event to provide to the player that placed the winning bid in the auction bidding sequence. In another such embodiment, after determining the average expected payout for the free spin bonus event, the gaming system accesses a predetermined free spin bonus event configuration which is based on this determined average expected payout, and includes data or information related, but are not limited to: (i) which reel configuration of a plurality of reel configuration of different average expected payouts to utilize, (ii) any modifiers to apply to any free spins, (iii) a quantity of paylines to employ with the free spins, and (iv) a number of free spins to provide for the free spin bonus event.

Utilizing the above example, if the bonus event provided to the player for winning the auction is a free spin bonus event, the gaming system configures the bonus event (such as by selecting at least a number of free spins and/or a multiplier to apply to each free spin) such that the provided free spin bonus event will have an average expected payout of $15.00. In this example, based on the determined average expected payout for the bonus event, the gaming system determines a number of free spins (from a range of free spins), an applicable multiplier for each free spin (from a range of multipliers) and a paytable to use (from a plurality of paytables). For example, if the gaming system determines an average expected payout of $15.00 for the free spins bonus event, the gaming system determines that five free spins with an applicable multiplier of 3× and utilizing a paytable with an average expected payout of $1.00 per spin would provide a free spins bonus event with an average expected payout of $15.00. In a similar example, if the gaming system determines an average expected payout of $15.00 for the free spins bonus event, the gaming system determines that 10 free spins with an applicable multiplier of 10× and utilizing a paytable with an average expected payout of $0.15 per spin would provide a free spins bonus event with an average expected payout of $15.00. It should be appreciated that in this example, even though the gaming system configured the provided free spin bonus event to have an average expected payout of $15.00, since the free spin bonus event includes one or more random generations which determine the awards for the bonus event, the actual payout provided for the bonus event (in this example, $75.00) may be the same as or different than the average expected payout.

In another embodiment, the winning bid of the auction bidding sequence is provided a selection game. In this embodiment, based on the determined average expected payout of the bonus event, the gaming system determines one or more aspects or configurations of the selection bonus event to provide to the player that placed the winning bid in the auction bidding sequence. In one such embodiment, based on the determined average expected payout for the bonus event, the gaming system determines an applicable paytable to use for the selection bonus event. In this embodiment, the applicable paytable includes a plurality of modifiers or multipliers and a probability of each modifier being selected for the play of the selection bonus event. In operation, the gaming system selects, based on the determined probabilities associated with the determined modifiers, a modifier for the selection bonus event. The selected modifier is then applied to the winning bid to determine an award for the selection bonus event. For example, if the winning bid is 1000 auction points and a multiplier of 1× is selected, the player is provided an award of $10.00. In another example, if the winning bid is 1000 auction points and a multiplier of 3× is selected, the player is provided an award of $30.00.

In another embodiment, the winning bid of the auction bidding sequence is provided a bonus event including one or more spins of a wheel. In this embodiment, the gaming system determines the award values to display on the segments of the wheel based on the determined average expected payout for the bonus event. For example, if the winning bid is provided one spin of the bonus wheel and the determined average expected payout for the bonus event is $15.00, the gaming system displays different values on the bonus wheel (and associates different probabilities of such values being indicated on the bonus wheel) such that one spin of the bonus wheel has an average expected payout of $15.00. In different embodiments, after determining the average expected payout for the wheel bonus event, the gaming system determines, based on this determined average expected payout, one or more aspects of the wheel bonus event, wherein such aspects include, but are not limited to: (i) which of a plurality of wheels of different average expected payouts to utilize, (ii) any modifiers to apply to any spins of the wheel, (iii) a quantity of indicators to employ with the wheel, and (iv) a quantity of spins of the wheel. In another embodiment, after determining the average expected payout for the wheel bonus event, the gaming system accesses a predetermined wheel bonus event configuration which is based on this determined average expected payout, and includes data or information related, but are not limited to: (i) which of a plurality of wheels of different average expected payouts to utilize, (ii) any modifiers to apply to any spins of the wheel, (iii) a quantity of indicators to employ with the wheel, and (iv) a quantity of spins of the wheel.

In one embodiment, the auction bidding sequence includes one or more award threshold levels. In this embodiment, if the amount of the bid reaches or exceed such an award threshold level, the gaming system provides that the award associated with the reached award threshold level may be part of the award provided to the player for winning the auction bidding sequence. For example, if 1000 auction points is the award threshold level to enable a progressive award, then once the current bid in the auction bidding sequence reaches 1000 auction points, the gaming system provides that the progressive award may be provided to the player that wins the auction bidding sequence. In one such example, if the bonus event associated with the auction bidding sequence is a wheel bonus event, then once the current in the auction bidding sequence reaches 1000 auction points, the gaming system provides that at least one of the segments of the wheel will be associated with this progressive award. Such award threshold levels encourages players to place higher bids to make the bonus event (that results from the auction bidding sequence) more lucrative to such players.

In another embodiment, the gaming system disclosed herein utilizes one or more deferred bonus event accumulation pools to account for the average expected payout of any deferred bonus events. In this embodiment, a portion of the average expected payout of any deferred bonus events is contributed (in the form of bonus event units) into a deferred bonus event accumulation pool. That is, if a player enrolled in the bonus event participation triggers a secondary game, rather than funding the player's account with an amount of bonus event units equal to the average expected value of the deferred secondary game, the gaming system funds the player's account with an amount of bonus event units partially equal to the average expected value of the deferred secondary game and further funds a deferred bonus event accumulation pool with an amount of bonus event units partially equal to the average expected value of the deferred secondary game. In this embodiment, upon a suitable triggering event, the gaming system provides part or all of these contributed bonus event units in such a deferred bonus event accumulation pool to one or more players that elected to participate in the bonus event participation program.

In one such embodiment wherein different players participate in an auction bidding sequence to play a bonus event, the gaming system converts an amount of bonus event units (from the deferred bonus event accumulation pool) into a quantity of auction points, adds this quantity of auction points to the winning bid in the auction bidding sequence and provides an award to the player based on this modified winning bid. For example, if the winning bid was 1000 auction points and the deferred bonus event accumulation pool includes $6.00 of bonus event units (which is converted to 200 auction points), the gaming system determines an average expected payout for the bonus event based on a winning bid of 1200 auction points. In another such embodiment, after the player participates in a bonus event as described above, the gaming system provides part or all of the deferred bonus event accumulation pool to the player.

In another embodiment, the gaming system provides one or more players that participated in, but did not win, the auction bidding sequence a chance to participate in a bonus event to win an award. In this embodiment, for each player, the average expected value of such an award is based on a multiplier associated with the player's final ranking in the auction bidding sequence and the player's quantity of bid auction points. In one such embodiment, the gaming system ranks each player that placed a non-winning bid and assigns an average expected multiplier value to each ranked player, wherein the average expected multiplier value is based on the player's relative ranking. For example, as seen in FIG. 11, if the winner of the auction bidding sequence will play a selection bonus event that utilizes a paytable with an average expected multiplier value of 3, the second place finisher in the auction bidding sequence will be offered a play of a selection bonus event that utilizes a paytable with an average expected multiplier value of 2.9 and the third place finisher in the auction bidding sequence will be offered a play of a selection bonus event that utilizes a paytable with an average expected multiplier value of 2.8.

In this embodiment, after assigning an average expected multiplier to each ranked player, the gaming system enables each of these ranked players to accept a play of the offered bonus event or reject a play of the offered bonus event. In this embodiment, if the player rejects a play of the offered bonus event, the player retains their accumulated bonus event units for another play of another redeemed bonus event as described above. On the other hand, if the player accepts a play of the offered bonus event, the gaming system deducts an amount of bonus event units equal to the player's bid and enables the player to play the bonus event (utilizing a paytable with the average expected multiplier value determined for that player's ranking). In this embodiment, as described above, the player's award for the bonus event is based on the multiplier selected for the play of the bonus event and the player's bid quantity of auction points. Accordingly, this embodiment provides that the paytable utilized in one or more bonus events is determined based on the player's relative ranking in the auction bidding sequence and not on the quantity of auction points the player bid in such a sequence.

In another embodiment, the gaming system enables one or more players to exchange a quantity of bonus event units from the player's account for an instant win bonus round. In this embodiment, the gaming system determines, based on the player's quantity of redeemed bonus event units, an instant win bonus round award to provide to the player. For example, if the player is leaving the gaming device or the player's credit meter is at or approaching zero credits, the player elects to redeem one-thousand bonus event units in an instant win bonus round. In this example, the gaming system determines an instant win bonus round award of $8.00, reduces the player's account by one-thousand bonus event units and credits the player's credit meter with $8.00.

In one such embodiment, if the player elects to participate in an instant win bonus round, the gaming system provides the player a total average expected payout equal to the average expected payout if the player elected not to participate in the bonus event participation program (and less than the total average expected payout utilized for participating in the bonus event participation program). For example, if a gaming device has an average expected payout percentage of 85% (of which 12% is provided to players in the form of one or more bonus events), then for any players which elect to participate in the bonus event participation program, the gaming system utilizes a modified paytable that accounts for 17% of the average expected payout percentage provided to players in the form of bonus event units. In this example, if any player elects to participate in the bonus event participation program and subsequently elects to participate in an instant win bonus round (in exchange for a quantity of bonus event units), the gaming system provides that the gaming device determines an award in the instant win bonus round according to a paytable with a total average expected payout percentage of 85%. That is, if the player elects to participate in an instant win bonus round, the gaming system does not provide the player the higher average expected payout percentage that accompanies enrollment in the bonus event participation program. In another such embodiment, if the player elects to participate in an instant win bonus round, the gaming system provides the player a total average expected payout equal to the average expected payout if the player elected to participate in the bonus event participation program.

In another embodiment, the gaming system enables a player to auction off one or more of their bonus event units in an open auction format. In this embodiment, a first player inputs a quantity of their bonus event units to auction off and zero, one or more other players bid an amount of credits for this quantity of bonus event units. After a winning bid has been determined, the gaming system reduces the first player's account by the quantity of auctioned off bonus event units, funds the first player's credit meter by the amount of credits of the winning bid. The gaming system also determines which other player won the auction, reduces that player's credit meter by the amount of credits of the winning bid and increases that player's account by the quantity of auctioned off bonus event units.

Figure 9B:
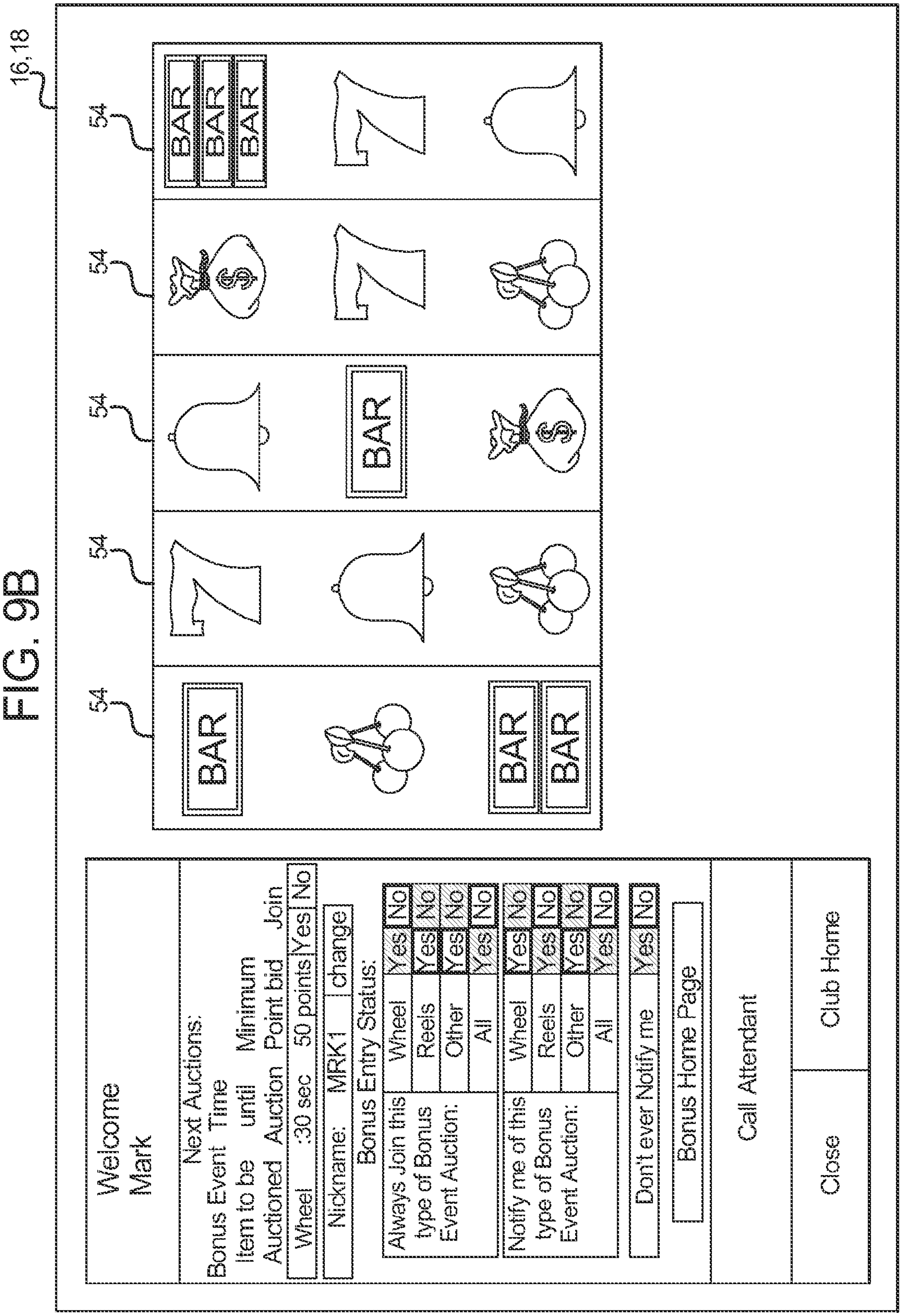

In one embodiment, in addition to utilizing the service window to display to certain player information as seen in FIG. 9A, the gaming system further enables a player to utilize the service window to input preferences or reservations for any upcoming bonus events. In this embodiment, as seen in FIG. 9B, the gaming system enables the player to input rules regarding: (i) which bonus events or types of bonus events to automatically enter to play, (ii) which auction bidding sequences to automatically place the minimum bid on, (iii) which bonus events to notify (or never notify) the player are upcoming, and (iv) which auction bidding sequences to notify (or never notify) the player are upcoming. In another embodiment, the gaming system enables the player to input rules regarding which auction bidding sequences to automatically bid all the player's auction points on. In different embodiments, the gaming system enables the player to input one or more rules regarding: (i) which recently added bonus events to notify (or never notify) the player about, (ii) which bonus events that will be added in the future to notify (or never notify) the player about, (iii) which currently available or upcoming non-auction bonus event to notify (or never notify) the player about, and (iv) any available or upcoming bonus event unit exchange programs to notify (or never notify) the player about. That is, the gaming system disclosed herein provides a personal notification system for player participation in different bonus events.

In one alternative embodiment, one or more auction bidding sequence are not provided with any specific type of bonus event. In this embodiment, after determining the player that placed the winning bid in the auction bidding sequence and determining an average expected payout for the bonus event to be provided, the gaming system selects one of the plurality of different types of bonus events disclosed herein to display to the player. In this embodiment, regardless of the type of bonus event displayed to the player, the gaming system configures one or more parameters of this bonus event such that the bonus event has an average expected payout equal to the determined average expected payout. In different embodiments, the determination of which type of bonus event to provide to the player is predetermined, randomly determined, determined based on a random determination by the central controller, determined based on a random determination by one or more gaming devices, determined based on the status of one or more players (such as determined through a player tracking system), determined based on a generated symbol or symbol combination, determined based on one or more side wagers placed, determined based on a player's primary game wager, determined based on the amount of coin-in accumulated in one or more pools, or determined based on any other suitable method or criteria.

In another embodiment, rather than funding a player's account with a quantity of bonus event units which the player may subsequently selectively convert into one or more bonus event components for one or more plays of a bonus event (as described above), the gaming system maintains a different bonus event component meter for each available or upcoming bonus event. In this embodiment, upon the occurrence of a bonus event unit accumulation event, the gaming system automatically converts any accumulated bonus event units into one or more bonus event components and increments the appropriate bonus event component meter accordingly. For example, rather than funding a player's account with thirty bonus event units, the gaming system automatically increments the applicable multiplier for a free spins bonus event by 2×.

In one embodiment wherein the gaming system is utilizing accumulated bonus event units to build or increment a bonus event component, if the player decides to participate in a different bonus event than the bonus event which the bonus event component is incrementing for, the gaming system enables the player to transfer the balance of one bonus component meter to another bonus component meter. In another embodiment, if the player decides to participate in a different bonus event than the bonus event which the bonus event component is incrementing for, the gaming system requires the player to increment the bonus event component meter for the different bonus event from a base or designated level or amount.

In one such embodiment wherein the gaming system is utilizing accumulated bonus event units to build or increment a bonus event component, upon the occurrence of a bonus event unit accumulation event, the gaming system builds or increments a player selected bonus event component. In another such embodiment, upon the occurrence of a bonus event unit accumulation event, the gaming system determines which bonus event components are applicable for any available or upcoming bonus events and selects one of these bonus event components to build or increment. In different embodiments, which bonus event component is incremented is determined based on the average expected payouts for any available or upcoming bonus events, predetermined, randomly determined, determined based on a random determination by the central controller, determined based on a random determination by one or more gaming devices, determined based on the status of one or more players (such as determined through a player tracking system), determined based on a generated symbol or symbol combination, determined based on one or more side wagers placed, determined based on a player's primary game wager, determined based on the amount of coin-in accumulated in one or more pools, or determined based on any other suitable method or criteria.

In another embodiment, the gaming system maintains a different bonus event component meter for each available or upcoming bonus event. In this embodiment, upon the occurrence of a bonus event unit accumulation event, the gaming system builds or increments a plurality of bonus event components. For example, rather than funding a player's account with thirty bonus event units, the gaming system increments the applicable multiplier for a free spins bonus event by 1× and increments the amount of available steps or moves in a maze-type bonus event by three steps. In one such embodiment, the gaming system builds or increments different bonus event component meters at the same rate. In another such embodiment, the gaming system builds or increments different bonus event component meters at different rates. In different embodiments, the relative contribution to each bonus event component is determined based on the average expected payouts for any available or upcoming bonus events, predetermined, randomly determined, determined based on a random determination by the central controller, determined based on a random determination by one or more gaming devices, determined based on the status of one or more players (such as determined through a player tracking system), determined based on a generated symbol or symbol combination, determined based on one or more side wagers placed, determined based on a player's primary game wager, determined based on the amount of coin-in accumulated in one or more pools, or determined based on any other suitable method or criteria.

In another embodiment, the gaming system provides that different bonus event unit generating elements or symbols fund or increment different meters at different rates. For example, the gaming system determines that a symbol combination with two bonus event unit generating symbols increments a bonus event component meter for a maze-type bonus event but does not increment a bonus event component meter for a free spins bonus event. In this embodiment wherein different bonus event unit generating elements fund different bonus event components at different rates, the average expected payout for the bonus event remains the same. That is, if the gaming system funds a bonus event component meter for a maze-type bonus event but not a free spins bonus event when a symbol combination including two bonus event unit generating symbols is generated, the gaming system provides that when a symbol combination including three bonus event unit generating symbols is generated, the gaming system funds a bonus event component meter for the free spins bonus event by a greater amount than the funding of the bonus event component meter for the maze-type bonus event. Such an increased amount of funding of this bonus event component meter accounts for not funding this bonus event component meter when the symbol combination including two bonus event unit generating symbols was generated.

In another embodiment, the gaming system enables a plurality of players to accumulate and redeem bonus event units as a group. In one embodiment, the central server determines one or more groups of gaming devices or groups of players. In another embodiment, the gaming system operator determines one or more groups of gaming devices or groups of players. In another embodiment, the gaming system enables one or more players to input or otherwise communicate to the gaming system a list of other players to form a group. In different embodiments, one or more formed groups are determined based on a type of gaming device, determined based on a game theme, predetermined, randomly determined, determined based on a generated symbol or symbol combination, determined based on the status of one or more players (such as determined through a player tracking system), determined based on one or more side wagers placed, determined based on a player's primary game wager, determined based on time (such as the time of day), determined based on the amount of coin-in accumulated in one or more pools, or determined based on any other suitable method or criteria.

In one embodiment, if the gaming system determines to provide one or more bonus event units to a designated player in a group (i.e., the occurrence of a bonus event unit accumulation event), at least one, a plurality of or each of the other players included in the designated player's group are provided one or more bonus event units. In one such embodiment, the bonus event units to be provided to the designated player are split or shared amongst the players in the designated player's group. In another such embodiment, one or more of the players in the designated player's group are provided the same quantity of bonus event units which the designated player would have received individually. In another such embodiment, the designated player is provided the same quantity of bonus event units which they would have received individually and one or more of the remaining players in the designated player's group are provided a different quantity of bonus event units.

In another embodiment, if a designated player in a group of players redeems their accumulated bonus event units in exchange for a play of a game (i.e., the occurrence of a bonus event unit redemption event), at least one, a plurality of or each of the other players included in the designated player's group are provided at least one play of the redeemed game. In one such embodiment, each player in the group that is provided at least one play of the redeemed game utilizing the same parameters as the designated player's redeemed game. In another such embodiment, each player in the group that is provided at least one play of the redeemed game utilizing the parameters specific to that player's gaming device or alternatively a generic gaming device.

In another embodiment, upon the occurrence of a bonus event unit accumulation event, the group of players is provided a quantity of bonus event units as a separate entity (i.e., the gaming system establishes a group account for any bonus event units). In this embodiment, the group of players is enabled to redeem the bonus event units for one or more plays of one or more bonus events, wherein any awards provided for the redeemed bonus events are distributed amongst the players in the group. In different embodiments, the distribution of such awards is determined based on a type of gaming device, determined based on a game theme, predetermined, randomly determined, determined based on a generated symbol or symbol combination, determined based on the status of one or more players (such as determined through a player tracking system), determined based on one or more side wagers placed, determined based on a player's primary game wager, determined based on time (such as the time of day), determined based on the amount of coin-in accumulated in one or more pools, or determined based on any other suitable method or criteria.

In another embodiment, the gaming system enables a plurality of players to accumulate bonus event units individually and redeem their accumulated bonus event units as a group. In another embodiment, the gaming system enables a plurality of players to accumulate bonus event units as a group and redeem their accumulated bonus event units individually.

In another embodiment, the gaming system enables a player to redeem any accumulated bonus event units for a play of one or more primary games. In this embodiment, if the player selects to cause a bonus event unit redemption event to occur, the gaming system enables the player to exchange different quantities of bonus event units for different wagers placed on different possible outcomes for the primary game. In another embodiment, the gaming system enables a player to redeem any accumulated bonus event units for a modification to one or more aspects of a primary game. In this embodiment, if the player selects to cause a bonus event unit redemption event to occur, the gaming system enables the player to selectively utilize their accumulated bonus event units to determine which aspects of one or more primary games to change and when these changed aspects are to be implemented. In different embodiments, in exchange for a quantity of bonus event units, for a designated number of games or a designated period of time, the gaming device modifies the bet configuration of a game, the denomination of a game, the applicable modifier for a game, the number of occurrences of certain symbols in the game, the payout associated with certain symbols in the game, the features associated with certain symbols in the game, and/or the bonus event associated with the game. For example, based on the inherent average expected value of each bonus event unit (as described above), the gaming system enables a player to exchange a quantity of bonus event units to play a primary game that utilizes a paytable with an average expected payout percentage of 300%. In one embodiment, such a primary game (or such a modified primary game) is controlled by the gaming device processor as a thick-client game. In another such embodiment, such a primary game (or such a modified primary game) is controlled by the central controller as a thin-client game.

In one embodiment, the gaming system determines whether or not to enable the player to redeem any accumulated bonus event units for a play of one or more games based on if at least one redemption condition is satisfied. In one such embodiment, the redemption condition is the player playing a designated number of games played during the current gaming session. In different embodiments, the redemption condition that must be reached to enable the player to redeem any accumulated bonus event units for a play of one or more games is predetermined, randomly determined, determined based on a random determination by the central controller, determined based on a random determination by one or more gaming devices, determined based on the status of one or more players (such as determined through a player tracking system), determined based on a generated symbol or symbol combination, determined based on one or more side wagers placed, determined based on a player's primary game wager, determined based on the amount of coin-in accumulated in one or more pools, or determined based on any other suitable method or criteria.

In one embodiment, the central server and/or gaming device determines one or more aspects of the accumulation of one or more bonus event units and/or the redemption of one or more bonus event units on a real-time or substantially rear-time basis. This embodiment provides that as one or more parameters of the player's gaming experience changes, such as the player changing the amount of their wager or switching to a different primary game while staying enrolled in the bonus event participation program, the gaming system is configured to modify one or more aspects of the bonus event participation program to quickly adapt to such changes. In another embodiment, the central server and/or gaming device determines one or more aspects of the accumulation of one or more bonus event units and/or the redemption of one or more bonus event units by utilizing one or more look-up tables or databases. This embodiment provides that as one or more parameters of the player's gaming experience changes, such as the player changing the amount of their wager or switching to a different primary game while staying enrolled in the bonus event participation program, the gaming system is configured to access one or more look-up tables to modify one or more aspects of the bonus event participation program.

Accordingly, the gaming system disclosed herein provides for the accumulation of a plurality of bonus event triggering events and the contribution of the average expected payouts of these accumulated events (in the form of bonus event units or points) to a player account which are subsequently utilized by the player for one or more awards. Such a configuration provides that these group bonus events contribute an increased percentage to the total return to players (compared to known gaming system triggered bonus events) and complies with jurisdictional minimums for total returns. In other words, the gaming system and method disclosed herein provides a gaming establishment operator maximum flexibility in offering bonus events to players in exchange for accumulated bonus event units. Such a gaming system further provides the gaming establishment operator an alternative manner to provide incentives to players in the form of bonus event units.

Accordingly, as gaming establishments move to a more server based network environment, the gaming system and method disclosed herein provide bonus event awards that contribute a larger percentage to the total average expected return to players (i.e., similar to symbol-driven secondary game awards) but which are delivered by a central server. Such a gaming system meets the minimum average expected payback percentage required by certain jurisdictions even at the points in time when the secondary game is disabled. Such a gaming system with bonus events delivered by the central server further does not burden the gaming machine manufacturers by having to develop an unreasonable amount of custom game programs or software and an unreasonable amount of content for each different gaming establishment. That is, without changing the game program of the underlying game played at a gaming device, the gaming system and method disclosed herein enables a gaming establishment more control of the total average expected return to players and also enables a player the opportunity to select to participate in one or more of a plurality of different types of bonus events.

Moreover, such a gaming system further provides a solution to: (i) fatigue that player's often suffer in playing the same gaming machines repeatedly and (ii) frustration that gaming establishments suffer in differentiating themselves from their competitors (i.e., since most gaming establishments offer the same gaming devices to players). That is, the gaming system and method disclosed herein enables gaming establishments to offer unique bonus events to their players that are branded to the gaming establishment, build player loyalty to the gaming establishment and differentiate the gaming establishment from other gaming establishments. In other words, by providing such bonus events from the central server, the gaming system disclosed herein enables such gaming establishments to provide a bonus event to players playing at different gaming machines from the same gaming machine manufacturer as well as players playing at different gaming devices from different gaming machine manufacturers. Moreover, by providing such bonus events from the central server, the gaming system disclosed herein enables such gaming establishments to provide a bonus event to players playing different denominations at different gaming machines.

Information Provided to Player

As indicated above, suitable information about the bonus event unit accumulation event can be provided to the players through one or more displays on the gaming machines or additional information displays positioned near the gaming machines, such as above a bank of system gaming machines. In one embodiment, a metering and/or information display device may be used to display information regarding the bonus event unit accumulation events. This information can be used to entertain the player or inform the player that a bonus event unit accumulation event has occurred or will occur. Examples of such information are:

(1) that a bonus event unit accumulation event has occurred;
(2) that a bonus event unit accumulation event will shortly occur (i.e., foreshadowing the providing of a quantity of bonus event units);
(3) that one or more bonus event units have been provided to one or more players of the system gaming machines;
(4) which players have accumulated bonus event units;
(5) the amount of the bonus event units accumulated;
(6) the highest quantity of bonus event units accumulated;
(7) the lowest quantity of bonus event units accumulated;
(8) the average quantity of bonus event units accumulated;
(9) number of games played/total time since the last bonus event unit accumulation event has occurred;
(10) the number of bonus event units accumulated in a designated time period;
(11) an average amount of time between each bonus event unit accumulation event occurring;
(12) that a bonus event unit redemption event has occurred;
(13) that a bonus event unit redemption event will shortly occur (i.e., foreshadowing the providing of a bonus event award in a redeemed bonus event);
(14) an award provided in association with a bonus event unit redemption event;
(15) which players have won awards in association with a bonus event unit redemption event;
(16) the amount of the awards won in association with a bonus event unit redemption event;
(17) the highest award won in association with a bonus event unit redemption event;
(18) the average award won in association with a bonus event unit redemption event; and
(19) an average amount of time between each bonus event unit redemption event occurring.

It should be appreciated that such information can be provided to the players through any suitable audio, audio-visual or visual devices.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention is claimed as follows:

1. A gaming system comprising:

at least one controller configured, if any of a plurality of gaming devices cause a designated secondary game triggering event to occur, to operate with that gaming device to:

(a) determine if a player of the gaming device is enrolled in a bonus event participation program;

(b) if the player is not enrolled in the bonus event participation program:

(i) cause the gaming device to display a play of a secondary game, and (ii) cause the gaming device to provide to the player any secondary game award resulting from the play of the secondary game;

(c) if the player is enrolled in the bonus event participation program:

(i) cause the gaming device not to display the secondary game, and (ii) accumulate a quantity of bonus event units in an account associated with the player, wherein:

(1) said quantity of bonus event units is based on:

(A) the secondary game triggering event which occurred, (B) an average expected payout of the secondary game associated with the secondary game triggering event which occurred, wherein, for a same wager amount placed, different average expected payouts of different secondary games are associated with different quantities of accumulated bonus event units, and (C) a wager amount placed on a play of a primary game, such that if the designated secondary game triggering event occurred and a first wager amount is placed on the play of the primary game having a first primary game average expected payout, a first quantity of bonus event units are accumulated, and if the designated secondary game triggering event occurred and a second, different wager amount is placed on the play of the primary game having the first primary game average expected payout, a second, different quantity of bonus event units are accumulated, and (2) each bonus event unit has an average expected value; and (d) cause the gaming device to enable the player to selectively redeem at least one of any accumulated bonus event units by participating in a bonus event.

2. The gaming system of claim 1, wherein the secondary game triggering event occurs if the gaming device generates at least one secondary game triggering symbol in the play of the primary game.

3. The gaming system of claim 1, wherein the at least one controller is configured to cause the gaming device to enable the player to enroll in the bonus event participation program if the secondary game triggering event occurs.

4. The gaming system of claim 1, wherein the at least one controller is configured to cause the gaming device to enable the player to convert at least one bonus event unit into at least one bonus event component for at least one bonus event.

5. The gaming system of claim 1, wherein if any gaming device causes the designated secondary game triggering event to occur and the player of that gaming device is not enrolled in the bonus event participation program, said at least one controller is configured to operate with that gaming device to: accumulate the quantity of bonus event units in a temporary account associated with the player.

6. A gaming system comprising:

at least one controller configured to operate with a gaming device to:

(a) cause the gaming device to enable a player to enroll in a bonus event unit participation program; and (b) if the player enrolls in the bonus event unit participation program:

(i) after an occurrence of a bonus event unit accumulation event, accumulate a first quantity of bonus event units for the player, wherein the first quantity of bonus event units is based, at least in part, on an average expected payout associated with a skipped secondary game, (ii) maintain any accumulated bonus event units for the player, (iii) after an occurrence of a bonus event unit redemption event, cause the gaming device to enable the player to selectively redeem a second quantity of accumulated bonus event units to participate in a bonus event, (iv) if the player selectively redeems the second quantity of accumulated bonus event units to participate in the bonus event, randomly determine a bonus event award, and (v) cause the gaming device to display the determined bonus event award to the player.

7. The gaming system of claim 6, wherein the first quantity of bonus event units is based, at least in part, on a wager.

8. The gaming system of claim 6, wherein the determined bonus event award is based on the second quantity of selectively redeemed bonus event units.

9. The gaming system of claim 6, wherein the first quantity of bonus event units is the same as the second quantity of bonus event units.

10. The gaming system of claim 6, wherein the at least one controller is configured to cause the gaming device to enable the player to enroll in the bonus event participation program if a secondary game triggering event occurs.

11. A method of operating a gaming system, said method comprising:

if any of a plurality of gaming devices cause a designated secondary game triggering event to occur (a) causing at least one controller to operate with that gaming device to determine if a player of the gaming device is enrolled in a bonus event participation program;

(b) if the player is not enrolled in the bonus event participation program:

(i) causing at least one display device of the gaming device to display a play of a secondary game, and (ii) causing the gaming device to provide to the player any secondary game award resulting from the play of the secondary game;

(c) if the player is enrolled in the bonus event participation program:

(i) causing the at least one display device of the gaming device not to display the secondary game, and (ii) causing the at least one controller to accumulate a quantity of bonus event units in an account associated with the player, wherein:

(1) said quantity of bonus event units is based on:

(A) the secondary game triggering event which occurred, (B) an average expected payout of the secondary game associated with the secondary game triggering event which occurred, wherein, for a same wager amount placed, different average expected payouts of different secondary games are associated with different quantities of accumulated bonus event units, and (C) a wager amount placed on a play of a primary game, such that if the designated secondary game triggering event occurred and a first wager amount is placed on the play of the primary game having a first primary game average expected payout, a first quantity of bonus event units are accumulated, and if the designated secondary game triggering event occurred and a second, different wager amount is placed on the play of the primary game having the first primary game average expected payout, a second, different quantity of bonus event units are accumulated, and (2) each bonus event unit has an average expected value; and (d) causing the gaming device to enable the player to selectively redeem at least one of any accumulated bonus event units by participating in a bonus event.

12. The method of claim 11, wherein the secondary game triggering event occurs if the gaming device generates at least one secondary game triggering symbol in the play of the primary game.

13. The method of claim 11, which includes causing the gaming device to enable the player to enroll in the bonus event participation program if the secondary game triggering event occurs.

14. The method of claim 11, which includes causing the gaming device to enable the player to convert at least one bonus event unit into at least one bonus event component for at least one bonus event.

15. The method of claim 11, which includes, if any gaming device causes the designated secondary game triggering event to occur and the player of that gaming device is not enrolled in the bonus event participation program, causing said at least one controller to accumulate the quantity of bonus event units in a temporary account associated with the player.

16. The method of claim 11, which is provided through a data network.

17. The method of claim 16, wherein the data network is an internet.

18. A method of operating a gaming system, said method comprising:

(a) causing at least one controller to operate with a gaming device to enable a player to enroll in a bonus event unit participation program; and (b) if the player enrolls in the bonus event unit participation program:

(i) after an occurrence of a bonus event unit accumulation event, causing the at least one controller to operate with said gaming device to accumulate a first quantity of bonus event units for the player, wherein the first quantity of bonus event units is based, at least in part, on an average expected payout associated with a skipped secondary game, (ii) causing the at least one controller to operate with said gaming device to maintain any accumulated bonus event units for the player, (iii) after an occurrence of a bonus event unit redemption event, causing the gaming device to enable the player to selectively redeem a second quantity of accumulated bonus event units to participate in a bonus event, (iv) if the player selectively redeems the second quantity of accumulated bonus event units to participate in the bonus event, causing the at least one controller to operate with said gaming device to randomly determine a bonus event award, and (v) causing at least one display device of the gaming device to display the determined bonus event award to the player.

19. The method of claim 18, wherein the first quantity of bonus event units is based, at least in part, on a wager.

20. The method of claim 18, wherein the determined bonus event award is based on the second quantity of selectively redeemed bonus event units.

21. The method of claim 18, wherein the first quantity of bonus event units is the same as the second quantity of bonus event units.

22. The method of claim 18, which includes causing the at least one controller to operate with said gaming device to enable the player to enroll in the bonus event participation program if a secondary game triggering event occurs.

23. The method of claim 18, which is provided through a data network.

24. The method of claim 23, wherein the data network is an internet.

* * * * *